United States Patent [19]

Ledieu et al.

[11] 3,974,481

[45] Aug. 10, 1976

[54] MACHINE FOR THE FINDING OF AN OPTIMUM PASSAGE

[75] Inventors: Jean Ledieu, Saint Germain en Laye; Philippe Eschenbrenner, Saint Genest Mallifaux, both of France

[73] Assignee: Societe CYBCO, Paris, France

[22] Filed: May 14, 1974

[21] Appl. No.: 469,881

[30] Foreign Application Priority Data

May 14, 1973 France ............................ 73.17373
Dec. 14, 1973 France ............................ 73.44816

[52] U.S. Cl. ........................... 340/172.5; 235/150.1
[51] Int. Cl.² ......................................... G06F 15/20
[58] Field of Search .............. 340/172.5; 235/150.1; 444/1

[56] References Cited
UNITED STATES PATENTS

| | | | |
|---|---|---|---|
| 3,411,140 | 11/1968 | Halina et al. | 340/172.5 |
| 3,688,278 | 8/1972 | Sauvan et al. | 340/172.5 |
| 3,794,983 | 2/1974 | Sahin | 340/172.5 |

*Primary Examiner*—Malcolm A. Morrison
*Assistant Examiner*—Jerry Smith
*Attorney, Agent, or Firm*—William R. Woodward; Flynn & Frishauf

[57] ABSTRACT

The optimiser includes P cells for the computation and memorization of a content, the P contents simulating the deformation of a backward wave front which explores a plane representative of a concrete situation submitted to constraints.

The set of elementary optimum actions which define the optimum path between an initial state and a final state are found by iteration.

25 Claims, 44 Drawing Figures

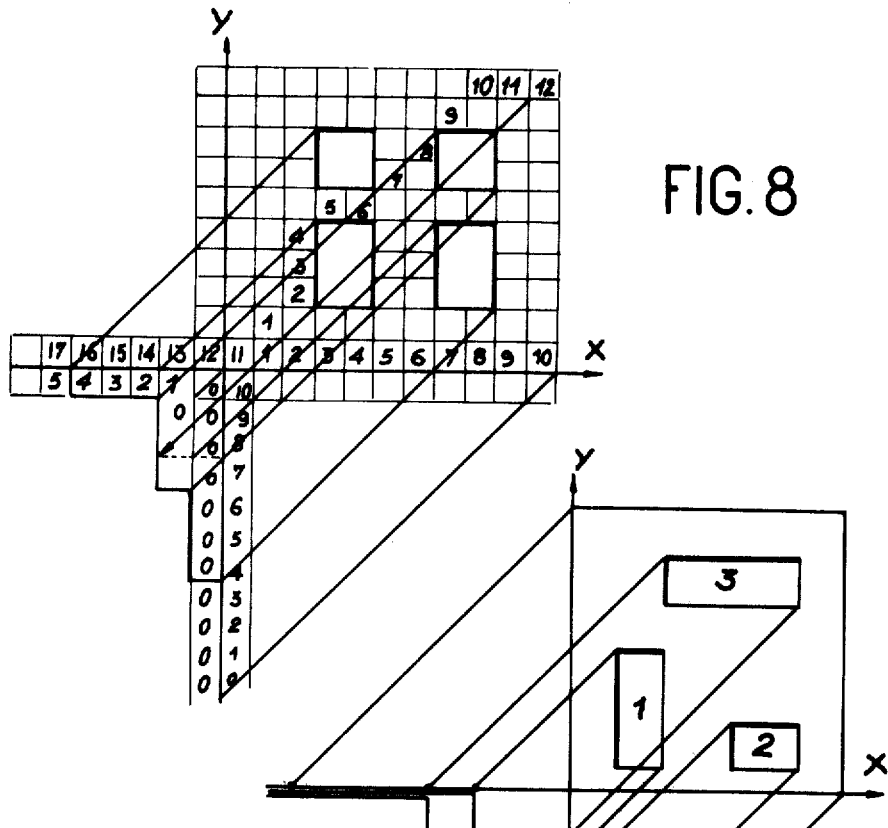
FIG. 8
FIG. 6
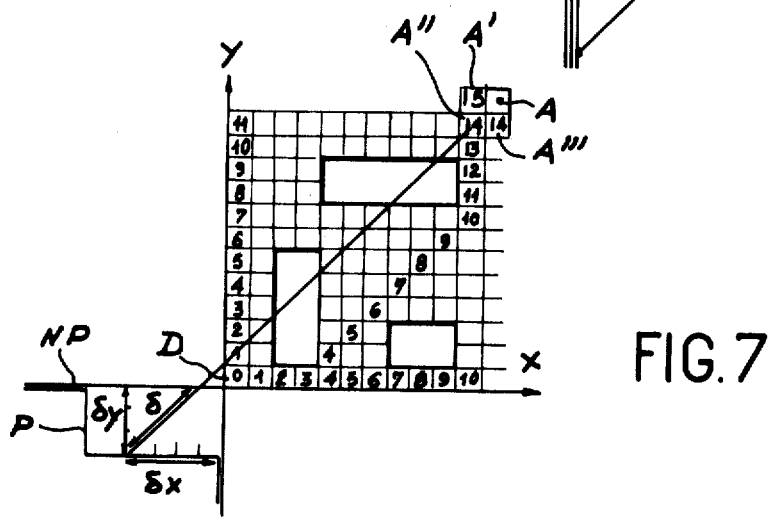
FIG. 7

READING OF "DELTAS" OF ARRIVAL POINTS

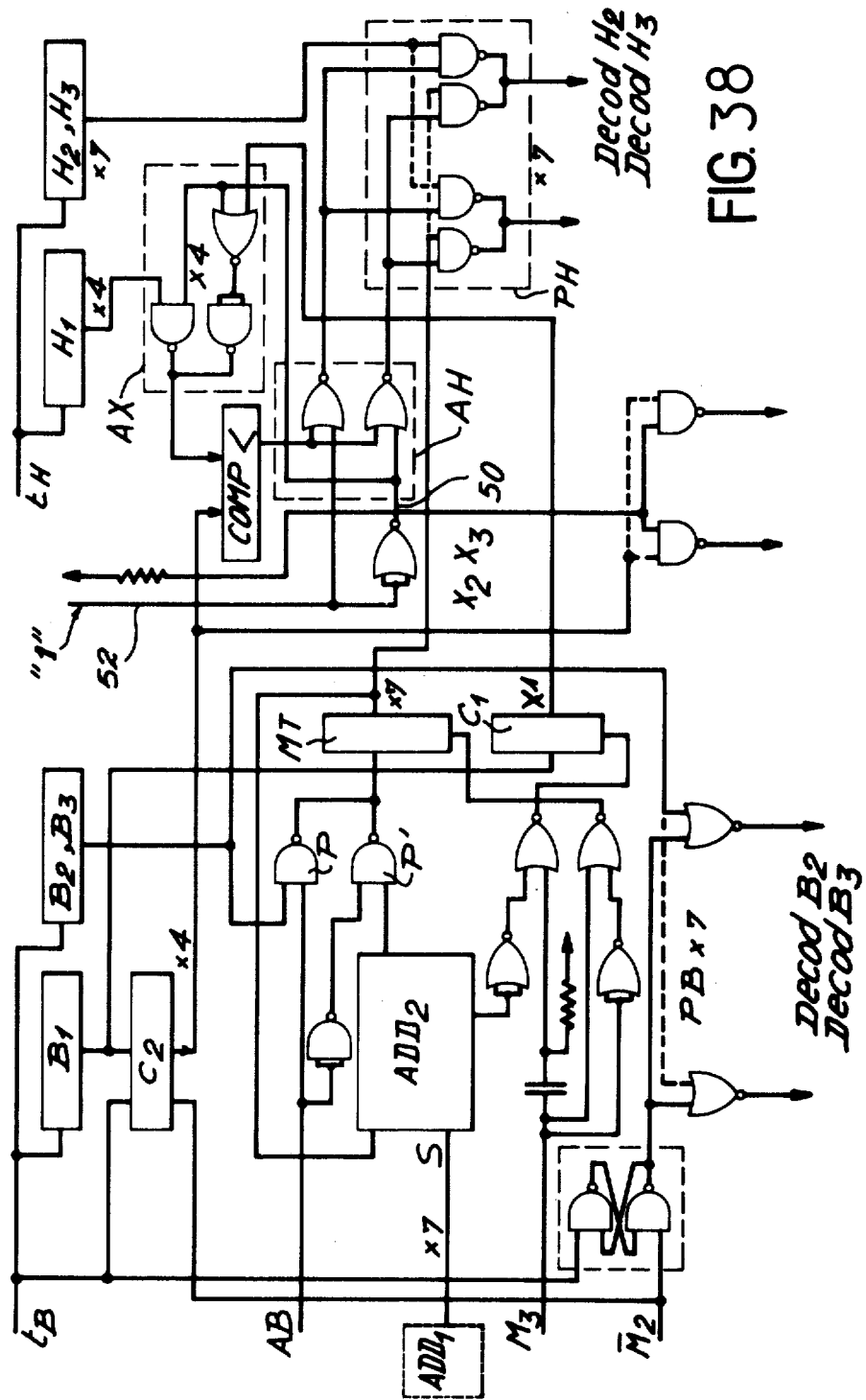

MACHINE FOR THE FINDING OF AN OPTIMUM PASSAGE

This invention concerns a digital problem solving machine for finding an optimum passage from an initial state to a final state of a system of several variables submitted to specified constraints and which makes it possible to find in an economical manner the optimum development of a concrete situation which depends upon several variables.

The machine of the invention solves scheduling problems by giving them an optimum solution, practically in real time, whatever be the number of constraints. This machine can therefore process combinational problems for which the response times of a conventional computer are too long.

The complex problems of scheduling with a large number of variables can be solved by computers acting alone, on condition that these have capacities which are sufficient and that the required response times are not too short. It is thus that the problems of very complex operations can be solved by large batteries of computers giving a solution in some tens of minutes. In this manner one can establish preliminary programs for air traffic or rail traffic, for production and distribution of energy, and for the manufacture of automobiles starting from basic materials put to work in different factories. On the other hand if a fortuitous event disturbes the running of the operation, a battery of computers which is sufficiently powerful to correct the solution in a short time does not exist; in fact the computer working alone, performs the operations in a sequential fashion and, as a result of this, requires a relatively long time.

In particular, the subject matter of the invention is a digital machine, called an optimizer, which is capable of requiring only a very short time for the solution of this type of problem. More particular, by the optimizer of the invention brings a quasireal time solution to essentially developing problems with which, for example airport air traffic control towers, rail traffic control centres, electrical power distribution centres, etc . . . are permanently confronted, as well as to the problems posed to industries when disturbances upset the production and delivery programmes.

A complex situation of this type depends upon a large number of parameters. To simplify the terminology, one can say that the situation in question is a system of several variables, which naturally does not signify that the subject matter of the invention is applied to an abstract mathematical function but that on the contrary this subject matter is a concrete situation described by the aforesaid system.

It is known that the state of a system defined by a specified number of variables can always be represented by points on a geometric space having the same number of dimensions as the system has variables (for example a plane space in the case of two variables). A state of the system is then defined by a point of this space and the development of the system from one state to the other is represented by a path from one point to another in the aforesaid space. The number of points can be finite, which entrains quantization of a space and consequently of the variables.

The decision problems evoked above necessitate the searching for an optimum path from one system state to another state and, consequently, can be solved by searching for an optimum path between the corresponding points of the representative geometric space. It is this optimum path that the optimizer of the invention finds.

Methods for finding the shortest path between two points separated by obstacles in a plane are already known. One could consult in respect of this subject the article entitled "The shortest path through a maze" by E. F. Moore, published in "Annals of the Computation Laboratory of Havard University", volume 30, 1959, page 285 and the article entitled "A modification of Lee's path connection algorithm" of S. B. Akers published in "IEEE Transaction Electronic Components" volume EC-16 (1967), page 97.

According to this known art, a first method consists of writing into each pocket of the plane the number of steps which separates it from the point of origin considered as a starting point. In a more precise fashion, one designates the starting point by A and the arrival point by B, one writes the letter $l$ in all of the pockets adjacent to the starting pocket A. Then the FIG. 2 is written into all of the pockets adjacent to the pockets in which a $l$ is found, then a 3 is written into all of the pockets adjacent to the pockets in which a 2 is found etc . . . At the end of $n$ steps, the arrival point B is obtained. the shortest path can be traced by starting from the arrival point B and linking the adjacent pockets of which the contents decrease by one on each step.

This algorithm gives the length of the path in addition to the optimum path ($n$ steps in the preceding example). But a machine functioning according to this algorithm would necessarily include $N^2$ memory locations, if N represents the quantified values which each of the two plane variables can take on, which is prohibitive in most of practical cases of utilisation where the number N can reach, for example, several thousand. In addition, these memory locations must be designed to be able to memorise a number at least equal to the length of the optimum path, which can in certain cases approach the value 2N, which is again prohibitive.

To avoid this latter disadvantage, an algorithm has been proposed in which the numbers written into the pockets form a sequence such that the number which precedes one symbol of this sequence is different from the number which follows it. In this manner, the memory elements can be designed to store only a limited number of bits, for example 2; nevertheless, in this case the machine which applies this algorithm still necessarily includes $N^2$ memory locations.

An iterative algorithm has also been proposed according to which one proceeds in the following fashion. Initially, a 0 is written into all of the plane pockets. A 1 is written into pocket A which corresponds to the starting point. A 1 is then written into all of the pockets which still contain a 0 and which are adjacent to the pockets in which a 1 has already been written. The writing of the 1 thus progresses step by step, and after $n$ steps, a pocket L is reached from which one can, in a single step, reach the arrival pocket B. The first optimum elementary action to which the system is to be subjected, is then that which passes the system from the state of point B to that of L. This first elementary action being performed, all of the plane pocket contents are reset to zero and the exploration process is reiterated by a new writing of 1, the point L being taken as the new arrival point. After ($n$-1) steps, a point M is reached from which one can reach the point L in a single step; the second optimum elementary action is then that which passes the system from point L to point M. The procedure is thus followed by iteration until one ends up with the starting point A. The total number of steps performed in this search is then equal to $(n + 1)(n + 2)/2$, where $n$ is the length of the shortest path between A and B.

A digital machine which operated according to this algorithm would still need $N^2$ memory location and therefore come up against the already noted difficulty. In addition, the computation time could be very long if the length of the optimum path were large, for the total number of steps that it is necessary to perform is equal to $(n + 1)(n + 2)/2$, even if the number of constraints is small.

It is an object of this invention to provide a digital machine, called optimizer, which finds the optimum path between two states of a system but which does not show any of the above mentioned disadvantages.

Subject Matter of This Invention

Briefly the optimizer of this invention on one hand necessitates a maximum of only 2N memory locations in place of $N^2$, which, taking into account the values that the number N is likely to take in practical application, produces a considerable simplification in the equipment. On the other hand, the optimizer of the invention is designed in such a way that the exploration is not performed step by step, which takes a prohibitively long time, but on the contrary from constraint to constraint, which considerably increases the computation speed. Finally, the contents of each of the memory cells allows the finding of the optimum path without it being necessary to supply memory cells of which the maximum capacity is the order of magnitude of the value of the optimum path.

To better understand the originality of the digital machine of this invention, one can make use of a descriptive interpretation which will also be widely used in the description given further below. According to this interpretation one considers that the development of the representative plane pockets' digital contents simulates a propagation of a dummy wave in this plane, each pocket receiving the wave of the adjacent preceding pockets, with the exception of the pockets which represent the constraints or forbidden system states, which do not propagate the waves. This interpretation is given for example in the article by C. Y. Lee, entitled "An algorithm for path connections and its applications" published in the Bell Telephone System, Technical Publications, Monograph 4017, December 1961.

When the dummy wave reaches one of the points just prior to the arrival point, a first elementary optimum decision can be taken. As this elementary optimum action is the first found, the arrival point for the wave is generally representative of the initial state of the system whilst that of the starting point for a wave is a point representative of the system final state. In this sense, one can say that the dummy wave, the propagation of which simulates the development of the contents of the pockets in the course of exploration, is a backward wave, for it propagates from a point representing the system final state to a point representing the system initial state.

One can consider that the optimizer of the invention simulates a backward iterative exploration of the type described, it being well understood that the thus simulated backward wave has no physical reality but that it is the support for a descriptive interpretation of the operation of the machine. With the aid of this interpretation, the originality of the optimizer of this application can be described again in the following fashion. In equipments designed to operate according to past algorithms, one necessarily used $N^2$ memory locations to memorise the development of the entire wave through the part of the plane to be explored. According to a first essential characteristic of the invention, one is interested only in the wave front and not in the entire wave, which necessitates only 2N memory cells to follow the development of the 2N points of the said front in the course of its development.

In addition, since the wave front is only disturbed on passing the constraints, which entrains no deformation of the wave front between two constraints, the wave front form is studied only from constraint to constraint, without it being necessary to follow this evolution step by step. As a result, as has been emphasized above, the optimizer of the invention is much more rapid than the known computer configuration which run with known algorithms.

According to another essential characteristic of the computer of the invention, the contents of the memory cells are not, as in the prior art, the number of steps that the wave has had to pass to reach a given pocket, but a number which represents the difference between this number of steps and the number of steps that the dummy wave would have passed if the constraint did not exist. In orther terms, and according to the invention, the contents of the memory cells allow the defining of the wave front deformation on passing each constraint, a deformation which is estimated with respect to a reference wave which is insensitive to the aforesaid constraints and the front of which will therefore not consequently be disturbed.

More exactly stated for the two variable case here described, the subject matter of the invention is a digital problem solving machine of optimizer type, for the searching out of an optimum path between an initial state and a final state for a system with two quantized variables each of which can take on N values, of a type which includes:

a. - means for setting in pairs of coordinate values of the variables corresponding to the initial and final state of the said system and for setting in the coordinate pairs corresponding to the values of variables defining the system's forbidden states, called constraints;

b. - a plurality of computation-and-memorization cells for handling digital contents;

c. - means for providing variation, starting from a set of initial values, of the said contents of quantities appropriately defined as a function of constraints imposed on the system, the evolution of the said contents by such variation being considered as simulating the propagation of a dummy backward wave which propagates step by step in a representative plane space with $N^2$ equidistant points corresponding to the N possible values of each variable, from a starting point representing the final state of the system until the arrival point representing the initial state of the system, each point of the plane receiving the said wave of the adjacent preceding points, with the exception of the points representative of constraints, which do not propagate the wave;

d. - means for reading the contents of the finally obtained cells, and e. - decision means using the results of the reading performed by said reading means and comparing them for selecting at least one of the successive possible states as being the state corresponding to the first optimum elementary action, which passes the system from the initial state to the said successive selected state, and which also includes, in the case where it is desired to obtain the complete set of optimum elementary actions, means for reiteration composed of:

f. - means for setting in as the new initial state of the system the said successive state chosen by said decision means, g. - means for reinitializing the cell contents, h. - means for causing the means defined in the foregoing subparagraphs c to g inclusive to reprocess the contents of the cells and, i. - means for memorization of the set of optimum elementary actions found on each processing, a set which gives, closer and closer, the said optimum path going from the initial state to the final state, the said digital machine comprising the improvement constituted by the following:

- the said computation-and-memorization cells are TP in number, where P ≤ 2N, and form an operator;

each cell includes means for incrementation of its content controlled from the foresaid means a for the setting in of coordinates defining each constraint and includes also means for sequentially delivering the said constraint coordinates to the said incrementation means, by which delivery means said incrementation means are activated, the processing performed by the said operator thus proceeding from constraint to constraint, and the contents of each cell after the processing of a constraint represents the difference between the number of steps performed on any one of the variables to pass the said constraint and the dummy number of steps which would lead to the same situation if the said constraint did not exist, so that the set of P contents can then be considered as representing the difference expressed as the number of steps between the front of the backward dummy wave and the front of a reference wave propagating as the dummy wave but not being disturbed by the said constraints.

In a first variant of the invention the contents of the cells are equal to the difference expressed as the number of steps between the front of the dummy wave and the front of the reference wave which would not be disturbed by the constraints. This difference can take on large numeric values, the memory locations must include a sufficiently large number of bits to contain the maximum difference that it is possible to find.

In a second variant, the contents of the memory still allows a calculation of the difference between the fronts of the disturbed waves and non-disturbed waves but it consists of an increment which can take on one or other of the values 0 and 1, and which represents a variation of this difference when one passes from one cell to the following. The processing of the increment difference and not the difference itself is an additional source of simplification.

In a more precise fashion, in the first variant, the optimizer is characterised in that:

the number of cells P is equal to 2N;

each of the 2N cells is referenced by an address, called diagonal address, the 2N diagonal addresses being numbered from 0 to 2N −1; each of the cells can then be considered as being allocated to one of the 2N diagonals of the representative plane;

the means for selecting in the said cells an initial content include means for initially setting a content equal to zero for the cells of which the addresses go from 0 to N inclusive and contents equal to 1, 2, 3 . . . N −1 respectively for the cells of which the addresses go from N to 2N −1, each such address corresponding to a diagonal of said plane, in order of height;

each constraint is set in, in means provided for the purpose, by two numbers, one called upper diagonal address denoted H corresponding in the representative plane to the point of the constraints situated on the upper diagonal of the plane and the other called lower diagonal address noted by B, corresponding to the constraint situated on the lowest diagonal of the plane, and the said means for incrementing the contents of each cell as a function of the addresses B and H of the processed constraint include means for:

a. maintaining unchanged the contents of the cells the addresses of which are included between 0 and B, B included, b. transferring the contents of the cell with address B + 1 to (B) + 1, wherein (B) designates the contents of the cell of address B before processing, transferring to (B) + 2 the contents of the cell of address B + 2 and so on, c. comparing the contents of each cell with the contents (H) of the cell of address H, d. determining which cell is the intermediate cell for which the new contents become equal to (H), e. maintaining the contents of the cells from the said intermediate cell up to the cell with address H at this value (H), f. maintaining unchanged the contents of the cells of which the addresses go from H + 1 to P −1.

According to a preferred mode of constitution of this first variant, the said decision means include means for comparison of the three respective contents of three cells corresponding to the three successive possible states of the initial state, comparing and selecting means for indicating which of the three contents is the smallest and selecting the state thus indicated.

As to the second variant of the invention, it is characterised in that each cell of the operator includes means for computation and memorisation of an increment which can take on one of the two values 0 and 1, an increment which represents, for each specified cell, the increase of the contents proper to this cell with respect to the contents proper to the cell of the preceding address.

According to a preferred mode in which this second variant may be constituted, the optimizer is characterised in that:

each of the P cells is referenced by an address, called diagonal address, the P diagonal addresses being numbered from 0 to P −1, whereby the cells can then be considered as being allocated to P diagonals of the representative plane;

the means for selecting in the said cells an initial content include means for initially selecting an increment equal to zero for the cells of which the addresses go from 0 to N inclusive and an increment equal to 1 for the cells of which the addresses go from N + 1 to P −1;

each constraint is specified, in means provided for the purpose, by two numbers, the one called upper diagonal address noted by H, corresponding in the representative plane to the point of the constraint situated on the upper diagonal of the plane and the other called "lower diagonal address" and noted by B, corresponding to the point of the constraint situated on the lowest diagonal of the plane, and the said means for computation of the increment of each cell as a function of the addresses B and H of the constraint processed includes means for:

a. maintaining at 0 the increment of cells of which the addresses are included between 0 and B, inclusive of B,
b. calculating the number S of increments that it counts before the processing of the constraint affecting the cells the addresses of which go from B exclusive to H inclusive,
c. resetting to zero the cell contents of which the addresses go from B + 1 to H,
d. providing an increment of 1 in the cells of addresses B + 1 B + 2 ... B + S,
e. assuring a zero increment in the cells of which the addresses go from B + S + 1 inclusive up to H inclusive,
f. maintaining unchanged the increments of the cells of which the addresses go from H + 1 to P −1.

However, the characteristics and advantages of the invention will be more apparent after the following examples of embodiments given by way of example, and in no way limiting, described with reference to the appended drawings in which:

FIG. 6 illustrates the determination of the disturbed wave front in the case of several constraints of which one is not a disturbing element for a wave front;

FIG. 7 illustrates the determination of the path module going from the starting point of the wave to the arrival point FIG. 8 specifies the definition of diagonal addresses;

Figure 17:
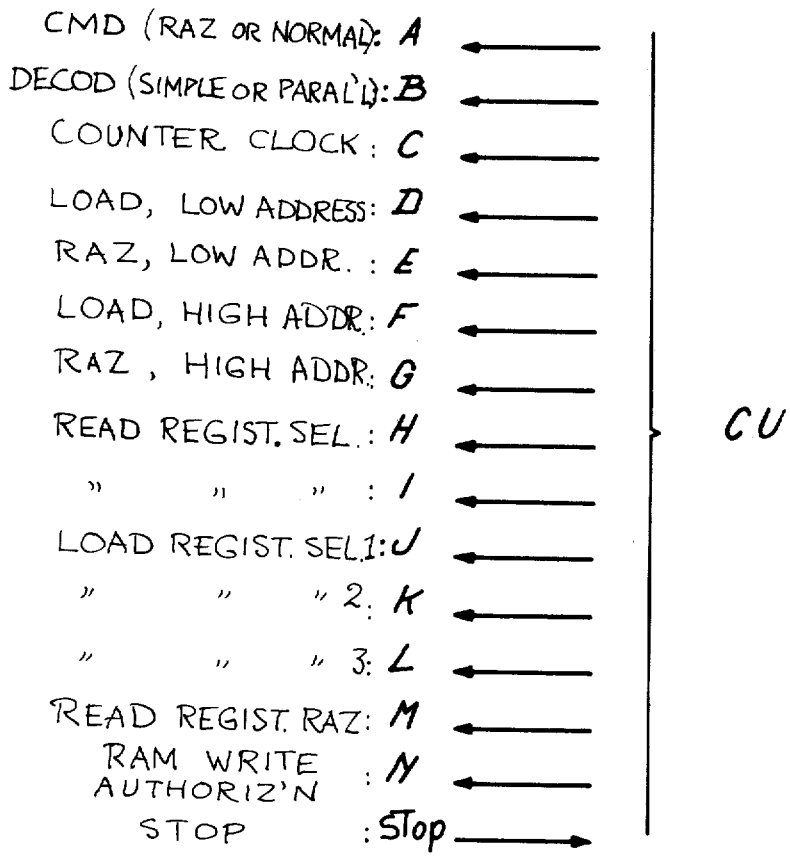
Figure 18A:
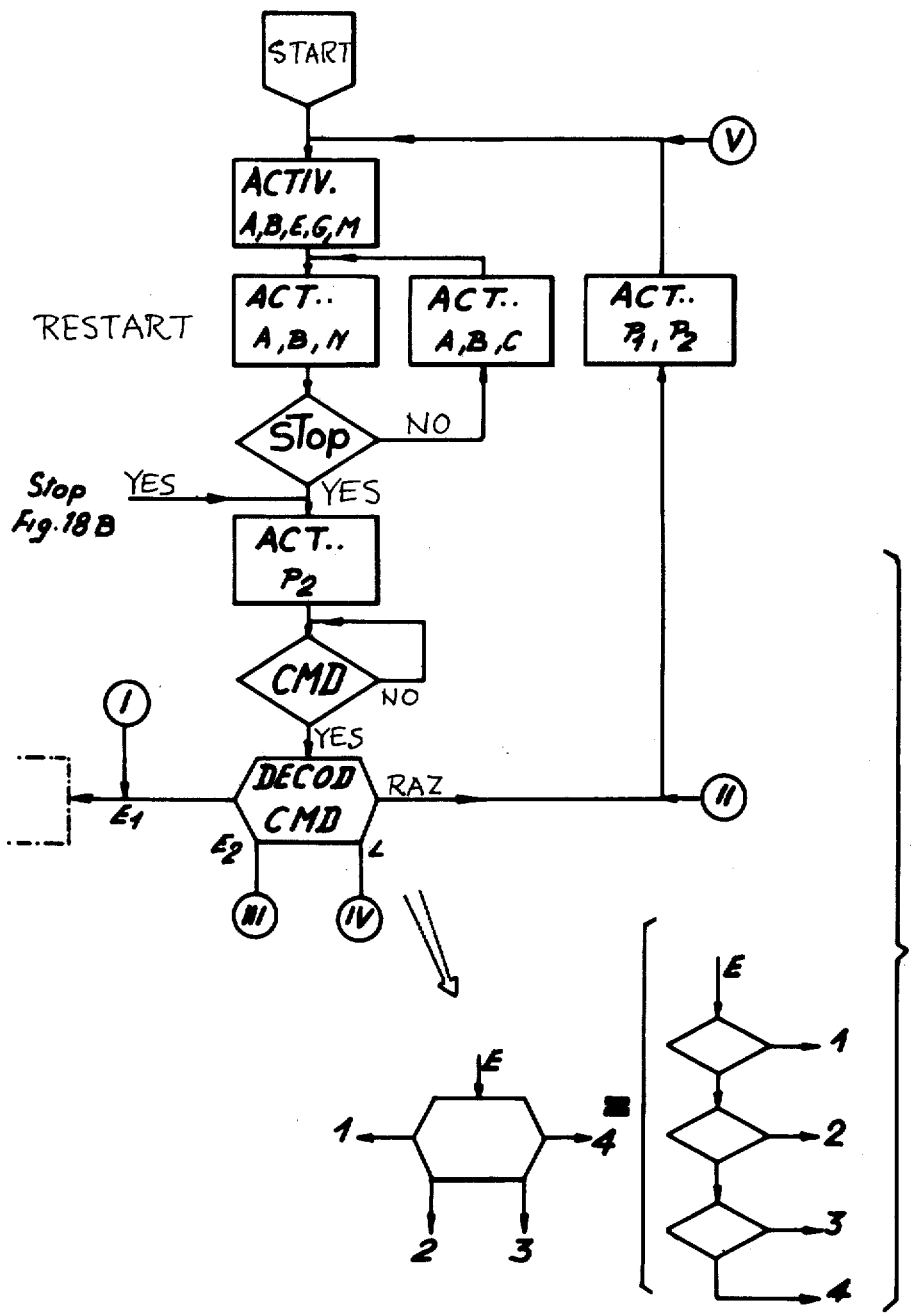
Figure 18B:
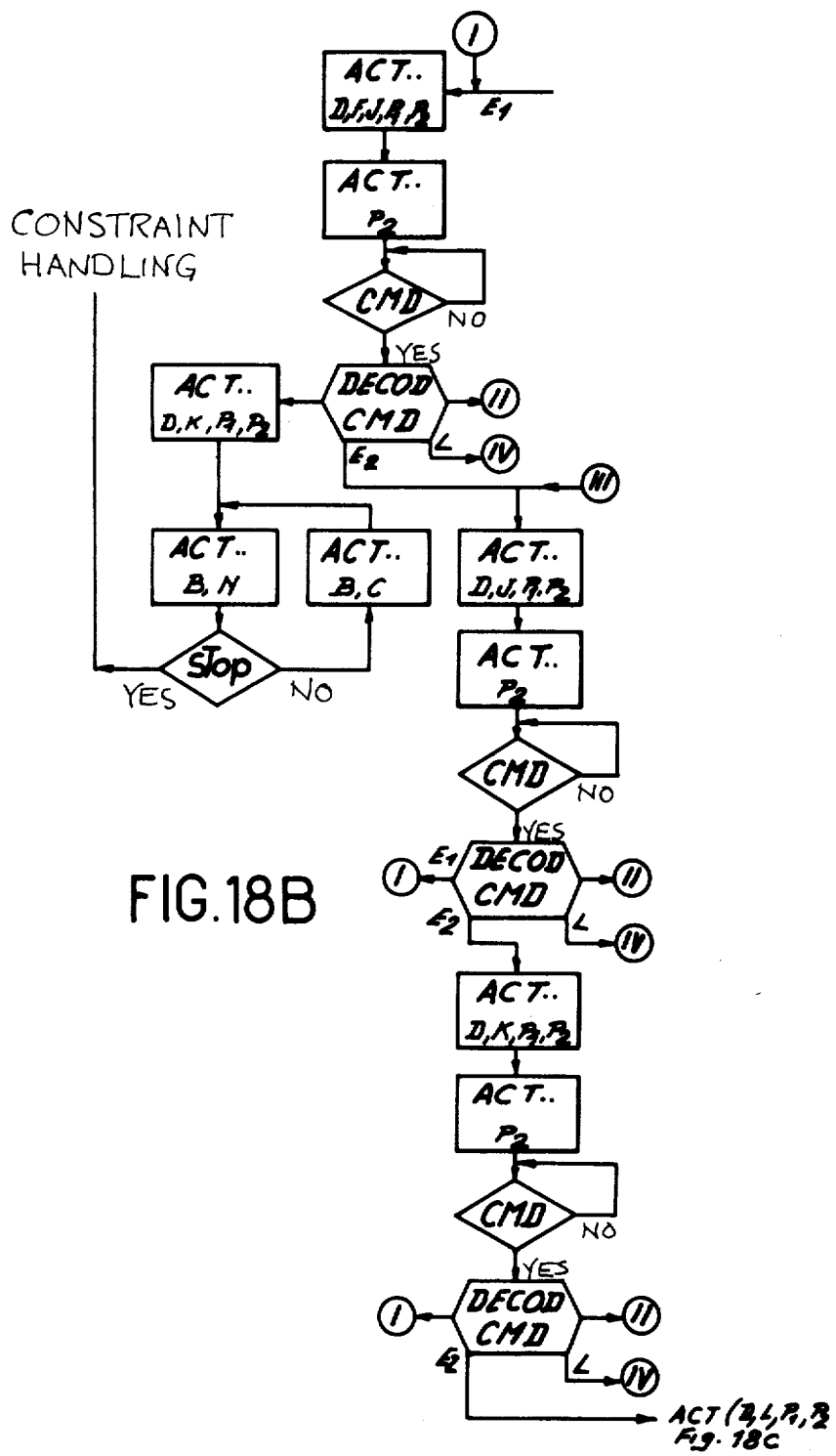
Figure 18C:
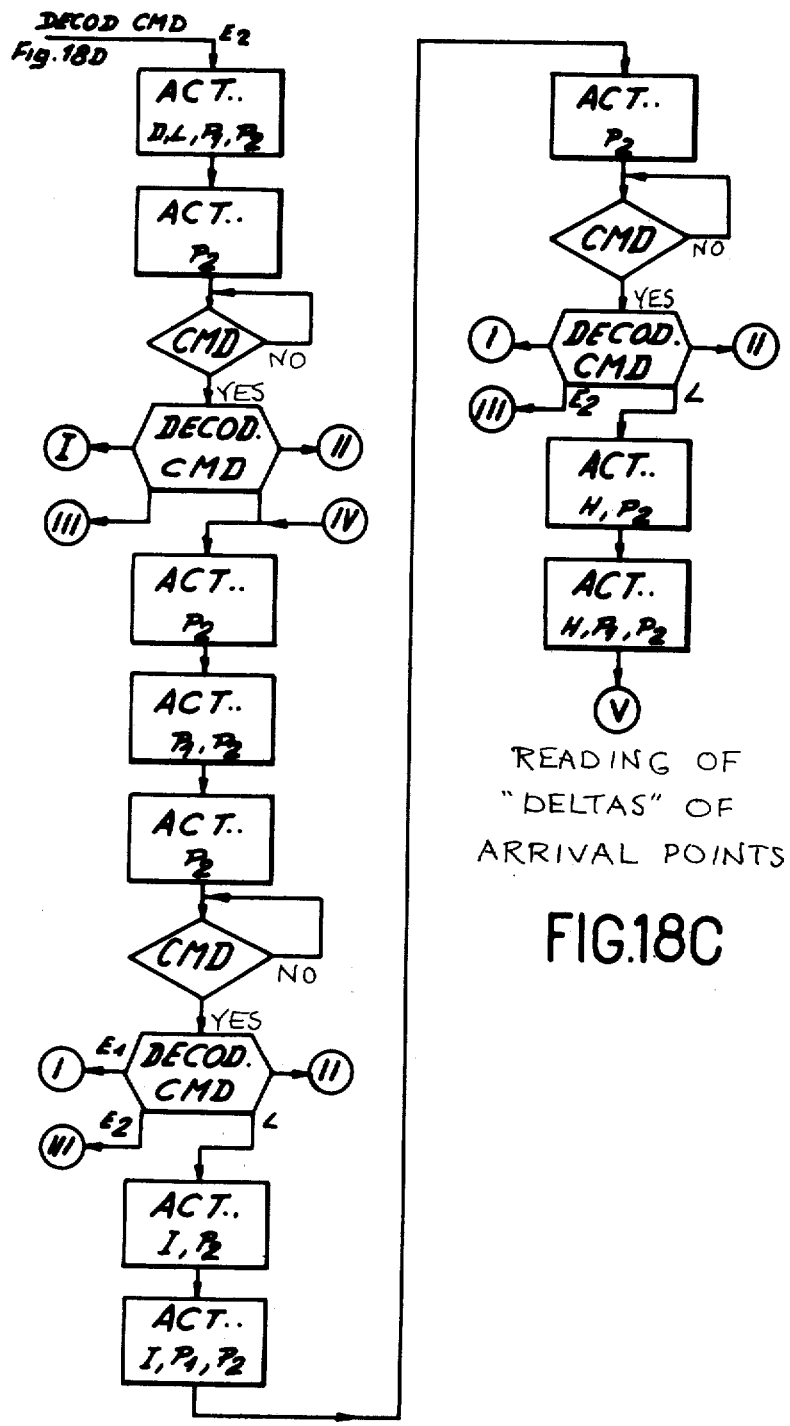
Figure 19:
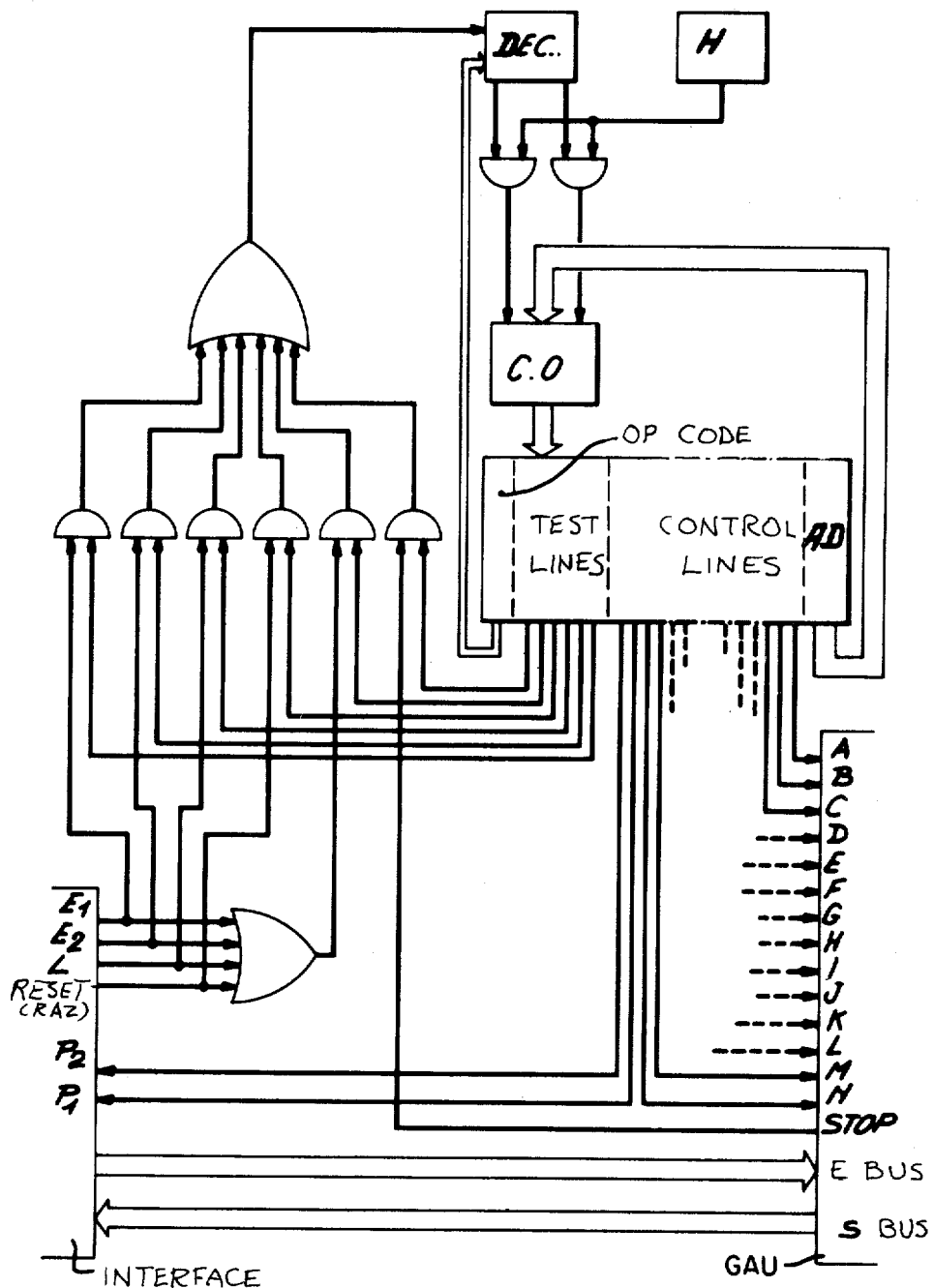
Figure 20:
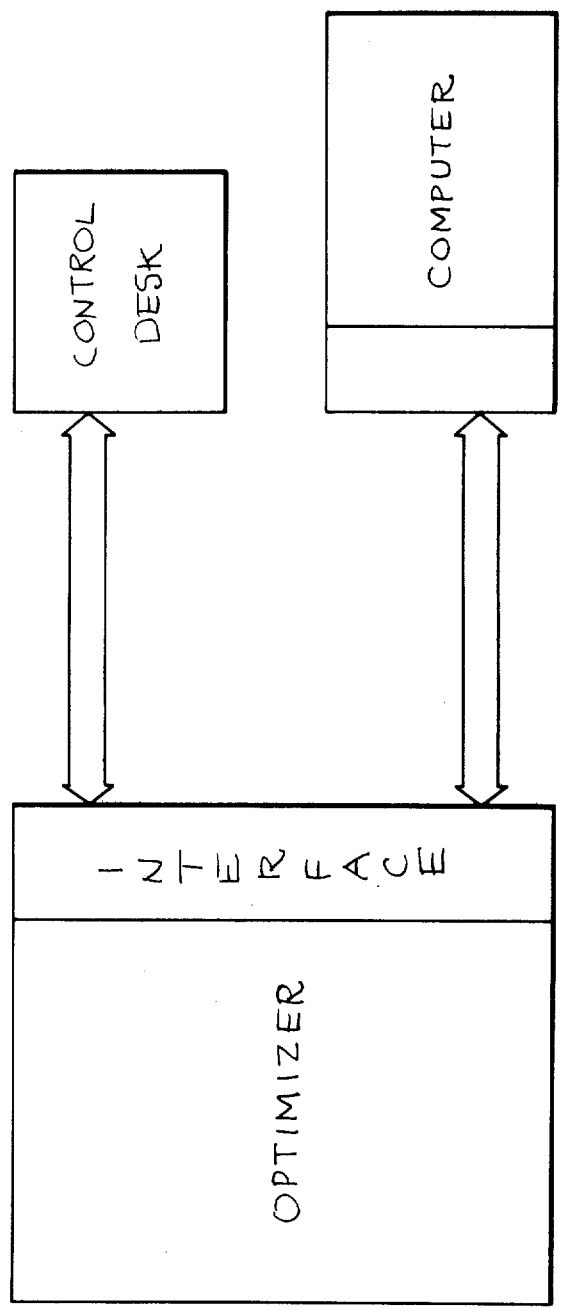
Figure 21:
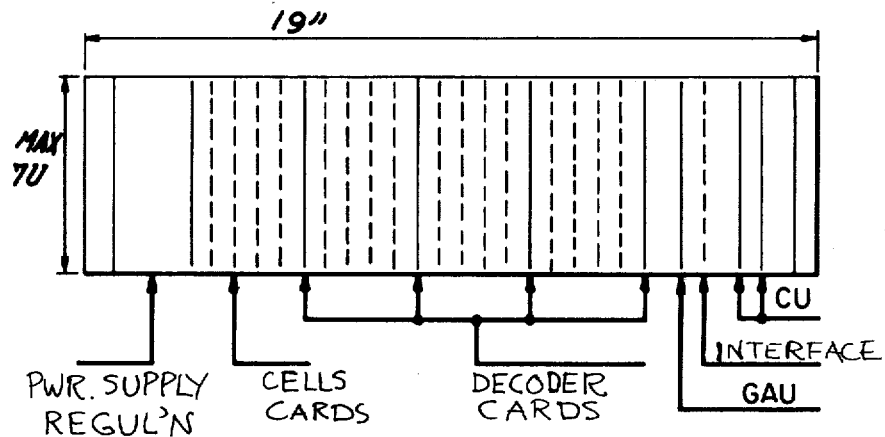
Figure 22:
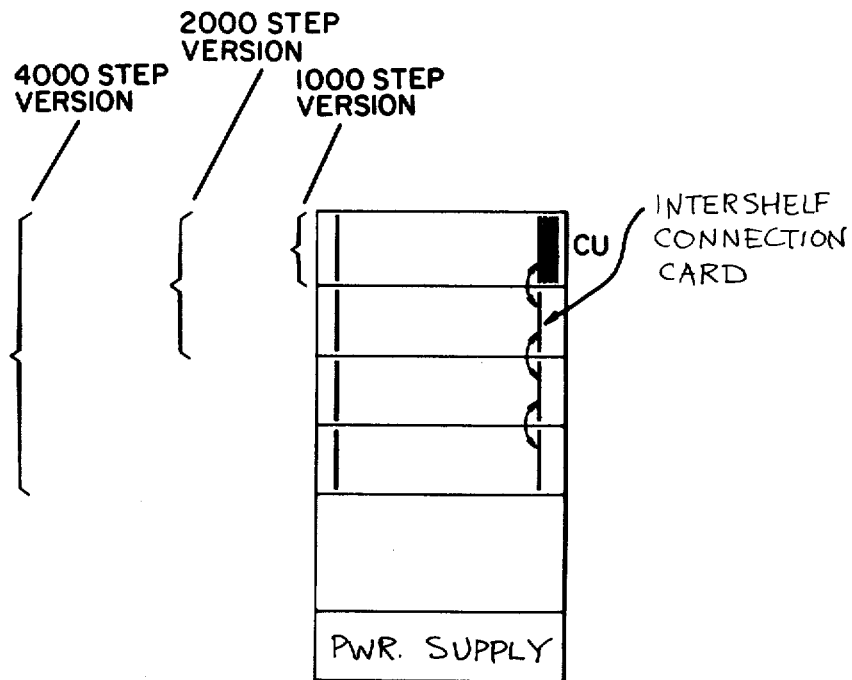
Figure 23:
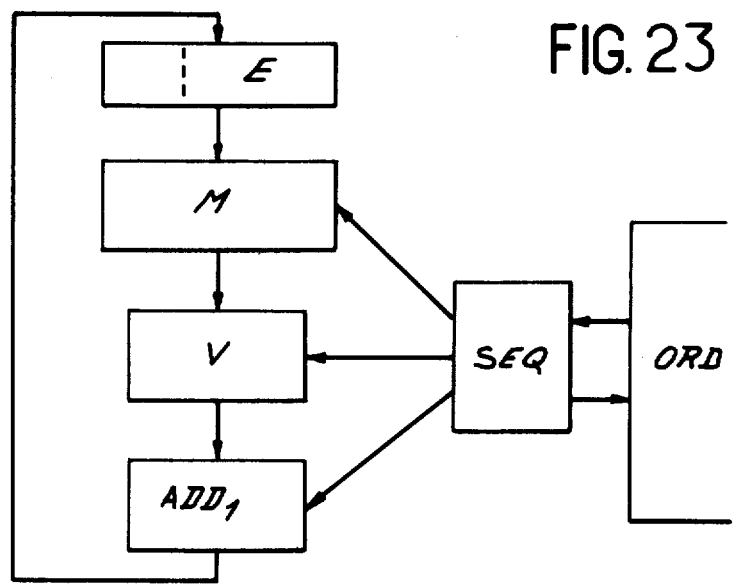
Figure 24:
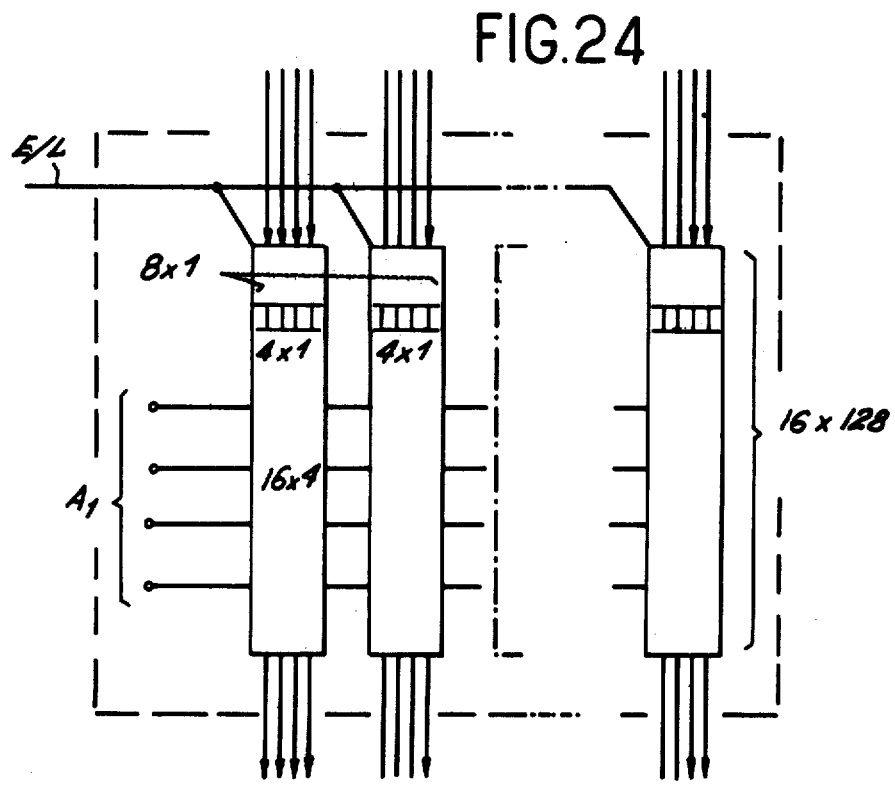
Figure 25:
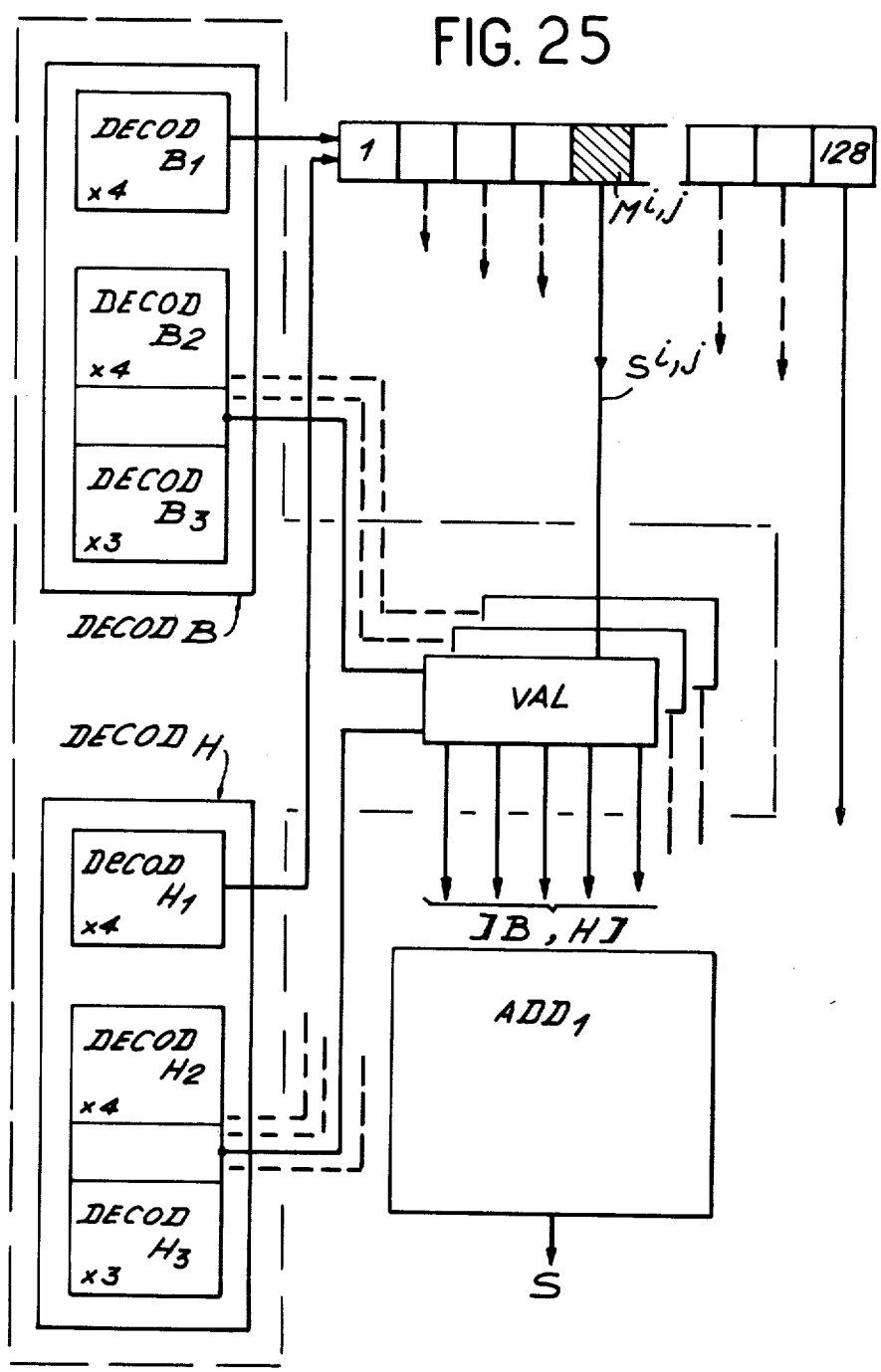
Figure 26:
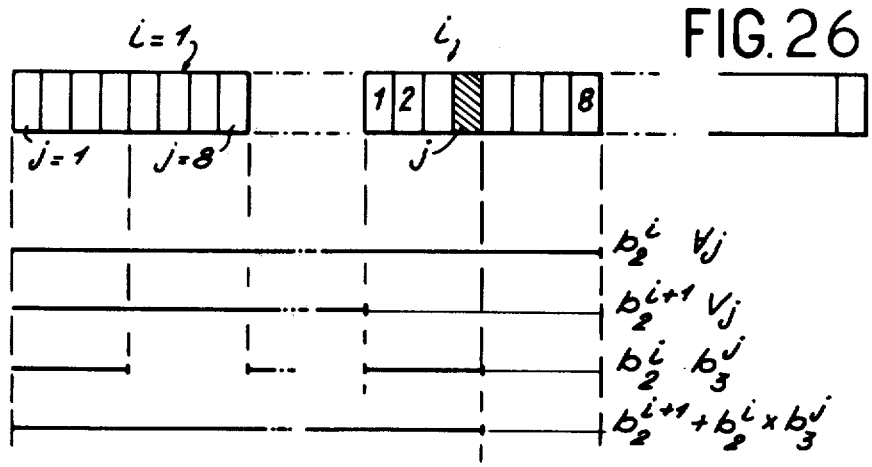
Figure 27:
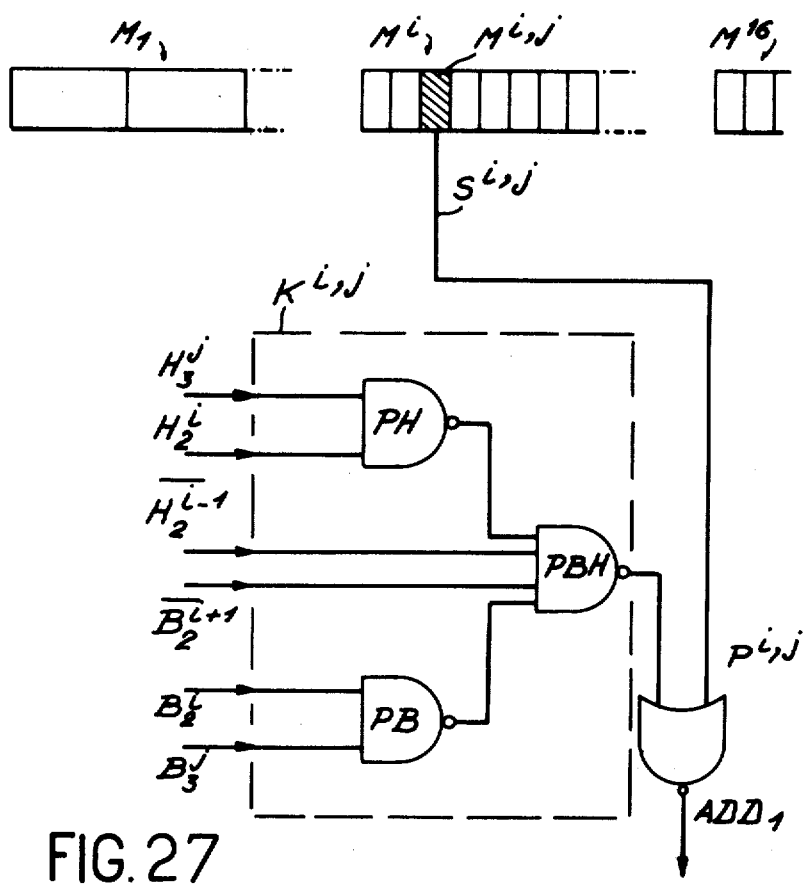
Figure 28:
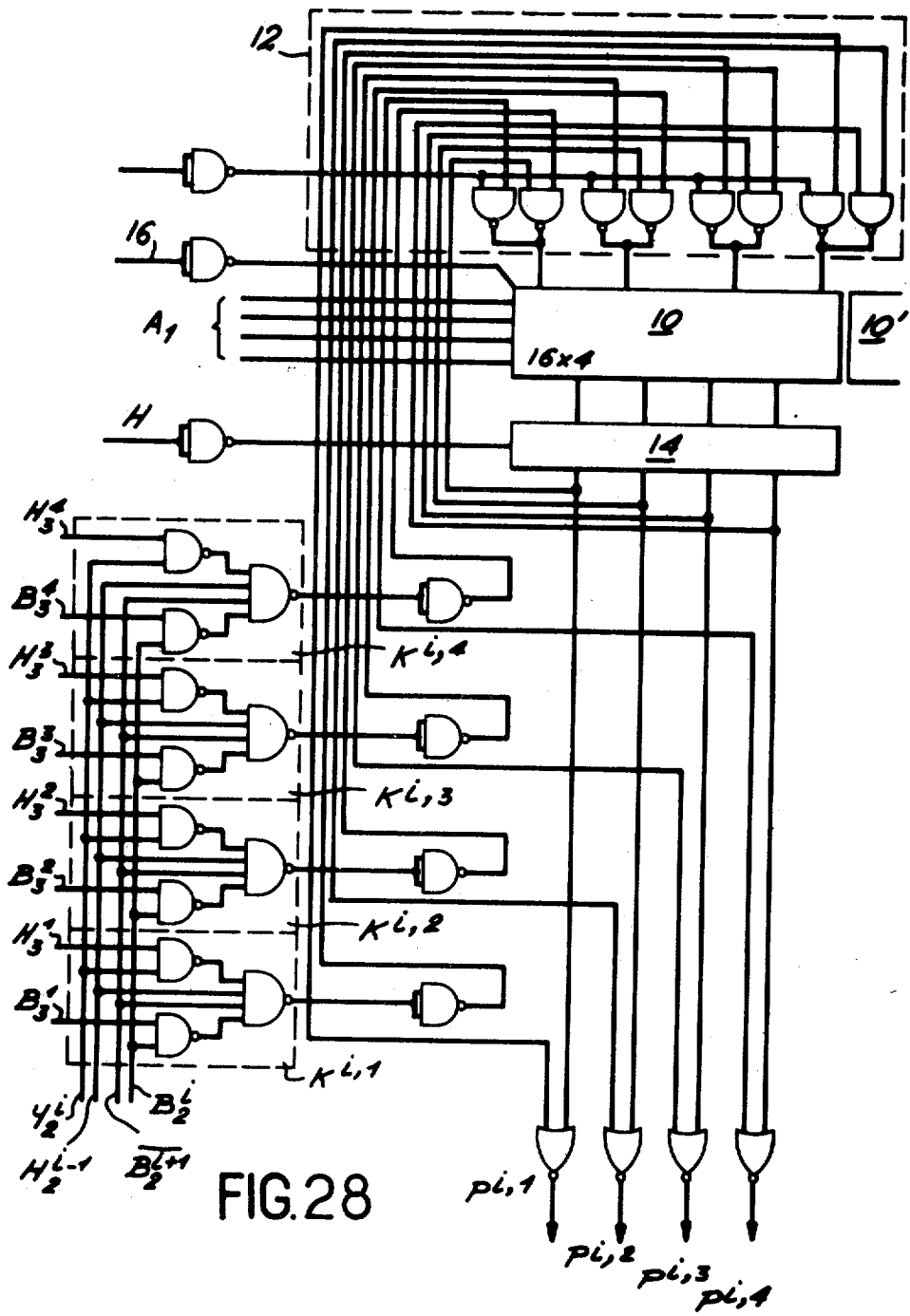
Figure 29:
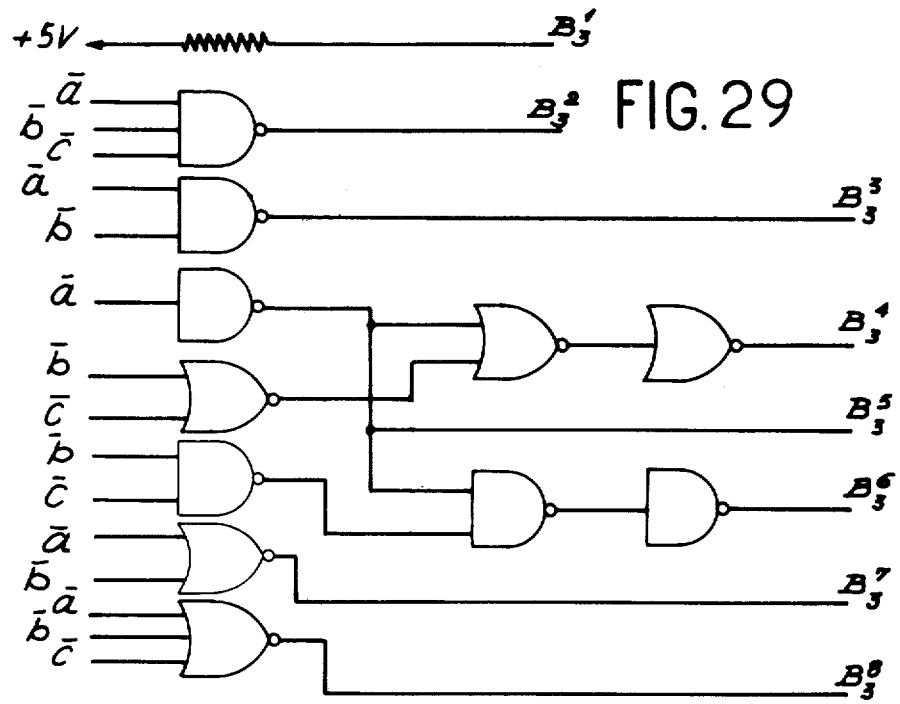
Figure 30:
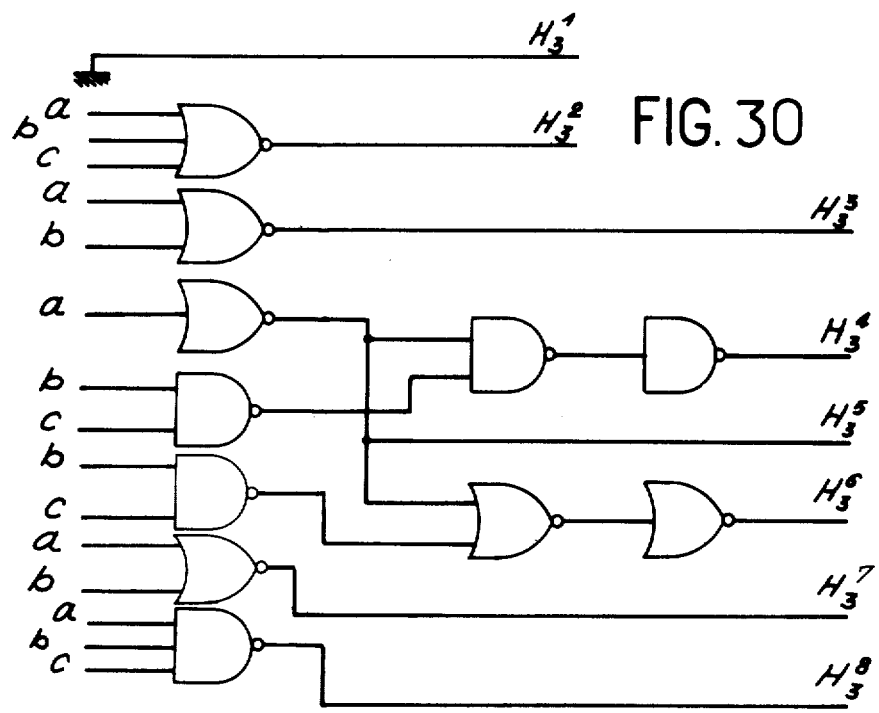
Figure 31:
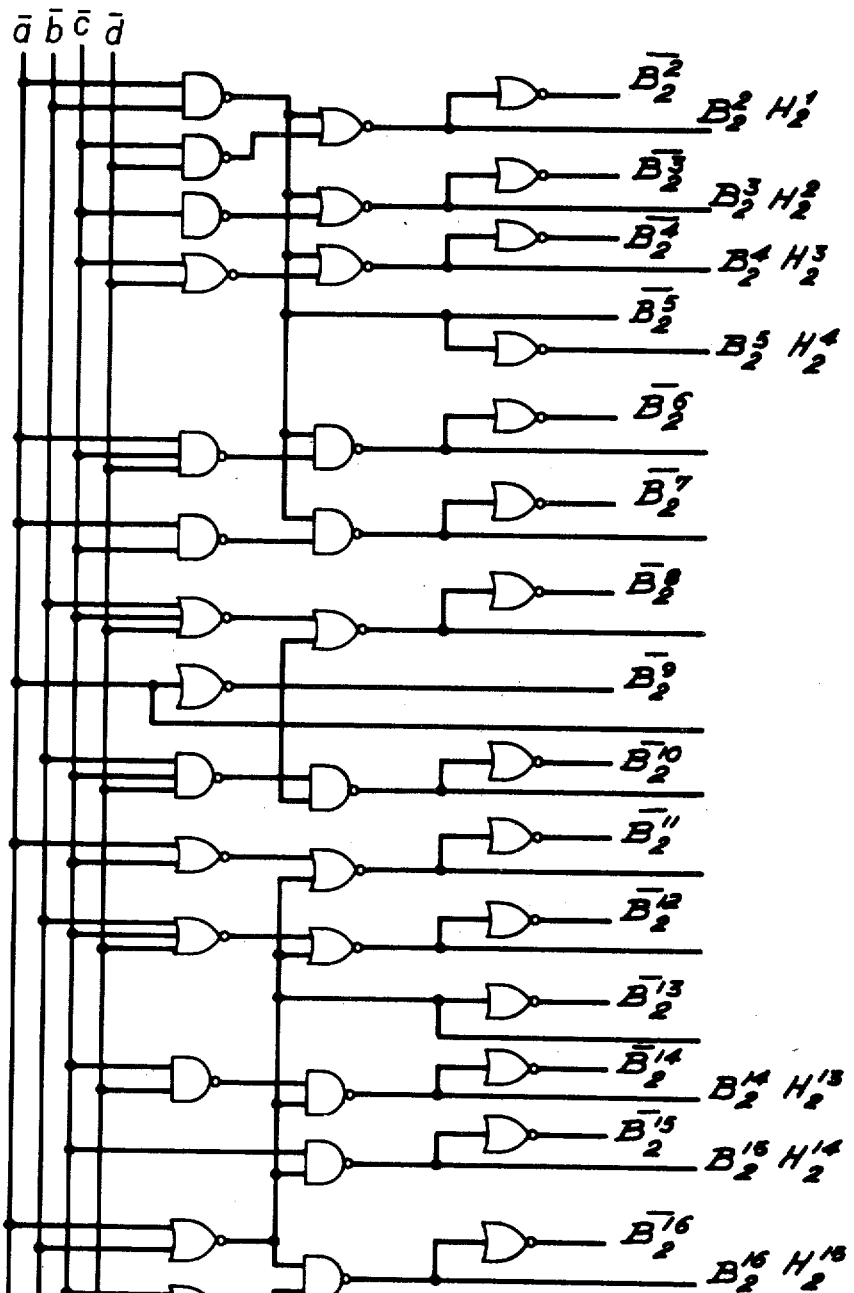
Figure 32:
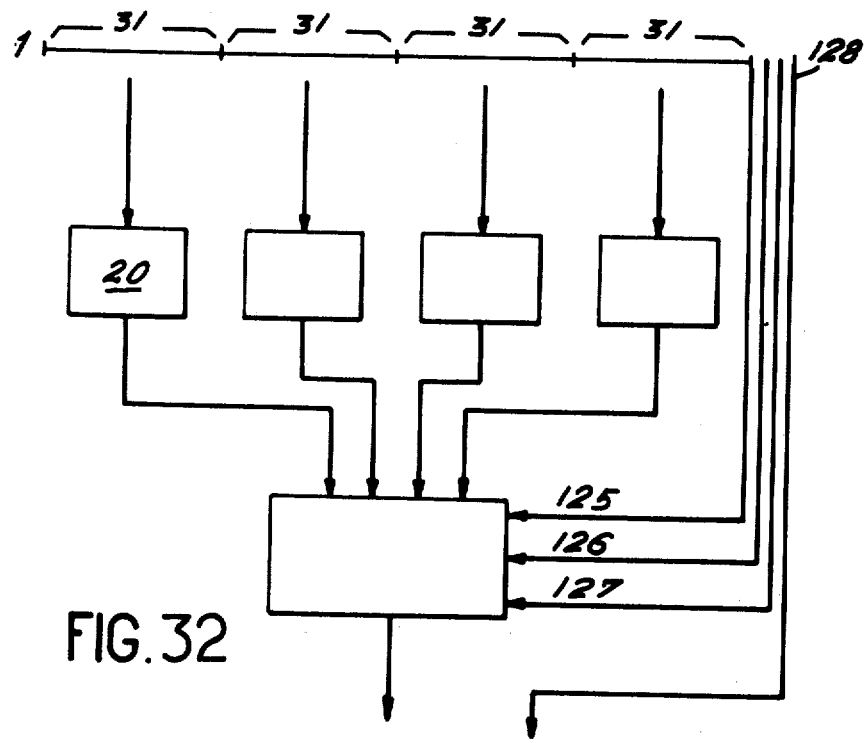
Figure 33:
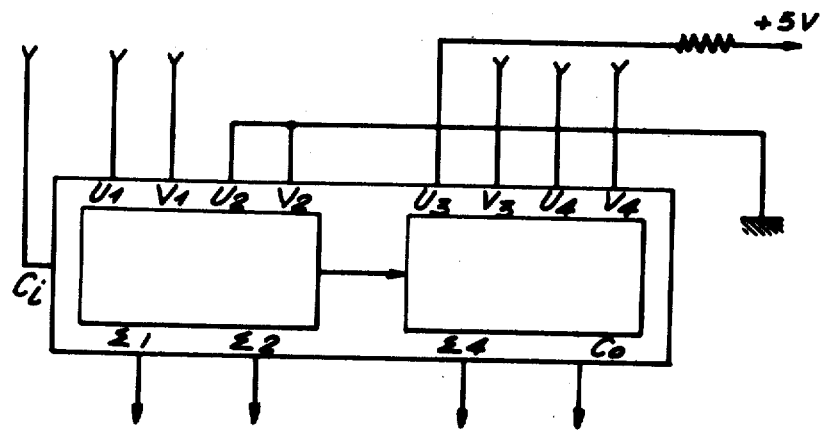
Figure 34:
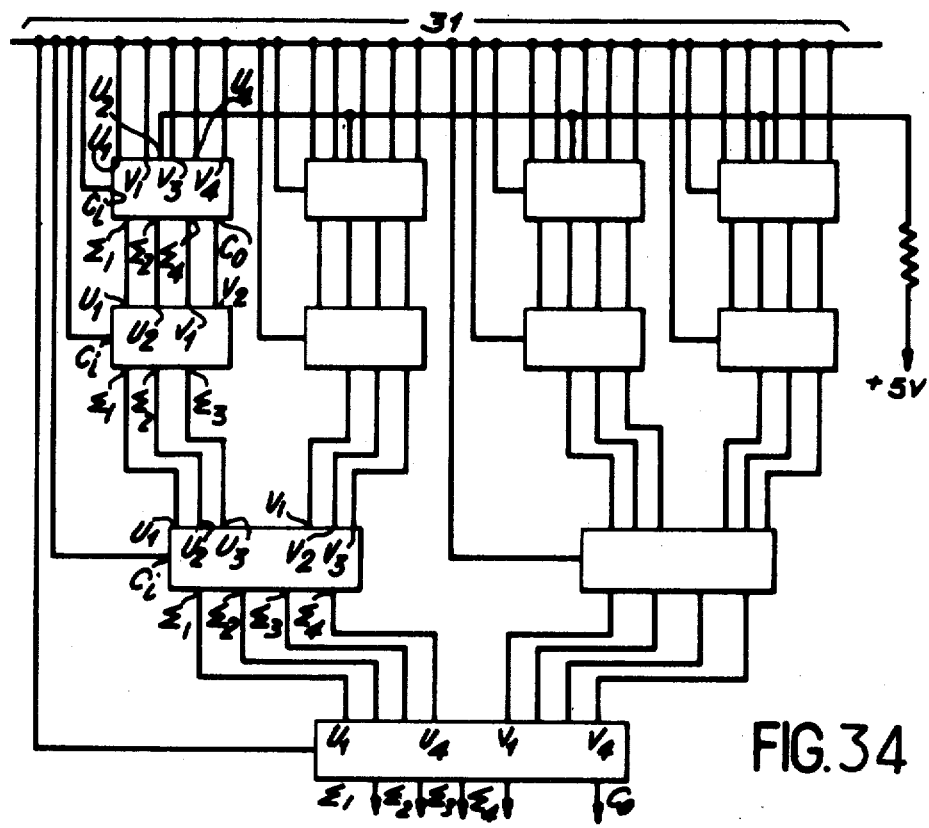
Figure 35:
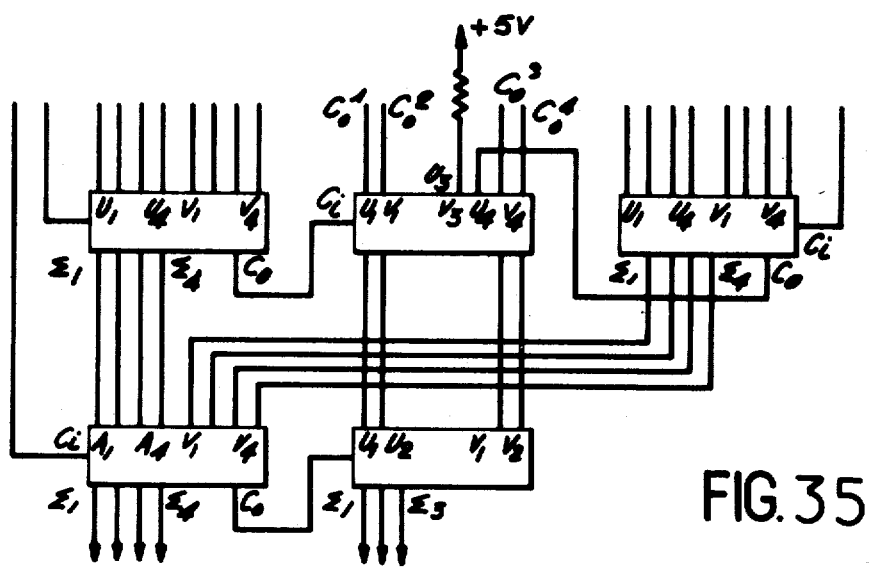
Figure 36:
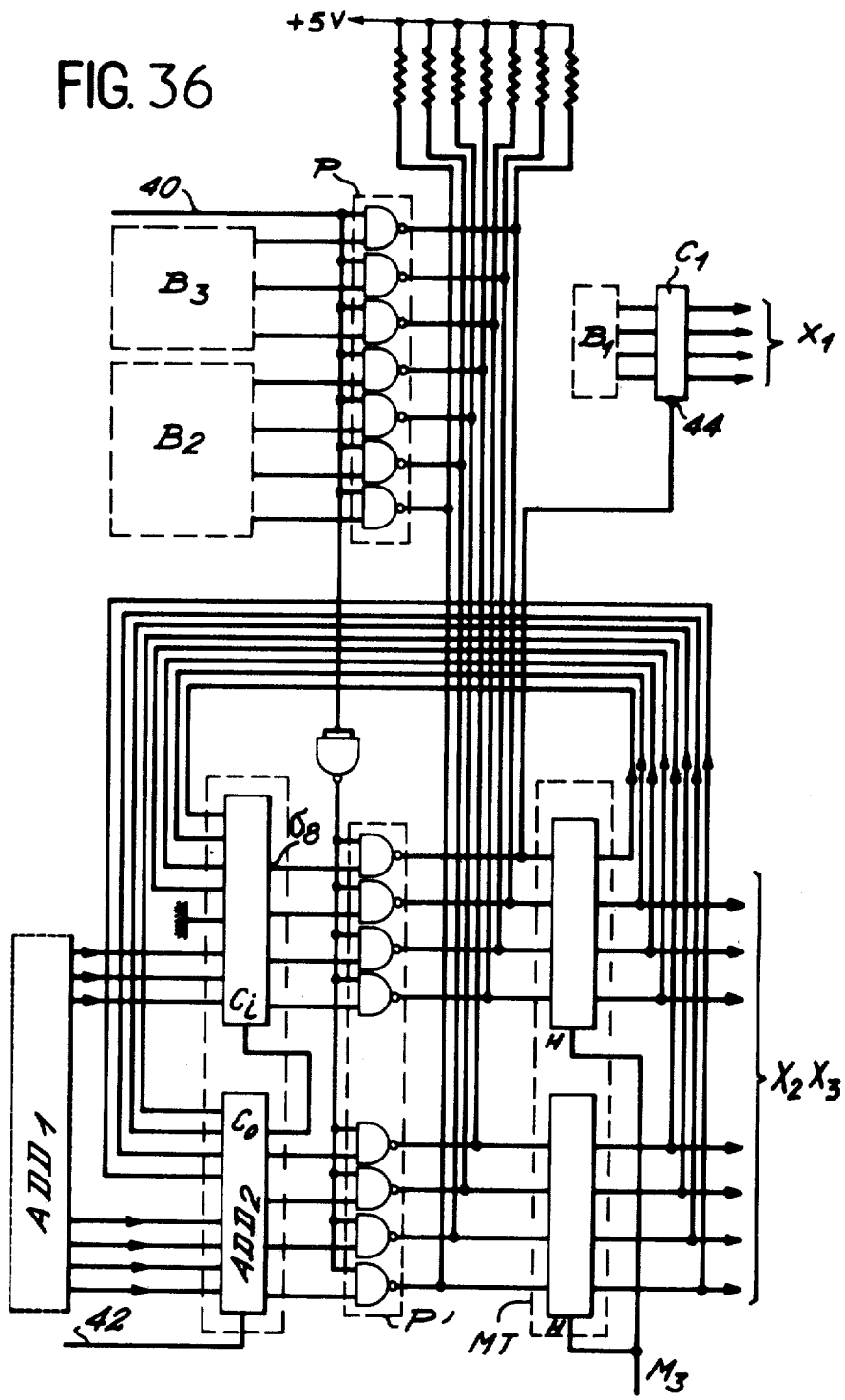
Figure 37:
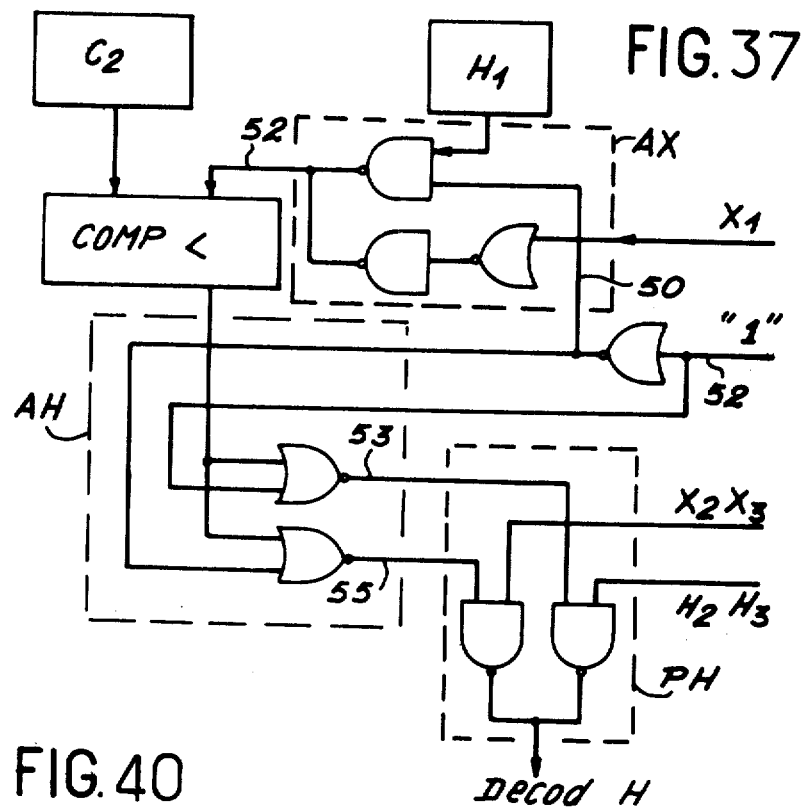
Figure 40:
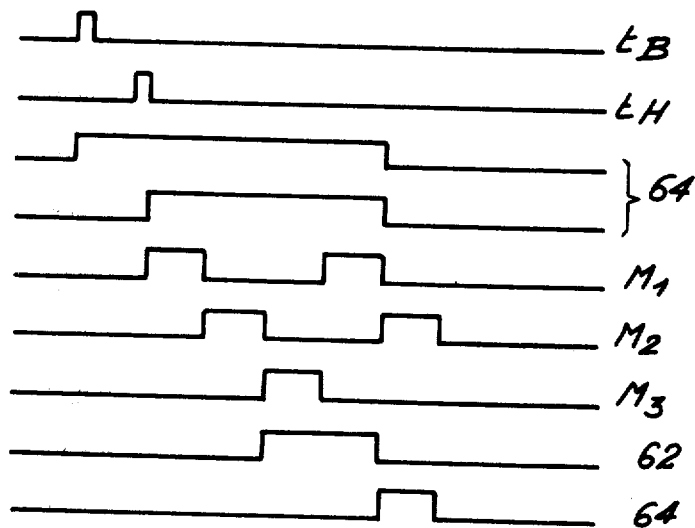
Figure 39:
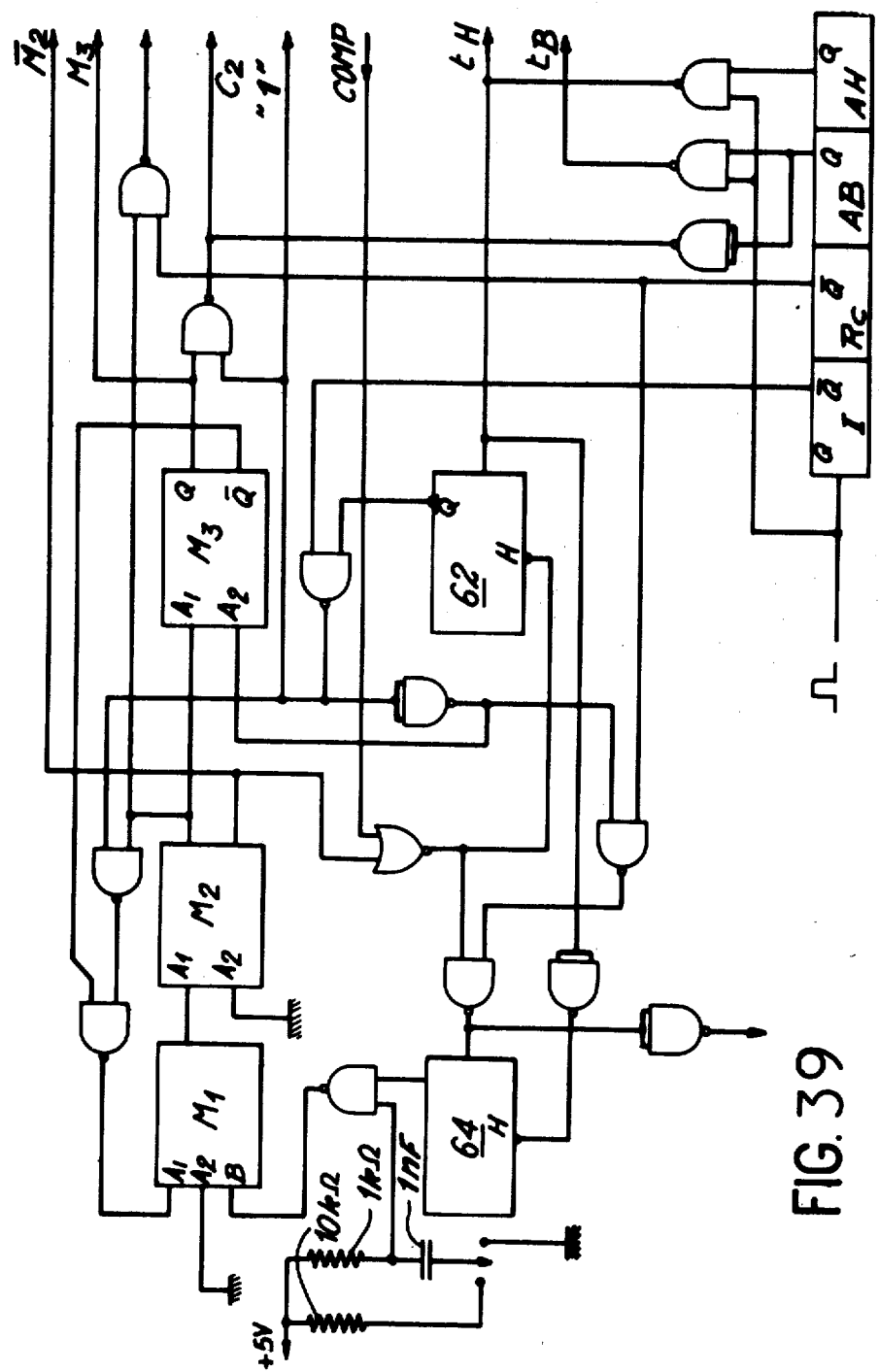

FIG. 17 defines the lines of the general addressing unit on the control unit side;

FIGS. 18A, 18B, 18C specify the set of orders given to the control unit;

FIG. 19 shows a diagram of the control unit;

FIG. 20 schematically shows the optimizer interfaces;

FIG. 21 shows the configuration of a basic shelf;

FIG. 22 shows the general configuration of the optimizer cabinet;

FIG. 23 shows the block diagram of the optimizer in its second realization variant embodiment, all of the following figures referring to this second variant;

FIG. 24 shows an example of the organization of the memory used in the optimizer;

FIG. 25 is a block diagram of the means allowing the selecting of the memory locations situated in the interval ]B, H];

FIG. 26 is an explicatory diagram which allows the specifying of the manner in which the said interval ]B, H] is selected;

FIG. 27 shows a logic circuit, K, allowing the enabling of the appropriate outputs of the memory location;

FIG. 28 shows a memory half card and its output enabling logic circuits;

FIG. 29 shows a three bit lower address decoder;

FIG. 30 shows a three bit upper address decoder;

FIG. 31 shows a four bit lower address or upper address decoder;

FIG. 32 shows a block diagram of the adder;

FIG. 33 shows part of the adder circuit;

FIG. 34 shows the manner in which the aforesaid partial circuits are grouped in the adder;

FIG. 35 shows the output of the adder;

FIG. 36 shows the output of the control integrator;

FIG. 37 shows a part of the control circuit allowing comparison between the upper and lower addresses;

FIG. 38 shows the general control circuit;

FIG. 39 shows the schematic of the sequencer circuits;

FIG. 40 is a phase diagram illustrating the operation of the sequencer of the preceding figure.

As has been indicated above, a system of $n$ variables can always be symbolically represented by the points of a space with $n$ dimensions, each associated with one variable. For simplicity it will be assumed in the following that the system for which an optimum development is being sought is a two variable system, its possible states being represented by the points of a plane. The distribution of the points of this plane can take on several forms, as is illustrated by FIGS. 1 and 2.

Figure 1:
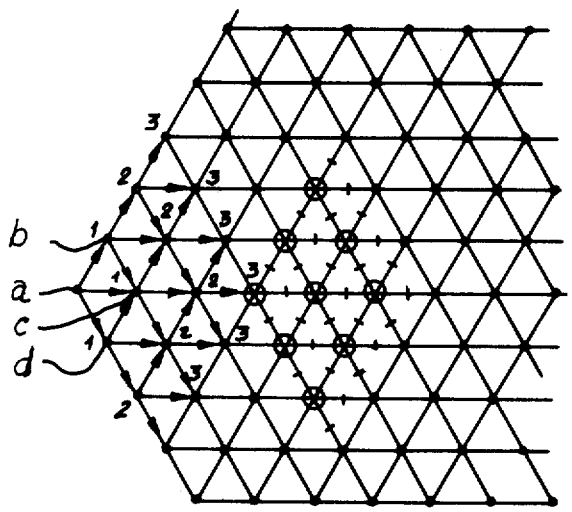
FIG. 1 illustrates a plane space representative of a two variable system.

In the plane shown on FIG. 1, the representative points occupy the summits of the equilateral triangles. The dummy wave which simulates the development of the contents of the memory elements of the optimizer propagate from point to point following the arrows. The lengths of the paths between the points are such that ab = ac = ad. The circled points represent the system forbidden states which do not propagate the wave and the paths which have their outlets barred. The letters associated with each point represent the number of steps performed from the starting point supposed to be at $a$. In this case the wave front is parallelipipedic.

Figure 2:
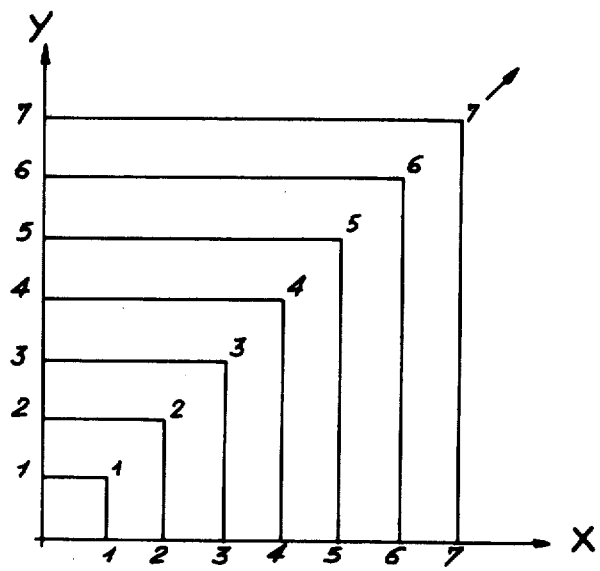
FIG. 2 illustrates a plane representation in which the wave front is rectangular.

On FIG. 2, the wave front is rectangular and the path over the axes X and Y between two consecutive points is equal to the path along the diagonal. In the following, for simplicity the representative plane has two rectangular axes as shown in FIG. 2.

Figure 3:
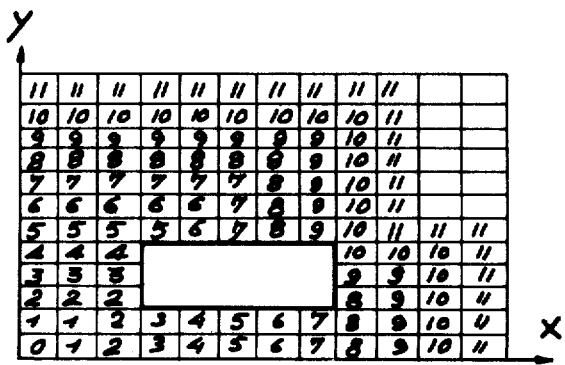
FIG. 3 represents an example of constraints and illustrates the disturbance which results for a fictitious exploration wave.

A zone of constraints defined by a set of forbidden points which do not propagate the wave are shown on FIG. 3, (for the example, this constraint is rectangular). The figures in the pockets again indicate the number of steps performed from the starting point of the wave situated at the intersection of the axes X and Y and allow the wave front to be represented, in particular after the constraint.

Figure 4:
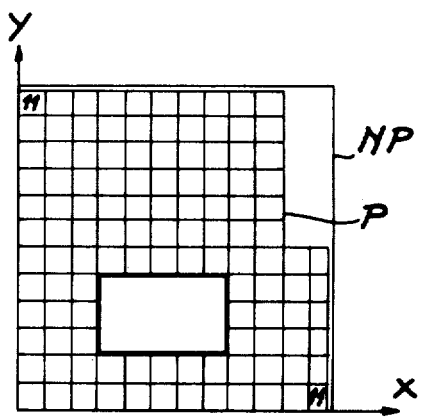
FIG. 4 shows the difference between a non-disturbed wave front and a wave front disturbed by a constraint.

When the plane contains only one constraint, FIG. 4 illustrates the difference between the wave front NP which is not disturbed and the disturbed wave front P behind a constraint.

Figure 5:
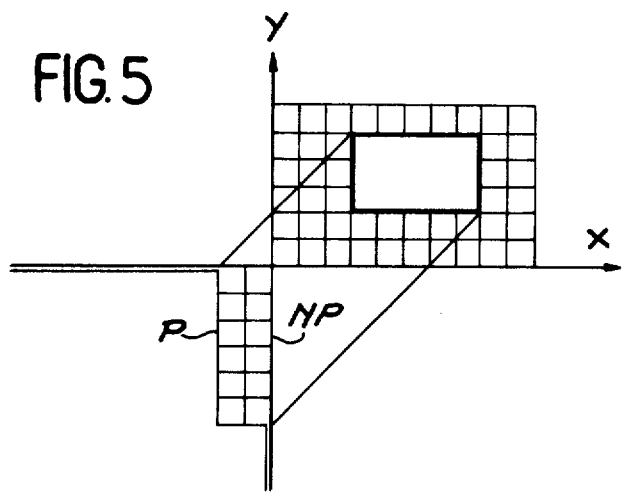
FIG. 5 illustrates a geometric construction facilitating the determination of the disturbed wave front when a constraint is specified.
Figure 9:
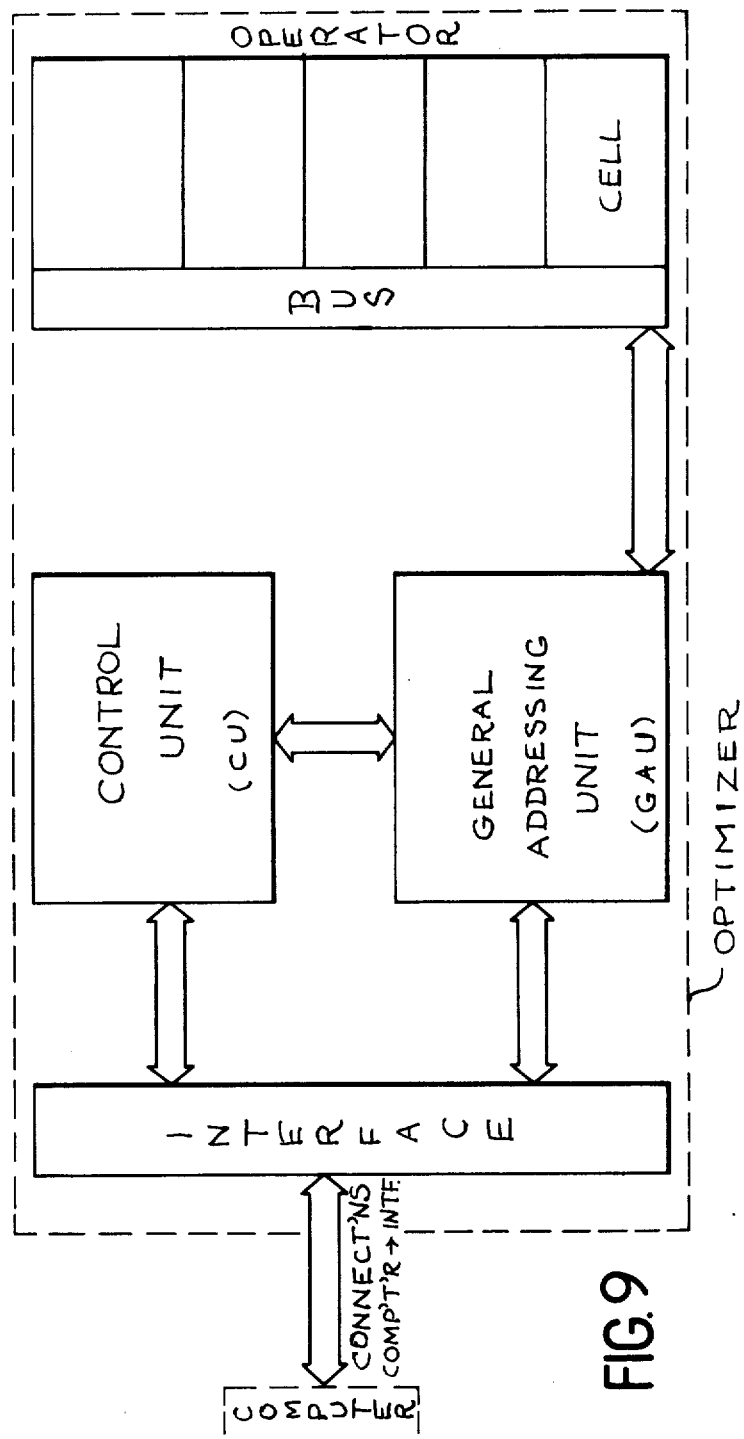
FIG. 9 shows a block diagram of the optimizer.

The geometric determining of the disturbed wave front can be made simply, as it is indicated on FIG. 5, by projecting the constraint on the initial non-disturbed wave front NP, which defines the two intersection points from which one can trace the disturbed wave front P.

Certain constraints cannot disturb the wave front, as with constraint 2 of FIG. 6, for no cut can be envisaged in the right-hand part of the wave front.

FIG. 7 illustrates the elementary decision to take as a function of the lengths or moduli of the three paths terminating with the three points prior to the arrival point. The starting point for the wave (which in fact represents the final state of the system since the wave is backward) carries the reference D and the arrival point (which represents the system initial state) carries the reference A. The three prior points of A are the points A', A'' and A'''. The modulus of the path terminating with A'' is for example equal to 14.

The prior point (or possibly the prior points), for which the modulus is minimum, determines the first elementary action to submit the system to. In the case of FIG. 7, the smallest of the three moduli is equal to 14, and one finds this modulus for the points A'' and A'''. The first elementary action will therefore be to transfer the system from the initial state represented by the arrival point A and the state represented by the prior point A'', or, that with is equivalent in the particular case of FIG. 7, the state represented by point A'''.

The point A'' (or A''') is then taken as the new wave arrival point and a new set of operations allows the second elementary action to be found starting from the state represented by the point A'' in a direction of the following state.

By successive approximation, all of the elementary actions, the set of which form the optimum passage from the initial state to the final state are thus found.

All of these considerations on the search for elementary optimum actions in a plane are to a large part valid for the procedures of the prior art described in the documents cited above. The optimizer of the invention is now going to be described by its essential characteristics, with the aid of FIG. 8 and table I.

The optimizer includes a number P ≤ 2N of cells. By way of example an optimizer including 18 cells will be considered, which is sufficient to treat the problem of FIG. 8.

Each of the 18 cells is referenced by an address, called diagonal address, the addresses being numbered from 0 to 17. The cells can then be considered as being allocated to each of one of the 18 diagonals of the representative plane.

Means are provided for setting in the said cells of a content initially equal to 0 for the cells the addresses of which go from 0 to 11 inclusive and contents equal to 1, 2, 3 . . . 6 respectively for the cells of which the addresses go from 12 to 17. These initial contents represent the shifting of the wave front at the start, with respect to a wave of which the front is linear.

Each constraint is specified, in the appropriate means by two numbers, the one called upper diagonal address denoted H, corresponding in the representative plane to the constraint situated on the highest diagonal of the plane (i.e. the highest on any vertical line) and the other called lower diagonal address and denoted B, corresponding to the constraint of the point situated on the lowest diagonal of the plane meeting the constraint.

For example, the left lower constraint of FIG. 8 has H = 13 and B = 8 for its address. The contents of a cell of address X is symbolically noted (X). Possibly, the highest point (or lowest point) could be specified by its coordinates X and Y, the optimizer then deducing the corresponding diagonal address.

In order increment the content of each cell as a function of the addresses B and H of the processed constraint, according to the invention the optimizer includes means for:

a. - maintaining unchanged the contents of the cells of which the addresses are included between 1 and B, B inclusive, b. - transferring the contents of the cell with address B + 1 to (B) + 1, wherein (B) designates the contents of the cell of address B before processing, and to transfer to (B) + 2 the contents of the cell of address B + 2 and so on, c. - comparing the contents of each cell with the content (H) of the cell of address H, d. - determines the intermediate cell for which the new content becomes equal to (H), e. - maintaining the contents of the cells from the said intermediate cell up to the cell with address H at this value (H), f. - maintaining unchanged the contents of the cells of which the addresses go from H + 1 to P = 17.

The result of this processing is illustrated by table I in which: the first column gives the set of the first 18 cell addresses, the second column indicates the initial numeric content of the 18 cells, the following columns the addresses H and B of the constraints of FIG. 8 and the contents (H) and (B) of these cells having as addresses those of the constraints before the processing of the said constraint. These contents are ringed by a circle in the columns representing the cell contents. Table I then shows the contents of the cells after processing of the constraint. These contents show, as well as was shown by the previous geometric explanation, the delay of the disturbed wave front with respect to a dummy front which is not disturbed.

Thus, constraint n° 1 has as address H = 13 and B = 8. Before the processing of constraint n° 1 by the optimizer, the contents of the cell of address 13 is (H) = 2 and the contents of the cell of address 8 is (B) = 0. Column I shows the effect of processing of constraint No. 1. Starting from B and its contents (B), one ascends in the direction of H by incrementing (B) by 1 at each step until (H) is reached (ceil 10), then incrementing the intervening cells up to H to (H). The contents of cells H and higher are maintained unchanged.

Constraint n° 2 has for diagonal addresses H = 16 and B = 12, the contents of these cells having these addresses are now (Column I of table) respectively (H) = 5 and (B) = 2. Column II shows the effect of processing constraint No. 2 beginning with the results (column I) of processing constraint No. 2. Starting from B and its contents (B), one ascends in the direction of H by incrementing (B) by 1 at each step. At address 13, one therefore has 3, at address 14, one finds 4. At address 15, the obtained value which is 5, is equal to the contents of address 16. Consequently, the values which are above address 15 up to H = 16 are equal to 5.

... n times larger than that of the block, the operation for one constraint is performed 2, 3 ... n times. The choice of block dimension is an optimal function of the speed, of cost, of the capacity and depends upon the problem to process. This point will later be described in detail.

In the purely explanatory description which follows, the dimension of the operator is set at 256.

TABLE I

| Diag. No. | Start | CONSTRAINTS | | | | | | | |
|---|---|---|---|---|---|---|---|---|---|
| | | No. 1 | I | No. 2 | II | No. 3 | III | No. 4 | IV |
| 17 | 6 | | 6 | | 6 | | 6 | | 6 |
| 16 | 5 | | ⑤ | | 5 ↑ | | 5 | | 5 |
| 15 | 4 | | 4 | | 5 | | 5 | | 5 |
| 14 | 3 | | 3 | | 4 | | 4 | | 4 |
| 13 | ② | H=13 | 2 ↑ | H=16 | 3 | H=9 | 3 | H=12 | 3 |
| 12 | 1 | | ② | | 2 | | ② | | 2 ↑ |
| 11 | 0 | B= 8 | 2 | B=12 | 2 | B=4 | 2 | B= 8 | 2 |
| 10 | 0 | | 2 | | 2 | | 2 | | 2 |
| 9 | 0 | | 1 | | ① | | 1 ↑ | | 2 |
| 8 | ⓪ | (H)= 2 | 0 | (H)= 5 | 0 | (H)=1 | ① | (H)= 2 | 1 ↑ |
| 7 | 0 | | 0 | | 0 | | 1 | | 1 |
| 6 | 0 | (B)= 0 | 0 | (B)= 2 | 0 | (B)=0 | 1 | (B)= 1 | 1 |
| 5 | 0 | | 0 | | 0 | | 1 | | 1 |
| 4 | 0 | | 0 | | ⓪ | | 0 ↑ | | 0 |
| 3 | 0 | | 0 | | 0 | | 0 | | 0 |
| 2 | 0 | | 0 | | 0 | | 0 | | 0 |
| 1 | 0 | | 0 | | 0 | | 0 | | 0 |
| 0 | 0 | | 0 | | 0 | | 0 | | 0 |

The cell contents after processing all of the constraints is then equal to the delay, expressed in the number of steps, between the disturbed wave front and the nondisturbed wave front. Referring now to FIG. 7 rather than to FIG. 8, to obtain the modulus of the path terminating on point A" for example, it is sufficient to add to the maximum modulus of the space (in this particular case of FIG. 7, this maximum modulus is equal to 11), the difference δ found on the diagonal of point A", which is to say the final content of the cell having the address of A" (on FIG. 7, this difference is equal to 3). One then finds a modulus (or number of steps) between D and A" equal to 11 + 3 = 14.

Another method consists of taking the dimension of the space following the X axis (in the case of FIG. 7, this dimension is equal to 10) and to add the projection of the difference following this same axis (in the case of FIG. 7, this projection is equal to 4). One can also use the Y axis in the same manner. The differences δ following the diagonal, δX and δY, are shown in the lower left-hand part of FIG. 7.

In the rest of the description, purely for reasons of explanation, the X axis will be taken as the base, the projection of the DELTA differences on this axis will then be designated by DELTA X.

Starting from the preceding general principles, one can see that the optimizer includes a group of computation cells referenced by addresses. This group of cells is called : operator. The dimensioning of the operator depends upon the complexity of the system to study, or, which returns to the same thing, the number N, of possible variable values. If one wished to simulate a space of 1000 × 1000, the operator would include a maximum of 2000 elements, whereas a machine of the prior art would necessitate 1,000,000.

But in one variant of the operator of the invention, one can split this into blocks. If the constraint to process is of small dimension (less than those of the block), the operation on the wave front is performed only once. On the other hand, if the constraint is 2, 3 .

The optimizer of the invention therefore includes:

A. - the said operator composed of the P = 256 computation and memorization cells,
B. - an interface between the said operator and a computer,
C. - a control unit, UC, which gives the sequence of operator orders,
D. - a general addressing unit, UAG, which interprets the orders and the data for the operator and which in particular contains the means for reading the contents of the cell of which the address is that of the upper address H of the process constraint and transmits the result over a comparator-bus and means to make the subtraction of the lower address B of the constraint less the contents of the cell of the same address and transmit the result over an operator-bus.

In a preferred embodiment, the optimizer is characterized in that each diagonal address of $n$ bits is decomposed into a base address part made up by the $n'$ least significant bits and a displacement part composed of a wired-in word composed of the $n-n'$ least significant bits. In this case, and conforming to that which is illustrated in FIG. 10, each operator cell includes:

a. - a two input multiplexer, designated MPX', of $n'$ bits, the inputs of which respectively receive the words of the $n'$ bits of the base address and base address + 1, b. - a direct access main memory, (in Anglo-Saxon terminology: Random Access Memory) noted RAM, of $p = 2^{n'}$ bits, which memorizes the successive contents of the cell after each constraint is processed, a memory which is controlled by one enabling line and which is addressed by the word of $n'$ coming from the MPX' multiplexer, the output of the said memory being organised in a bus designated as the RAM output bus, c. - an adder-subtractor, designated ADD, receiving on one hand the address of the cell constituted by the said wired-in word of $(n-n')$ bits and by the word of n' bits coming from the MPX' multiplexer and on the other hand the word of n bits transmitted by the said operator-bus, d. - a comparator, designated COMP, of n bits, which receives the word of n bits coming from the adder-subtractor ADD and a word of n bits transmitted by the said comparator-bus, e. - a multiplexer, MPX with two inputs and of n bits, receiving the word coming from the adder-subtractor ADD and the word transmitted over the said comparator-bus, the said multiplexer MPX being controlled by the output of the comparator COMP, the output of MPX transmitting a word of n bits towards the memory RAM.

Figure 10:
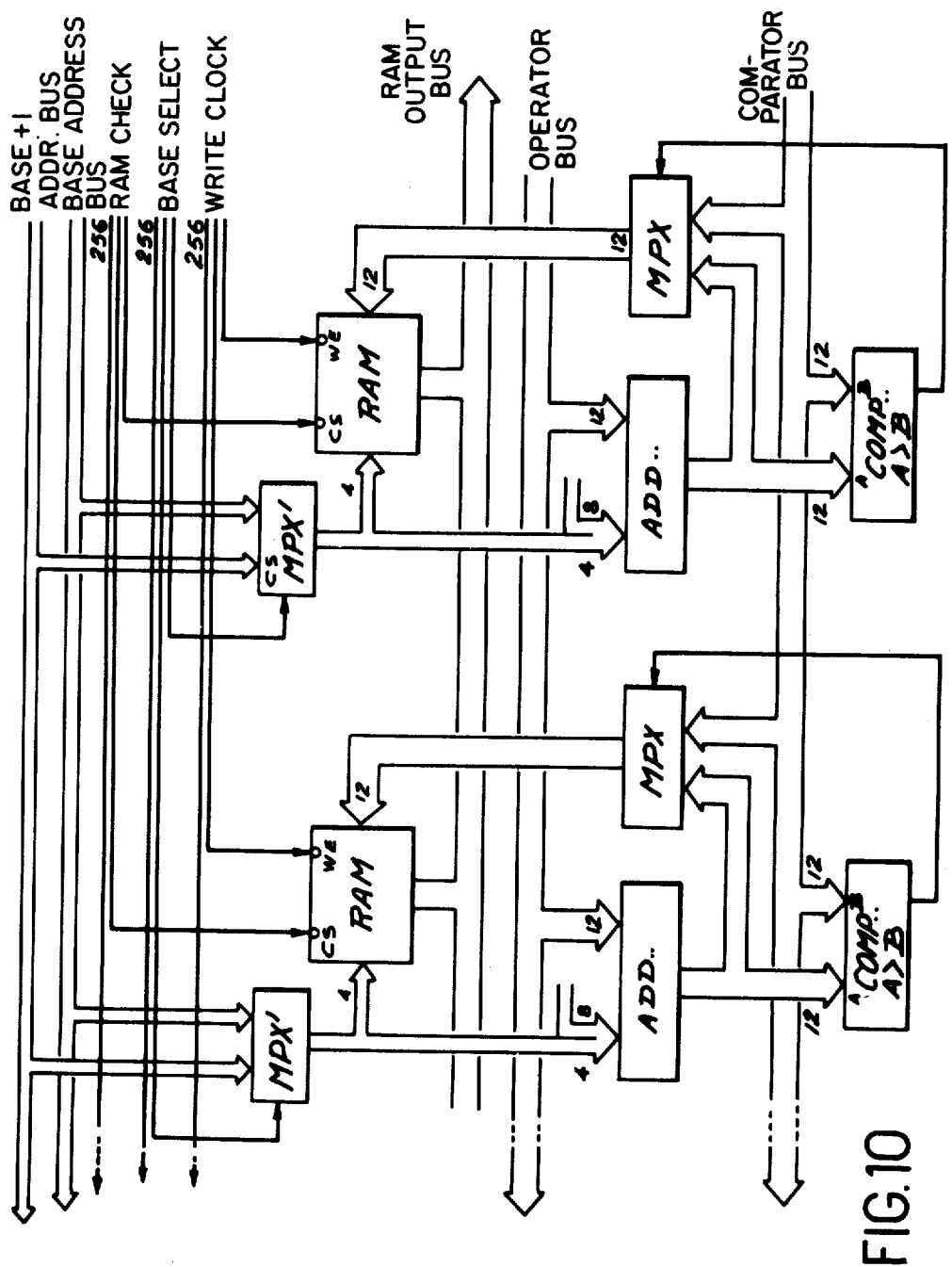
FIG. 10 shows the organization of the chain of P cells of the operator in the case of the first variant.

To describe this organisation of the chain of cells, purely for example and in no way limiting, when the operator is of $2^{12} = 4096$ steps, one could place 12 bits if in binary code, conforming to FIG. 10.

On FIG. 10, which shows two cells, the number of bits of the various elements is indicated at the appropriate points.

The RAM is addressed by a 4 bit word coming either from the base-address-bus, or from the base + 1-address-bus with the aid of the base multiplexer.

The RAM memories can be selected individually by enabling or be controlled in parallel.

The RAM output is structured in a bus.

For operand the adder has the address of the cell. This address is composed of a wired-in word for the 8 least significant bits and a 4 bit word coming from the base multiplexer for the most significant bits.

Its operator comes from the general addressing unit UAG via the intermediary of the operator bus.

The comparator COMP receives the result of the adder ADD and data coming from the comparator bus. The result of the comparison allows the control of the 12 bit multiplexer MPX which switches towards the RAM, either the adder output or the data which is found on the comparison bus.

The operation of this chain is as follows. The diagonals B and H being defined, first of all one searches for the content (H) of the upper address. The result after addressing all of the RAM is found on the RAM output bus. This information comes only from a single RAM addressed by the base-address as well as being enabled. The data thus supplied serves as the comparison element on the comparator bus. Then it is compared to the content of the lower address to be used by the addressing unit UAG. The addressing unit UAG makes the subtraction lower address less its contents and transmits the result over the operator bus. The adders-subtractors ADD then give the difference for each element following the operation below, with the already defined conventions.

Element address - (B - (B)).

This difference is compared with the content (H) of the upper address. If this element is greater, the 12 bit multiplexer enables transmission of the contents of the upper address towards the RAM. If not, it enables transmission of the output of the adder.

As a function of the value of the two upper and lower addresses, the addressing unit UAG selects the elements of the RAM which must be modified.

A particular case is now described which is that where the dimension P of the operator, freely chosen to be small, can be less than the dimension of a very large constraint. In the preceding example, it would therefore be a constraint of which the dimension is greater than 256. The processing is performed several times by incrementing the base-address and the base + 1-address one by one. The addressing unit UAG indicates the number of iterations to the control unit. Consequently the control unit UC then gives the orders.

Figure 11:
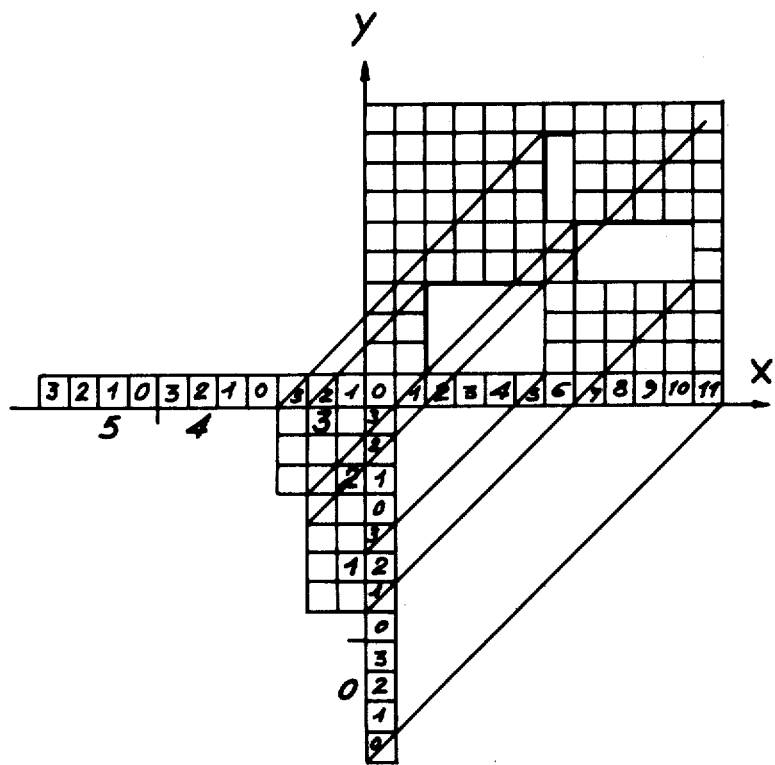
FIG. 11 illustrates, in the particular case of four cells, the iterations performed to process a constraint of which the dimension exceeds the number of cells.

An example of such iteration is illustrated by tables II to V for constraints such as those which are shown on FIG. 11 and in a simplified case by way of illustration where it uses only four cells.

In tables II to V, the horizontal references represent the displacement part of the address, and the vertical references the base part. Each column represents one RAM. Each RAM is associated with an adder, a comparator and multiplexer.

Table II shows the situation at the time of initialization.

TABLE II

| Base | Displacement | | | |
|---|---|---|---|---|
| | 0 | 1 | 2 | 3 |
| 0 | 0 | 0 | 0 | 0 |
| 1 | 0 | 0 | 0 | ⓪ |
| 2 | 0 | 0 | 0 | 0 |
| 3 | 0 | 1 | ② | 3 |
| 4 | 4 | 5 | 6 | 7 |
| 5 | 8 | 9 | 10 | 11 |

Table III illustrates the processing of constraint N 1. Table IIIa shows the first iteration. One has H=3,2 and B = 1,3, (see FIG. 11: the base address is separated from the displacement part of the address by the comma.) The maximum value is equal to 2. The second iteration is shown in table IIIb. When this second iteration has ended, the UAG detects the STOP on H.

TABLE III

| IIIa | | | | IIIb | | | |
|---|---|---|---|---|---|---|---|
| 0 | 0 | 0 | 0 | 0 | 0 | 0 | 0 |
| 0 | 0 | 0 | ⓪ | 0 | 0 | 0 | 0 |
| 1 | ② | 2 | 0 | 1 | 2 | 2 | 2 |
| 0 | 1 | 2 | 3 | 2 | 2 | ② | 3 |
| 4 | 5 | 6 | 7 | 4 | 5 | 6 | 7 |
| 8 | 9 | 10 | 11 | 8 | 9 | 10 | 11 |

The processing of constraint N 3 is shown in tables IVa and IVb; table IVa corresponds to H = 2,3 and B = 1,1 with a maximum value of 2 for the first iteration. Table IVb shows the second iteration.

TABLE IV

| IVa | | | | IVb | | | |
|---|---|---|---|---|---|---|---|
| 0 | 0 | 0 | 0 | 0 | 0 | 0 | 0 |
| 0 | ⓪ | 1 | 2 | 0 | 0 | 1 | 2 |
| 2 | 2 | 2 | ② | 2 | 2 | 2 | ② |
| 2 | 2 | 2 | 3 | 2 | 2 | 2 | 3 |
| 4 | 5 | 6 | 7 | 4 | 5 | 6 | 7 |
| 8 | 9 | 10 | 11 | 8 | 9 | 10 | 11 |

The processing of constraint N 3 is shown by tables Va and Vb, for which H = 3,3 B = 2,3 and the maximum value=3.

The arrival point address is 2,3 for which one has δX = 2, X = 11 and X + δX = 13.

TABLE V

| Va | | | | Vb | | | |
|---|---|---|---|---|---|---|---|
| 0 | 0 | 0 | 0 | 0 | 0 | 0 | 0 |
| 0 | 0 | 1 | 2 | 0 | 0 | 1 | 2 |
| 2 | 2 | 2 | 2 | 2 | 2 | ② | 2 |
| 3 | 3 | 3 | 3 | 3 | 3 | 3 | 3 |

TABLE V-continued

| Va | | | | Vb | | | |
|---|---|---|---|---|---|---|---|
| 4 | 5 | 6 | 7 | 4 | 5 | 6 | 7 |
| 8 | 9 | 10 | 11 | 8 | 9 | 10 | 11 |

DESCRIPTION OF THE GENERAL ADDRESSING UNIT

The general addressing unit GAU hereinafter referred to for short as "the UAG" is responsible for interpreting the orders emanating from the control unit UC, in order to suitably control the chain of cells.

The principle roles of the UAG are as follows:
reception of the constraint upper address
simple decoding and loading of the comparator-register
reception of the constraint lower address.
simple decoding and loading of the operator register
parallel decoding of the chain
processing of the constraint up to detection of STOP.

Besides that, at the end of processing a bidimensional space the UAG must successively decode the three DELTA differences corresponding to the three prior points of the arrival point, at the order of the UC. This operation achieved, the UC then triggers the RAM reinitialisation in order to prepare the operator for processing a new space.

Figure 12A:
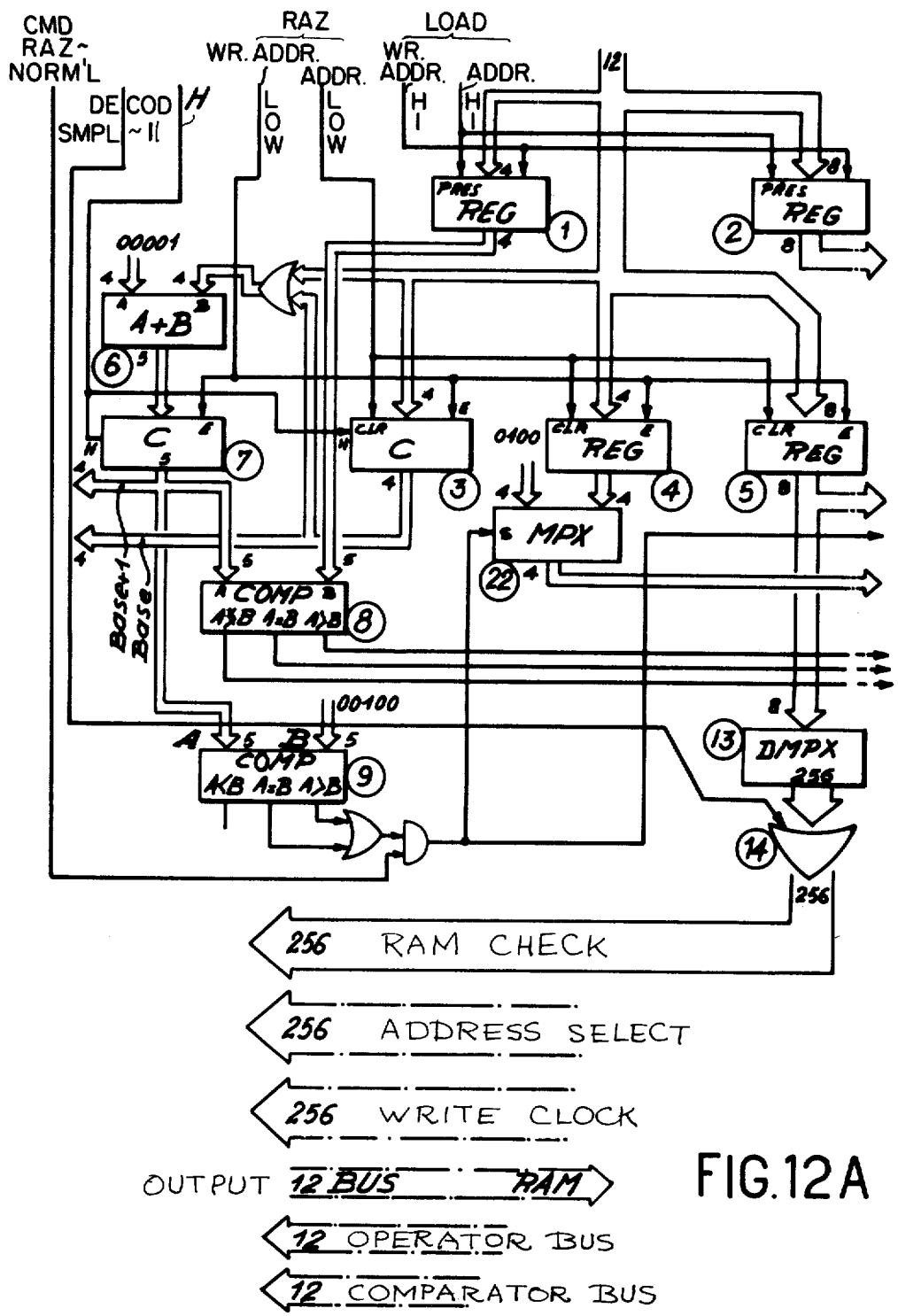
FIGS. 12A, 12B, 12C show the block diagrams of the general addressing unit.
Figure 12B:
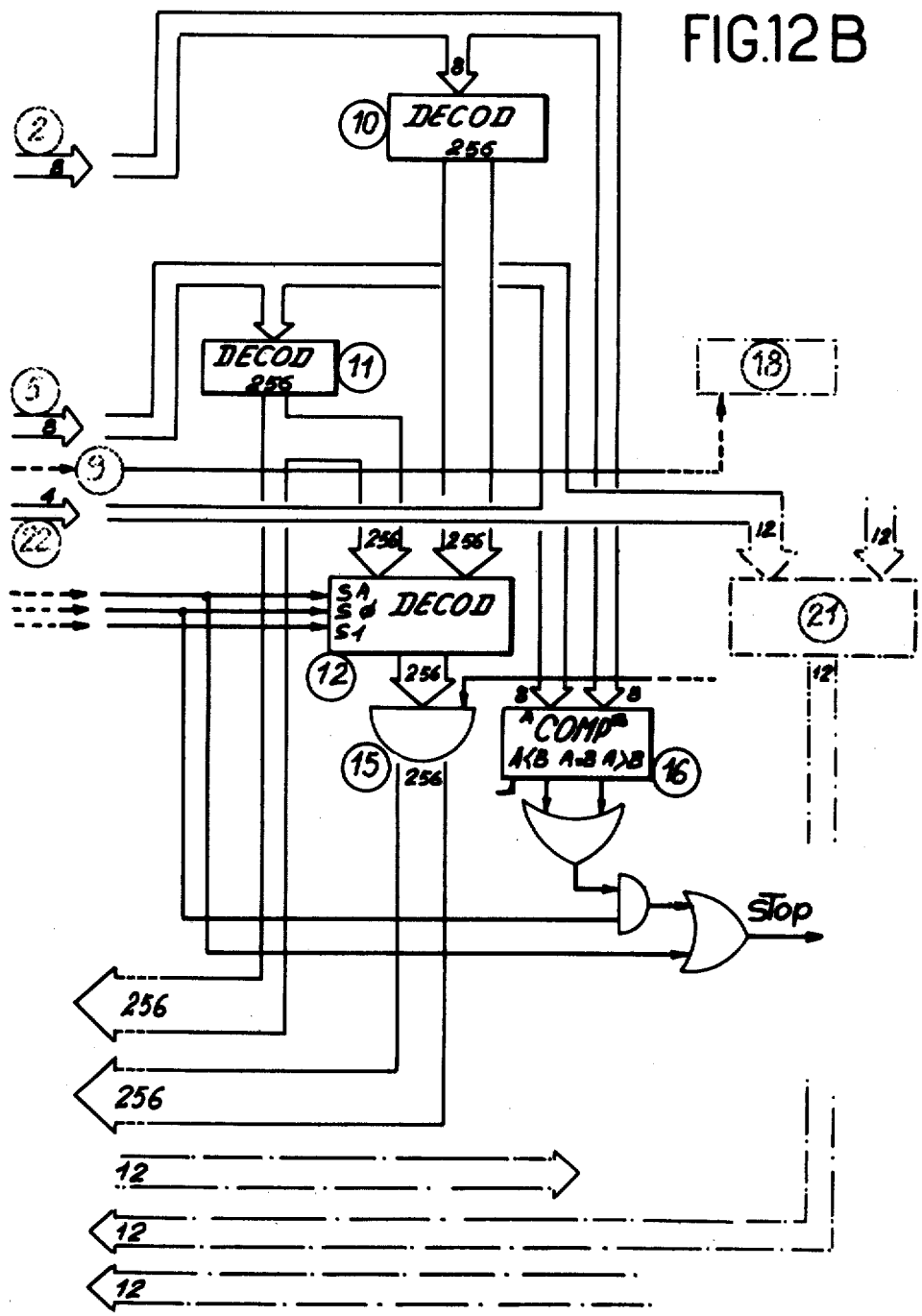
Figure 12C:
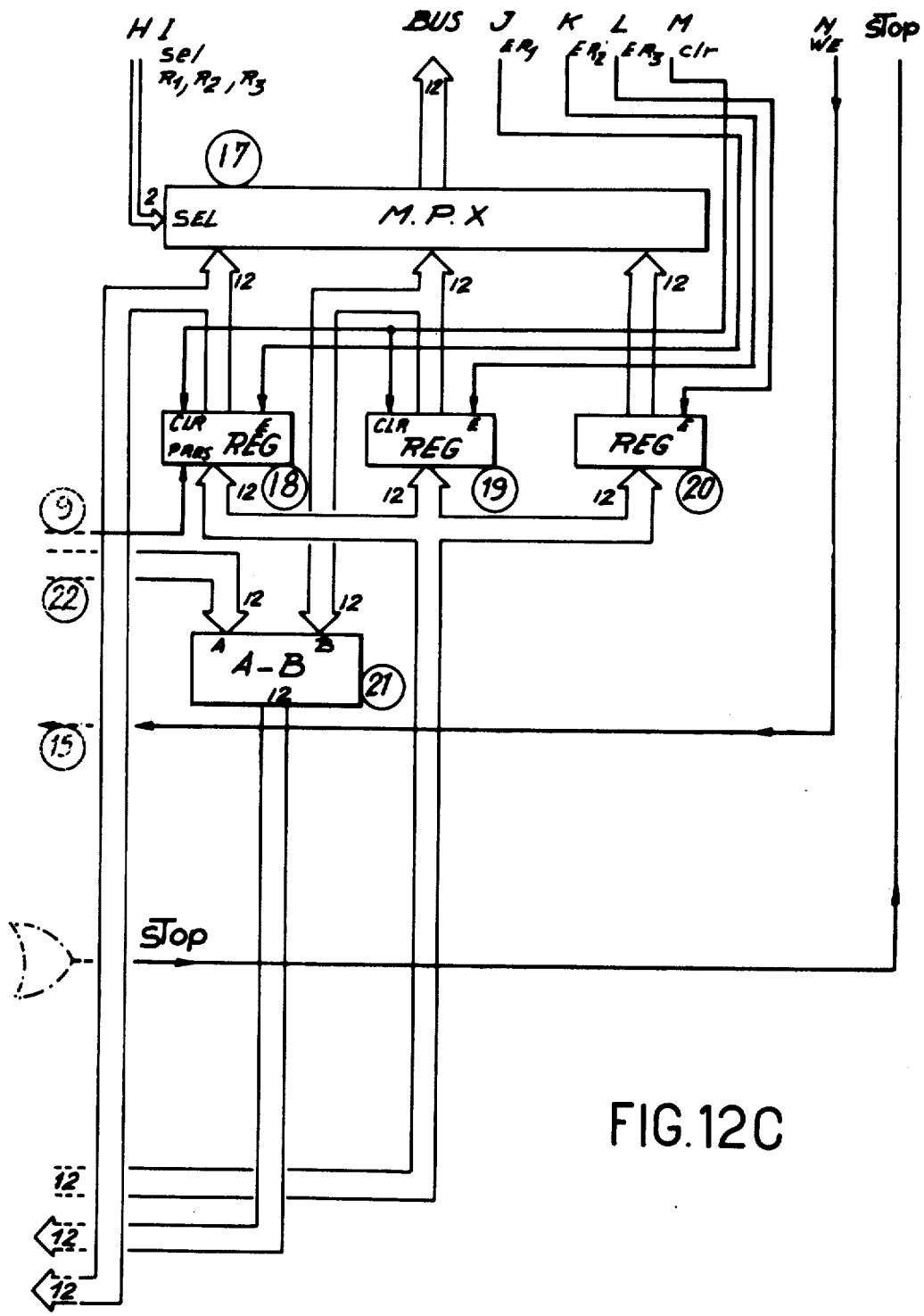

In a more precise fashion and according to FIGS. 12A, 12B and 12C, the UAG includes:

A. - a register REG 1 responsible for storage of the upper address base part, the output of REG 1 being directed towards a comparator COMP 8 which ensures the selection of operation of a decoder DECOD 12 and the detection of a STOP requirement at the OR gate 23, B. - a register REG 2 responsible for storing the displacement part of the upper address, the output of REG 2 being oriented, on one hand towards a decoder DECOD 10 and, on the other hand towards a comparator COMP 16 responsible for one part of the detection of the STOP, C. - a counter C3 and a register REG 4 which receive the base part of the lower address, the output of C3 being connected, via an adder ADD 6, to a counter C7 which contains the base + 1 part of the lower address, the output of C7 being directed towards COMP 8 and towards another comparator COMP 9 serving the reinitialization of the RAM, D. - a register REG 5 which receives the displacement part of the lower address and the output of which is directed towards:
  a. a demultiplexer DMPX 13 responsible for decoding the RAM enabling, the output of this demultiplexer being oriented towards gate OR 14, which provides single or parallel RAM enabling.
  b. a decoder DECOD 11 the output of which serves on one hand for the selection of the RAM base address and, on the other hand, for providing an input to a decoder DECOD 12 the output of which is a write clock for the RAM, which output is controlled by a gate AND 15,
  c. a subtractor SOUS 21 which computes the operator bus contents and which receives on its two inputs: the output of multiplexer MPX 22 and the output of a register REG 19, the output of SOUS 21 comprising the said operator bus,
  d. a comparator COMP 16 responsible for one part of the STOP detection, E. - a register REG 18 which applies the contents of the upper address over the operator bus, F. - a register REG 20 used in a read procedure.

Figure 13:
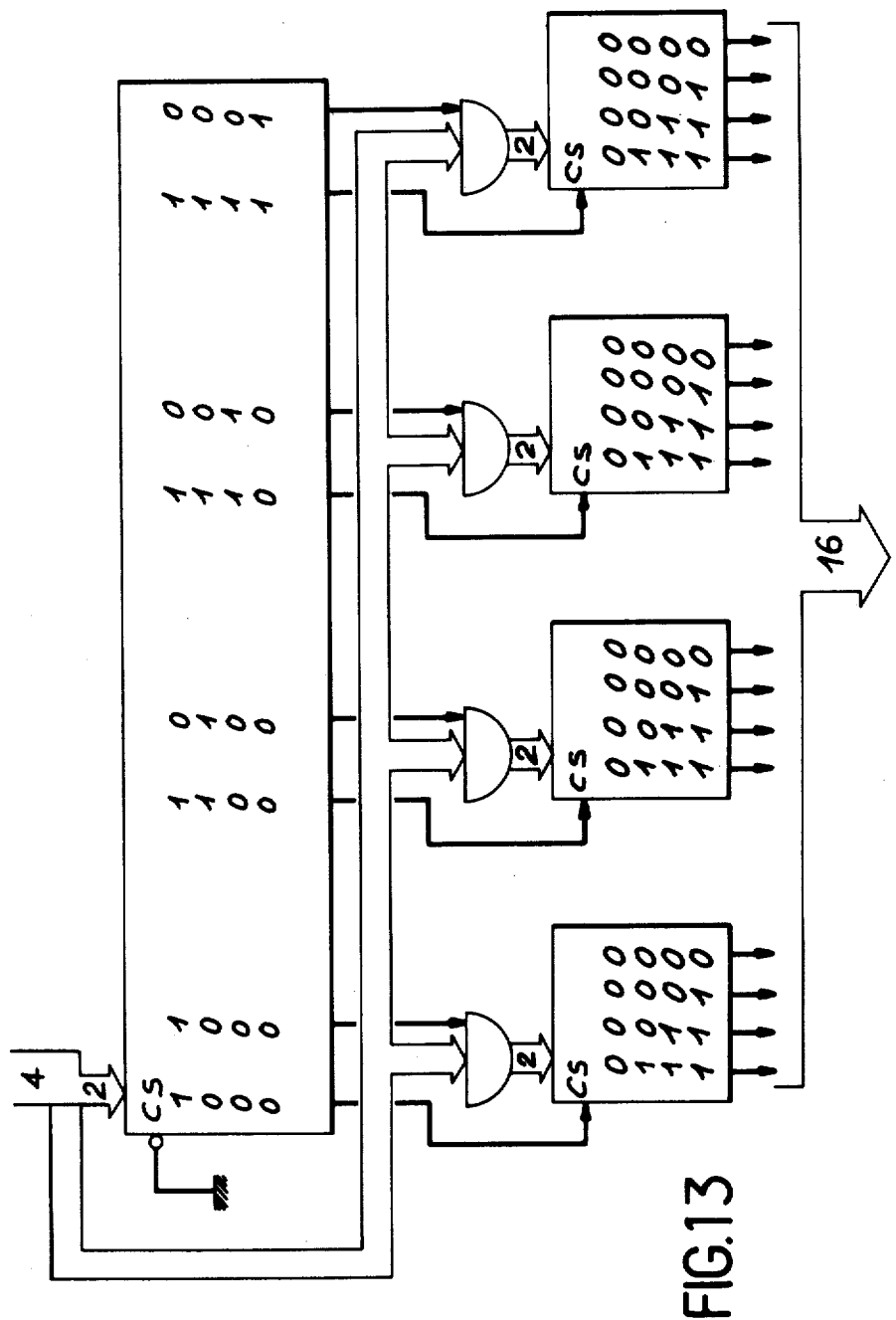
FIG. 13 shows the diagram of a four bit decoder.
Figure 14:
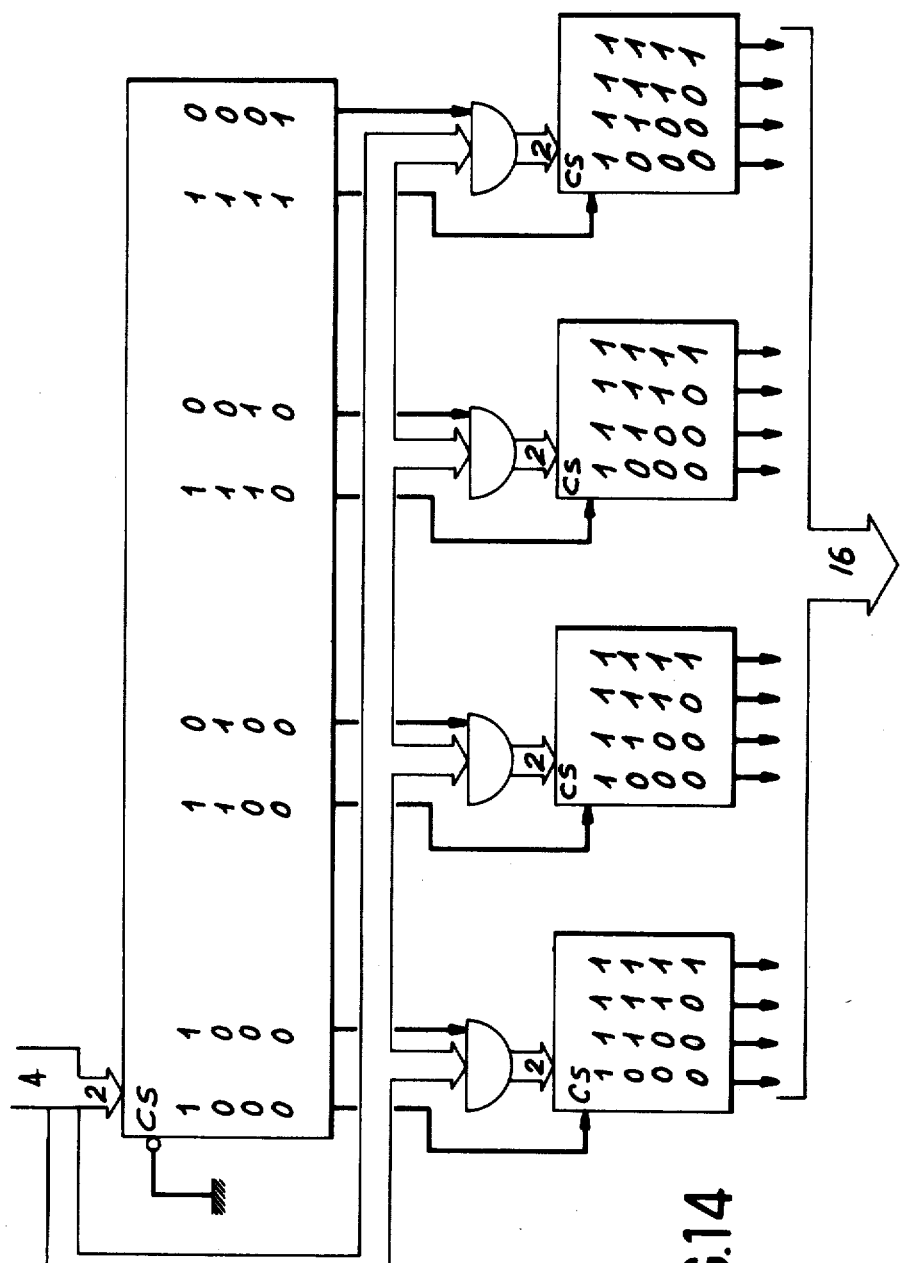
FIG. 14 shows the diagram of another four bit decoder.

In FIGS. 13 and 14, the principle of the decoders DECOD 10 and DECOD 11 is illustrated taking four bit decoders as an example.

Figure 15:
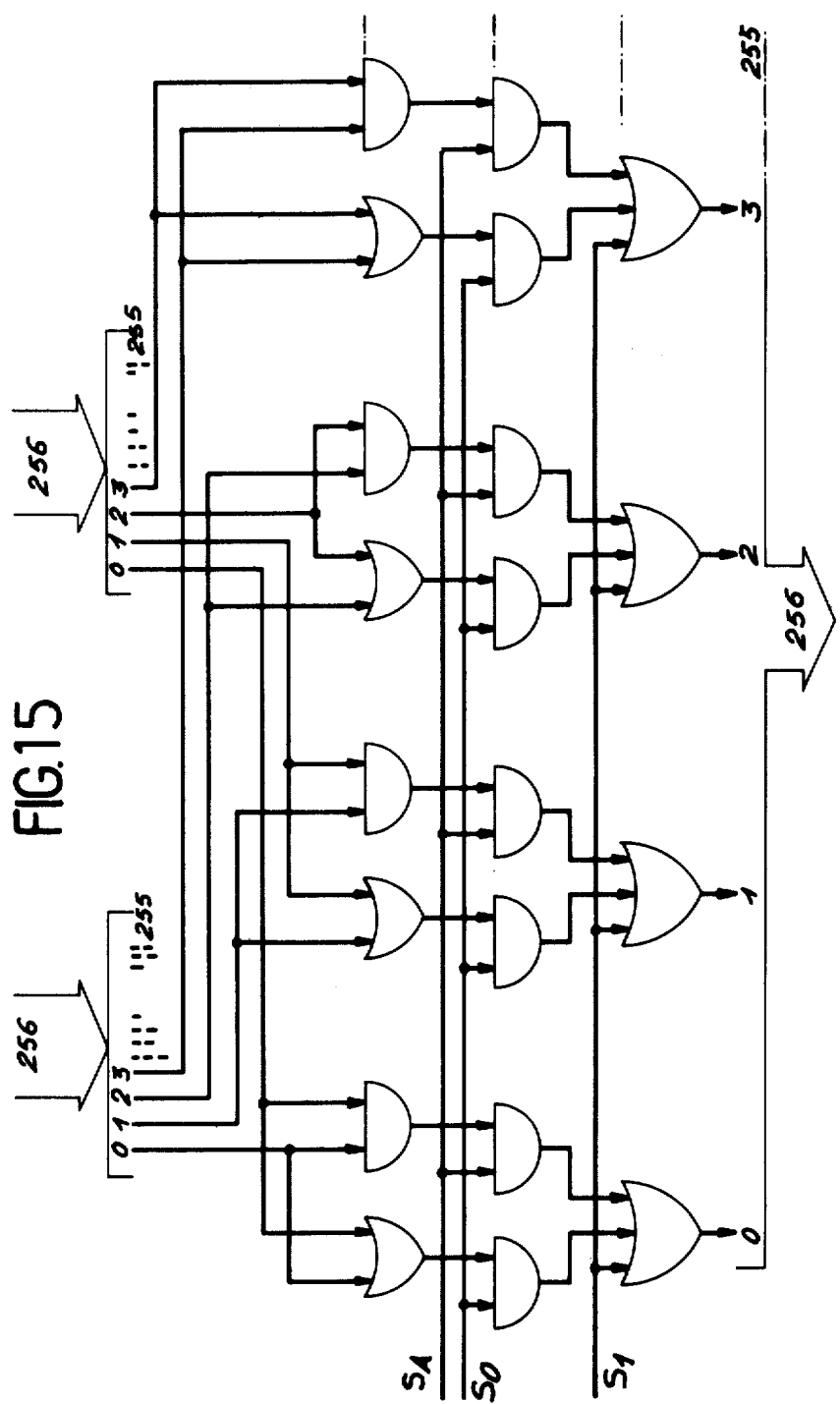
FIG. 15 shows the diagram of a third decoder used in the general addressing unit.

The operation of decoder DECOD 12 is explained on FIG. 15. The output of this decoder, which is the RAM write clock is controlled by gate AND 15.

Control Unit Description

The control unit CU is responsible for guiding the UAG and of providing the dialogue with the interface, in order to ensure the correct operation of the optimizer. In one preferred embodiment, this control unit is realised by a microprocessor, which is a simple low cost solution of sufficiently high performance for many cases.

This microprocessor ensures the connection between the interface and the GAU; it must therefore control or interpret lines ending or coming from these various units.

Figure 16:
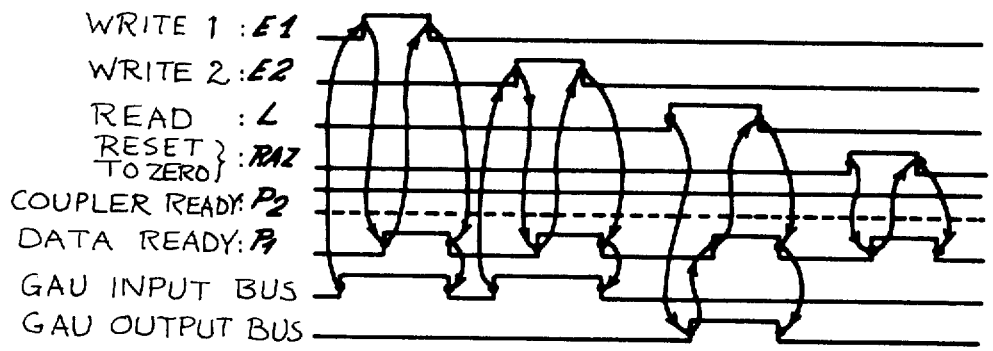
FIG. 16 shows the interface lines on the control unit side.

The interface lines are shown on FIG. 16. The UAG lines are shown on FIGS. 17 and 12. It should be noted that the lines E, G, M going towards the GAU can be grouped together into a single line.

These lines being defined, it remains to give precise details of the microprogramming algorithm capable of controlling the control lines. This microprogramming is described by FIGS. 18A, 18B and 18C. Described very briefly, this algorithm includes a first part which represents the RAM reinitialization. This work is necessarily formed between the processing of the two different spaces. To follow the action of the lines, one should refer to FIGS. 12 and 16.

Next comes a second part, the processing of the successive constraints belonging to the space considered. One could note that the order of arrival of the addresses of one constraint is as follows: upper address then lower address.

The third part concerns the processing of the three system arrival points.

Finally, in the fourth part, the microprogram allows sequential reading of the three DELTA corresponding to the arrival point. One should note that the fourth part is implicitly looped onto the first part, this in such a way that reinitialization be retriggered independently of the computer. This loop allows the system to automatically reinitialize itself without upsetting processing already commenced in the computer central processing unit.

The structure of the control unit conforms to that which is shown on FIG. 19. The microprocessor includes a clock H, a test decoder DEC, an ordinal counter CO, a read only memory ROM and a maintenance system not shown on the figure.

The ROM dimension is as follows:
- operation code: 2 bits
- test line: 6 bits
- command line: 14 bits
- branching address: 6 bits. Finally the ROM size is 64 words of 32 bits, being 8 packages.

In respect of the CU synchronization, the clock frequency must be computed in such a way that the UAG and cell chain maximum response times do not disturb the system operation. This time, which corresponds to one reading of the RAM and decoding, can be computed as a function of the data of the integrated circuits used. By way of example this time can be equal to 233 ns for the least favorable case. This then allows the CU clock frequency to be based on 250 ns being 4 MHz.

The specification of the CU clock frequency allows the evaluation of the system overall performances in its various phases. By way of example, the performances can be as follows:

processing of one elementary constraint with one iteration: 10 micro-instructions, being 2.5 micro-seconds, processing of a 20 elementary constraint space: 200 micro-instructions, being 50 micro-seconds, processing of a 150 elementary constraint space: 1500 micro-instructions, being 375 micro-seconds, reading the three DELTA: 26 micro-instructions, being 6.5 micro-seconds, maximum rate of computer memory: 4 micro-instructions, being 1 micro-second, RAM reinitialisation times: 50 micro-instructions, being 12.5 micro-seconds.

These times evidently take into account the dialogues with the computer. One should note that by wiring-in various functions particular to this latter at the level of the interface, in particular $P_1$, $P_2$ activation and the detection of command and decoding, the operator overall performance can be improved.

In the same way, it is possible to change the microprogram to 150 ns by doubling certain micro-instructions for the critical cases of which the times are equal to 230 ns.

The coupler can be a card similar to those of the manufacturer who supplies the link: simulator general purpose interface - computer CU.

The aim of the maintenance console is the simulation of the computer seen from the optimizer, from which comes the use of the generalised signals. But this console can also be used for displaying the optimizer operation, in particular running of the microprogram, the results of each micro-instruction, which is to say the contents of the bus and certain microprocessor orders.

As an example the optimizer being described includes 256 cells. But one can easily conceive of optimizers with 64, 128 or 512 cells, following the compromises selected between the constraint dimensions and the processing time, for one can process a constraint with a semi-perimeter of 500 steps, with an optimizer of 64 cells, this requiring 8 iterations. Various optimizers and their main characteristics are grouped in table VI, which in particular gives the number of integrated circuits for each cell for each number of steps chosen. Two optimizer families can be seen:

the upper range, which covers problems going up to 65,536 steps, (maximum word dimension of 16 bits), lower range, which covers problems going up to 4096 steps, (maximum word dimension of 12 bits).

A family of optimizers is found to be modular. Thus the 12 bit range can be realised, from a basic shelf containing 64 cells, plus the CU, the interface and the GAU. The change to other products is made by the addition of a second, then a third and fourth basic shelf, containing only the cells, the decoding cards and an inter-shelf interconnection card, as shown on FIGS. 21 and 22.

TABLE VI (Note : Integrated Circuit = IC)

| Version | Family No. of bits per word | Number of Cells | No. of Integrated Circuits per cell | No. of IC for the GAU | No. of IC for the CU and the Interface | Total No. of IC | Number of Racks |
|---|---|---|---|---|---|---|---|
| 8192 steps (8 k) | 16 | 512 | 17 | 868 | 150 | 9722 | 8 racks or 2 cabinets |
| 4096 steps (4 k) | 12 | 256 | 13 | 444 | 100 | 3872 | 4 racks |
| 2048 steps (2 k) | 12 | 128 | 13 | 259 | 100 | 2023 | 2 racks |
| 1024 steps | 12 | 64 | 13 | 137 | 100 | 1069 | 1 rack |

Description of interface

The interface includes three parts (see FIG. 20):

the general purpose interface which is found in a simulator the coupler which is a card located in the computer a maintenance console.

The general purpose interface allows dialogue of the simulator with the coupler. The signals must be generalized in order that the simulator can be connected to any computer.

The general purpose signals are:

RAZ (reset to zero): RAZ
read result: L
write arrival point coordinate: $E_2$
write constraints coordinates: $E_1$
coupler PRET (ready): P2,
data ready: P1.

A second variant of the optimizer which is simpler than that which has been analysed will now be described.

In the first, already described variant, there is a set of P cells the initial content of which is 0 for the N first, then 1, 2, 3 . . . .P − N for the others. The optimizer is designed to submit this set of numbers to the following processing: up to a certain lower address noted by B anddefinedfor each process, the contents of the addresses are maintained unchanged, then, if the contents of the address B are designated by (B), the contents of the address B + 1 are put into (B) + 1, the contents of B + 2 put into address (B) + 2 and so on until one obtains a content (H) of a certain upper address H, this also defined for the said processing, after that this value (H) is maintained until it reaches the upper address above which the address contents remain unchanged.

One could therefore remark that the nature of this set of operations entrains that the series of cell content values is always increasing and that the difference between the contents of two successive addresses is always 0 or 1. This remark is the origin of the improvement contributed by the second variant: this improvement consists of processing not the contents of the cells themselves but the increments of the contents with respect to the contents of the preceding cells.

If one directly processes the increments of the cell contents and not the contents themselves, one is led to perform the following operations, copied from the operations described for the first variant: below the lower address, the increments remain unchanged; starting from the lower address, in B + 1, B + 2 etc... B + S, one writes S times 1, S being equal to (H) - (B), which is to say the number of increments that it has counted, before the processing of the constraint considered, between the addresses B and H, B being exclusive and H inclusive (an interval noted symbolically ]B, H] ); from the address B + S + 1, the increments are zero up to H; above H the increments remain unchanged. The operation of the constraint processing is performed by measuring the content of the arrival point, which is obtained by summing all of the 1 contents up to the said arrival point.

To explain the second variant principle more clearly refer to FIG. 8 and table I. On this figure four constraints specified by their upper and lower diagonal addresses are represented; table I specifies the algorithm allowing the finding of the differences, after each constraint, from the first variant. The columns of this table contain the letters which represent the contents of each cell referenced by its diagonal address.

variant means. On the other hand if one uses the second variant means, one finds an increment equal to 0 or 1 in the cells according to whether the cell content is equal to the preceding cell content or greater by one than the preceding cell content. After processing of this first constraint, the new increments are then those shown in column V.

Column VI re-indicates the cell contents when the second constraint is processed following the method of the first variant. The successive increments after the same constraint has been treated by the method of the second variant are shown in column VII. Between addresses B = 12 and H = 16, the count of 1 s is equal to 3 and in column VII, one finds from the address 12 + 1 = 13, three 1 s respectively in 13, 14 and 15, the interval 12–16 then being completed by a 0 at address 16.

In table I the processing of constraints 3 and 4 which will be processed in the same manner as constraints 1 and 2 has not been shown.

Summarizing, one sees that for each processing, one performs:

the summing of all the 1 s included in the interval ]B, H] , which gives the sum S, the resetting to zero of cells contained in the interval ]B, H] , the writing of a number of 1 s equal to the previously computed sum S from the address situated immediately after the lower address B then 0 up to the upper address, after the last process, the summing of all of the written 1 s is performed up to and including the arrival point, which gives the characteristic modulus of that

TABLE VII

| I Address | II Initial Content | III Initial Increment | IV Content after constraint No. 1 B = 8 H = 13 | V Increment after constraint No. 1 | VI Content after constraint No. 2 B = 12 H = 16 | VII Increment after constraint No. 2 |
|---|---|---|---|---|---|---|
| 17 | 6 | 1 | 6 | 1 | 6 | 1 |
| 16 | 5 | 1 | 5 | 1 | 5 | 0 |
| 15 | 4 | 1 | 4 | 1 | 5 | 1 |
| 14 | 3 | 1 | 3 | 1 | 4 | 1 |
| 13 | 2 | 1 | 2 | 0 | 3 | 1 |
| 12 | 1 | 1 | 2 | 0 | 2 | 0 |
| 11 | 0 | 0 | 2 | 0 | 2 | 0 |
| 10 | 0 | 0 | 2 | 1 | 2 | 1 |
| 9 | 0 | 0 | 1 | 1 | 1 | 1 |
| 8 | 0 | 0 | 0 | 0 | 0 | 0 |
| 7 | 0 | 0 | 0 | 0 | 0 | 0 |
| 6 | 0 | 0 | 0 | 0 | 0 | 0 |
| 5 | 0 | 0 | 0 | 0 | 0 | 0 |
| 4 | 0 | 0 | 0 | 0 | 0 | 0 |
| 3 | 0 | 0 | 0 | 0 | 0 | 0 |
| 2 | 0 | 0 | 0 | 0 | 0 | 0 |
| 1 | 0 | 0 | 0 | 0 | 0 | 0 |
| 0 | 0 | 0 | 0 | 0 | 0 | 0 |

Table VII illustrates the second variant. The diagonal addresses numbered from 0 to 17 are shown in column I of this table and the initial cell contents in column II. This content is the same as that which is found in table I. In column III the increments corresponding to the column II contents are shown. This increment is zero up to address 11 and equal to 1 from address 12 to address 17. Column III therefore represents the initial state of the cells when these are designed for processing the increments.

After processing of the first constraint defined by addresses B = 8 and H = 13, the contents of these cells become those of column IV when one utilizes the first arrival point.

The block diagram of the optimizer which realises these operations is given by FIG. 23. M represents a memory which possesses as many one bit locations as there are cells, each bit representing one increment. The means V provide for the enabling of all of the memory M location outputs included in the interval going from B exclusive to H inclusive. An adder ADD 1 is connected to the memory output via the intermediary of circuit V. Memory M, the circuit V and adder ADD 1 are controlled by a sequencer SEQ, which is connected with the computer ORD. The means for reset to zero RAZ act on all of the memory locations situated in the interval ]B, H] and the writing means E allows the writing of a number of 1 s equal to the sum S from the address B + 1 up to the address X = B + S, then 0 s from X + 1 to H.

The general optimizer organisation having been outlined, we will now describe some of the circuits which are advantageously used in the invention, but which are given here only by way of example. One should note that the processing of the increments and not the contents themselves is the source of simplification at the level of the components.

Description of the Optimizer memory in this second variant

The optimizer memory is composed by as many one bit locations as cells, being P, each bit representing the increment of the value 0 or 1, for the corresponding cells. To avoid having to similtaneously process the P memory locations associated with the P cell addresses, it is advantageous to organise a memory in $2^q$ lines each of $2^r$ bits, with $P = 2^{q+r}$. The line to which an address belongs is then defined by the $q$ most significant bits of the said address. To simplify their notations, and purely for example, as a result one could consider a memory with 2048 locations ($2^{11}$) organised in $2^4 = 16$ lines of $2^7 = 128$ bits. Each line is then advantageously split into 16 bytes numbered from $i = 1$ to 16, the bits of one byte being numbered from $j = 1$ to $j = 8$. One of the 128 bits of one line is thus referenced by a two indices notation $M^{i,j}$.

The general memory configuration in this particular case is illustrated by FIG. 24. The memory is realised by the association of integrated circuits each of which includes 16 four bit words. Two integrated circuits in series comprise 16 bytes. 32 circuits put in series therefore allows the composition of 16 128-bit lines.

The memory inputs and outputs are shown respectively at the top and bottom of the figure by the 128 vertical lines. One E/L (write/read) command line allows the addressing of a write or read order on each of the integrated circuits. The input and output circuits of the memory locations are not shown on this figure and will not be further studied.

One can use the memory circuits which, during the read phase, deliver the complement of the memorised bit on each output. To write data, it is sufficient to bring the E/L line to logic level 1 and to apply the data to be memorised to the inputs of the addressed word.

Purely as an example, the circuits forming the memory can be type SN 7489 N packages.

With such a memory, organised in 16 lines of words, one can allocate the 4 most significant bits of an address which includes 11, to the selection of one line amongst 16. This set of 4 most significant bits will be noted, in future, $B_1$ for the lower address and $H_1$ for the upper address, or in a general manner $A_1$.

Description of selection circuit for the interval ]B,H].

As explained above, it is necessary to select all of the memory location outputs included in the interval ]B, H] in order that the adder ADD 1 can perform the summing of all of the 1 s included in this interval.

It is convenient to perform this enabling in two stages of selection, on one hand, of the outputs situated to the left of B and on the other hand, of those situated to the right of H then in combining these two selections. This type of enabling therefore requires use of triangular decoders in the sense that their truth table has a triangular configuration of the type of those which are shown in table VIII below which is valid in the case of 3 bits. The complement decoder where the 0 s will be replaced by the 1 s and reciprocally will also naturally be a triangular decoder.

TABLE VIII

| a | b | c | 1 | 2 | 3 | 4 | 5 | 6 | 7 | 8 |
|---|---|---|---|---|---|---|---|---|---|---|
| 0 | 0 | 0 | 1 | 0 | 0 | 0 | 0 | 0 | 0 | 0 |
| 0 | 0 | 1 | 1 | 1 | 0 | 0 | 0 | 0 | 0 | 0 |
| 0 | 1 | 0 | 1 | 1 | 1 | 0 | 0 | 0 | 0 | 0 |
| 0 | 1 | 1 | 1 | 1 | 1 | 1 | 0 | 0 | 0 | 0 |
| 1 | 0 | 0 | 1 | 1 | 1 | 1 | 1 | 0 | 0 | 0 |
| 1 | 0 | 1 | 1 | 1 | 1 | 1 | 1 | 1 | 0 | 0 |
| 1 | 1 | 0 | 1 | 1 | 1 | 1 | 1 | 1 | 1 | 0 |
| 1 | 1 | 1 | 1 | 1 | 1 | 1 | 1 | 1 | 1 | 1 |

The complexity of a triangular decoder increases very quickly with the number of bits. Also it is preferable to sub-divide the number of bits that one processes, this leading to the combination of several decoders. To this effect, the invention provides that each 128 bit line is split into 16 bytes, this allowing the addressing of the bits of 1 line by two addresses, the one with 4 bits for the selection of 1 byte amongst 16 and the other with 3 bits for the selection of 1 bit amongst 8.

Summarising, any 11 bit address, A, is split into a word $A_1$ formed of the four most significant bits, into a word $A_2$ formed from the four intermediate bits and a word $A_3$ formed from the three least significant bits (these words are noted respectively $B_1$, $B_2$, $B_3$ for the lower address and $H_1$, $H_2$, $H_3$ for the upper address).

The V circuit for enabling of memory location outputs included in the interval B, H is shown in block diagram form on FIG. 25. This circuit includes a lower address decoder DECOD B and an upper address decoder DECOD H. The lower address decoder DECOD B includes a 4 bit decoder DECOD $B_1$, a 4 bit decoder DECOD $B_2$ and a 3 decoder DECOD $B_3$ The upper address decoder DECOD H includes, in the same manner, a 4 bit decoder DECOD $H_1$, a 4 bit decoder DECOD $H_2$, and a 3 bit decoder DECOD $H_3$.

The decoder DECOD $B_2$ has 4 inputs and 16 outputs that will in future be noted by $B_2^i$, $i$ varying from 1 to 16. The decoder DECOD $B_3$ has 3 inputs and 8 outputs noted $B_3^j$, $j$ varying from 1 to 8. Decoder $H_2$ has 4 inputs and 16 outputs noted $H_2^i$, $i$ varying from 1 to 16 and decoder $H_3$ has 3 inputs and 8 outputs noted $H_3^j$, $j$ varying from 1 to 8.

The decoders DECOD $B_1$ and DECOD $H_1$ allow the enabling of one line. In this line, the locations are enabled by the decoders DECOD $B_2$ - DECOD $B_3$ respectively for the lower address and decoders DECOD $H_2$ - DECOD $H_3$ respectively for the upper address. This latter enabling in one line is performed with the aid of the VAL enabling circuits. Each outputs $S^{i,j}$ of the position $M^{i,j}$ is connected to an enabling circuit VAL, then to the adder ADD 1.

Thus, as is shown in FIG. 27, the VAL circuit for enabling memory outputs in the interval ]B, H] includes, associated with each output, a logic gate $P^{i,j}$ of complementary OR type (also designated by NOR) connected to the output of each $M^{i,j}$ memory location, the output of the said gate being connected to the adder ADD 1. One of the two gate inputs is connected to the $S^{i,j}$ output of the memory location $M^{i,j}$ and the other is connected to the output of a logic circuit $K^{i,j}$ of which the structure and principle of operation will now be given.

The 128 locations of a memory line are shown schematically on FIG. 26. These locations are referenced, as was explained above, by two index notation, being $M^{i,j}$. The hatched location is the current location of the ith byte and of the jth bit in this byte. For the moment one can suppose that the lower address B and the upper address H of the constraint to be processed show up in the same line, which is to say $B_1 = H_1$. The case where $B_1$ is different from $H_1$ will be treated later.

To enable the interval B, H, the outputs situated to the left of B (B included) and those which are situated to the right of H (H not included) are selected.

Within the framework of FIG. 26, it will be assumed that the hatched element $M^{i,j}$ corresponds to the lower address of which one wishes to select the outputs. The selections (enabling or inhibiting) are performed with the aid of the triangular decoders of which the 1 rm has been given in the truth table in table VII.

Following that the logic state of one output of one decoder will be designated by a lower case letter, being for example $b_2^i$ for the logic state of the output $B_2^i$ of decoder DECOD $B_2$ or $H_3^j$ for the logic state of the $H_3^j$ output of decoder DECOD $H_3$.

If the memory elements $M^{1,1}$, $M^{1,2}$ . . . $M^{1,8}$ are directly connected to the $B_2^1$ output of decoder $B_2$ and locations $M^{2,1}$, $M^{2,2}$ . . . $M^{2,8}$ to the output $B_2^2$ and so on, all of the bytes from 1 to $i$ are selected whatever be $j$. It is this which is symbolically represented on FIG. 26 by the continuous line going from the first bit of the first byte to the last bit of the row $i$ byte.

If one now connects the output of locations $M^i$, whatever be $j$, to the outputs $B^{i+1}$, these outputs are the logic levels which were those of location $M^{i+1}$ in the preceding case. In this case one then obtains enabling up to the preceding byte. It is this which is represented on FIG. 26 by the second straight line which ends on the last bit of row $i-1$ byte.

To select locations $i = 1, j = 1$ to $M^{i,j}$, it is necessary to add the segment going from $j = 1$ to $j$ in the order byte $i$, to the state represented by the second line or FIG. 26. Now the logic expression $b_2^i$. $b_3^j$ (where the period (.) symbolises the logic AND operation) is equal to 1 if $b_2^i$ and $b_3^j$ are both equal to 1; this expression is equal to 1 along the entire length of segments shown along the third line of FIG. 26. Therefore to enable all of the outputs to the left of $M^{i,j}$, one must combine lines two and three, which comes to performing the logic operation $b_2^{i+1} + b_2^i$. $b_3^j$, where the sign + symbolises the OR logic operation.

If one wishes to use only NON-AND gates (known as NAND gates), the preceding operation is written $b_2^{i+1} \mid (b_2^i \mid b_3^j)$ where the "|" symbolises the NAND logic operation.

Each output of one location $M^{i,j}$ of the memory must therefore be connected to a logic circuit connected to the outputs $B_2^i$ and $B_2^{i+1}$ of the decoder DECOD $B_2$ and to the output $B_3^j$ of the decoder DECOD $B_3$, the said logic circuit realising the logic operation $b_2^{i+1} + b_2^i$. $b_3^j$, or, which returns to the same thing, the operation $b_2^{i+1} \mid (b_2^i \mid b_3^j)$, on its three outputs.

The problem is analogous in respect of the selection of outputs situated to the right of the upper address. A triangular decoder of which the truth table is symmetric to that of the lower address decoder is employed. If one connects all of the locations of an order byte $i$ to the output $H_2^i$, one selects all of the bytes to the right of H, including that which contains the upper address H. It is therefore still necessary to shift by one row and consequently connect the bytes to the output $H_2^{i+1}$. To select the locations included between $M^{i,j}$ and $M^{i,8}$, it is necessary to use a truth table symmetric to that of decoder DECOD $B_3$ for decoder DECOD $H_3$, and to perform the combination of the logic states $h_2^i$. $h_3^j$. The logic circuit for the selection of elements connected to the right of the upper address must therefore be connected to the outputs $H_2^i$ and $H_2^{i+1}$ of the decoder DECOD !·, and to the output $H_3^j$ of decoder DECOD $H_3$ the s; J logic circuit coming to realise the logic operation $h_2^{i-1} + h_2^i$. $h_3^j$.

If one wishes to use only NAND type logic gates, the preceding logic relation is written in the form: $h_2^{i-1} \mid (h_2^i \mid h_3^j)$ where the sign | again symbolises the NAND operation.

An example of the $K^{i,j}$ logic circuit is shown on FIG. 27, which is made up only by NAND type logic gates. The $K^{i,j}$ circuit has six inputs of which three are connected to the lower address decoders DECOD $B_2$ and DECOD $B_3$ and the three uppers to the upper address decoders DECOD $H_2$ and DECOD $H_3$ As stated in a more precise fashion, the logic gate PB is connected to the outputs $B_2^i$ and $B_3^j$ and the output of the PB gate is connected to the input of a four input NAND gate, referenced by PBH, also connected to the previously complemented connection $B_2^{i+1}$ noted symbolically as $\overline{B_2^{i+1}}$.

In the same fashion, the upper part of circuit $K^{i,j}$ includes a gate PH which receives the outputs $H_2^i$, $H_3^j$ of the upper address decoders, the output of gate PH being connected to the input of gate PBH, which also receives the complemented output $\overline{H_2^{i-1}}$.

The circuit $K^{i,j}$ has an output logic level at 1 for all of the locations included in the overlapping of the two intervals [1,B] and ]H, 128 ] in which interval designations 1 designates the first line bit and 128 the last. If this output is connected to a NAND type logic gate $p^{i,j}$ connected to the output $S^{i,j}$ of location $M^{i,j}$, all of the outputs which are not in the overlapping region [1, B] + ]H, 128] will be enabled, which is to say, finally, the outputs of the interval ]B, H], for which the result is sought.

Naturally, one could realize the same function with other gates, for example in performing the operation [1, B] +] H, 128] then in utilizing one AND gate at the output of the memory locations.

FIG. 28 shows a half of one memory card. The circuit shown includes an integrated circuit 10 of 16 × 4 bits, a write circuit 12, a buffer register 14, a write control line 16, an H line connected to a clock (not shown), the circuits $K^{i,1}$, $K^{i,2}$, $K^{i,3}$, $K^{i,4}$, where the memory card is of row $i$ and logic gates $p^{i,1}$ . . . $p^{i,4}$. The selection of one line is performed by the four bits of the word $A_1$ ($B_1$ or $H_1$ according to whether the address is lower or upper word. The K circuits have their inputs connected to decoders conforming to those which were explained above and their outputs are connected, on one hand to the logic gates P and on the other hand to the write circuit 12.

After obtaining the sum S corresponding to all of the 1 s showing in the interval b, H, circuit 12 allows the entire interval B, H to be reset to zero in order that the required 1 can then be written in. Buffer register 14 allows the memory outputs to be saved during transfer from one line to the other. An entire card is completed by a second integrated circuit 10' connected to components analogous to those to which circuit 10 is connected. By way of example one can use a type SN 7489 N unit for integrated circuit 10 and a SN 7475 N unit for the buffer register.

Having described the memory card and the output enabling logic circuits, we will now describe in detail the structure of the 4 and 3 bit decoders, which control the said logic circuits.

The truth table of decoder DECOD $B_3$ is given in table IX.

TABLE IX

| a | b | c | $b_3{}^1$ | $b_3{}^2$ | $b_3{}^3$ | $b_3{}^4$ | $b_3{}^5$ | $b_3{}^6$ | $b_3{}^7$ | $b_3{}^8$ |
|---|---|---|---|---|---|---|---|---|---|---|
| 0 | 0 | 0 | 1 | 0 | 0 | 0 | 0 | 0 | 0 | 0 |
| 0 | 0 | 1 | 1 | 1 | 0 | 0 | 0 | 0 | 0 | 0 |
| 0 | 1 | 0 | 1 | 1 | 1 | 0 | 0 | 0 | 0 | 0 |
| 0 | 1 | 1 | 1 | 1 | 1 | 1 | 0 | 0 | 0 | 0 |
| 1 | 0 | 0 | 1 | 1 | 1 | 1 | 1 | 0 | 0 | 0 |
| 1 | 0 | 1 | 1 | 1 | 1 | 1 | 1 | 1 | 0 | 0 |
| 1 | 1 | 0 | 1 | 1 | 1 | 1 | 1 | 1 | 1 | 0 |
| 1 | 1 | 1 | 1 | 1 | 1 | 1 | 1 | 1 | 1 | 1 |

Starting from this table it is easy for a man experienced in the art to realise a logic circuit filling these functions. By way of explanation such a circuit is shown on FIG. 29 which therefore comprises one example of the DECOD $B_3$ type decoder.

The DECOD $H_3$ decoder truth table is formed by the complements of the table IX logic states. It is therefore useless to write it down. An example of a logic circuit realising these functions is given on FIG. 30.

The truth table of 4 bit decoder DECOD $B_2$ is given by table X. It corresponds to the schematic of FIG. 31 on which are also indicated the outputs which allow the complementary states to be obtained.

TABLE X

| a | b | c | d | 1 | 2 | 3 | 4 | 5 | 6 | 7 | 8 | 9 | 10 | 11 |
|---|---|---|---|---|---|---|---|---|---|---|---|---|----|----|
| 0 | 0 | 0 | 0 | 1 | 0 | 0 | 0 | 0 | . | . | . | . | .  | .  |
| 0 | 0 | 0 | 1 | 1 | 1 | 0 | . | . | . | . | . | . | .  | .  |
| 0 | 0 | 1 | 0 | 1 | 1 | 1 | 0 | . | . | . | . | . | .  | .  |
| 0 | 0 | 1 | 1 | 1 | 1 | 1 | 1 | 0 | . | . | . | . | .  | .  |
| 0 | 1 | 0 | 0 | 1 | 1 | 1 | 1 | 1 | 0 | . | . | . | .  | .  |
| 0 | 1 | 0 | 1 | 1 | 1 | 1 | 1 | 1 | 1 | 0 | . | . | .  | .  |
| 0 | 1 | 1 | 0 | 1 | 1 | 1 | 1 | 1 | 1 | 1 | 0 | . | .  | .  |
| 0 | 1 | 1 | 1 | 1 | 1 | 1 | 1 | 1 | 1 | 1 | 1 | 0 | .  | .  |
| 1 | 0 | 0 | 0 | 1 | 1 | 1 | 1 | 1 | 1 | 1 | 1 | 1 | 0  | .  |
| 1 | 0 | 0 | 1 | 1 | 1 | 1 | 1 | 1 | 1 | 1 | 1 | 1 | 1  | 0  |
| 1 | 0 | 1 | 0 | 1 | 1 | 1 | 1 | 1 | 1 | 1 | 1 | 1 | 1  | 1  |
| 1 | 0 | 1 | 1 | 1 | 1 | 1 | 1 | 1 | 1 | 1 | 1 | 1 | 1  | .  |
| 1 | 1 | 0 | 0 | 1 | 1 | 1 | 1 | 1 | 1 | 1 | 1 | 1 | 1  | .  |
| 1 | 1 | 0 | 1 | 1 | 1 | 1 | 1 | 1 | 1 | 1 | 1 | 1 | 1  | .  |
| 1 | 1 | 1 | 0 | 1 | 1 | 1 | 1 | 1 | 1 | 1 | 1 | 1 | 1  | .  |
| 1 | 1 | 1 | 1 | 1 | 1 | 1 | 1 | 1 | 1 | 1 | 1 | 1 | 1  | .  |

The truth table of decoder DECOD $H_2$ is given by the simplified table XI.

TABLE XI

| a | b | c | d | 1 | 2 | 3 | 4 | . | . | . | 16 |
|---|---|---|---|---|---|---|---|---|---|---|----|
| 0 | 0 | 0 | 0 | 1 | 1 | 1 | 1 | . | . | . | 1  |
| 0 | 0 | 0 | 1 | 0 | 1 | 1 | . | . | . | . | 1  |
| . | . | . | . | . | . | . | . | . | . | . | .  |
| 1 | 1 | 1 | 0 | 0 | . | . | . | . | . | 1 | 1  |
| 1 | 1 | 1 | 1 | 0 | . | . | . | . | . | 0 | 1  |

One can show that $h_2{}^1 = b_2{}^2$, $h_2{}^2 = b_2{}^3 \ldots h_2{}^{15} = b_2{}^{16}$ and that $h_2{}^{16} = 1$. One can therefore obtain a decoder DECOD $H_2$ from the schematic of FIG. 31 by shifting all of the outputs as they are shown on the right part of that figure.

Description of an example of an adder useable in the invention

Adder ADD 1 receives logic outputs only from the memory outputs which have been enabled, which is to say those which are included in the interval ]B, H]. Its role is to form the sum s of the 1 contents in this interval. One can use an adder operating in the following manner advantageously.

The 128 bits are divided into four groups of 31 bits, the four remaining bits being separately processed. Each group is processed in an adder assembly the outputs of which are then connected to another adder. The block diagram is given on FIG. 32. The adders allocated to the 31 bit groups carry references 20, 22, 24 and 26. They supply 5 bit signals which are transmitted to the adder 30 which also receives the 125th, 126th and 127th bits of the line in question. The output of adder 30 transmits a 7 bit word which represents the sum of the 1 s contained in the ]B, H] interval, the 128th bit excepted which is separately processed as will be seen later.

Each of the circuits processing the 31 bit groups can advantageously be made up of adder assemblies, for example by type SN 7483, the function of which is intended to perform the sum of two four bit words, respectively $U_1$, $U_2$, $U_3$, $U_4$ and $V_1$, $V_2$, $V_3$, $V_4$. Six 1 bit words are respectively transmitted to inputs $C_i$, $U_1$, $V_1$, $V_3$, $V_4$ and gate $U_3$ is changed to level 1 while $U_2$ and $V_2$ are set to the zero level. The addition of $C_i$, $U_1$ and $U_2$ outputs in $\Sigma_1$ and $\Sigma_2$ and the truth table, shown on table XII, shows that the addition of $U_4$, $V_3$, $V_4$ outputs in $\Sigma_4$ and $C_0$ : if $U_4$, $U_3 = 0$ 1 and $V_4$, $V_3 = 0$ 0, the sum is 0 1, from which $C_0\Sigma_4\Sigma_3 = 0\ 0\ 1$.

TABLE XII

| $U_4$ | $U_3$ | $V_4$ | $V_3$ | $C_0$ | $\Sigma_4$ | $\Sigma_3$ |
|---|---|---|---|---|---|---|
| 0 | 1 | 0 | 0 | 0 | 0 | 1 |
| 0 | 1 | 0 | 1 | 0 | 1 | 0 |
| 0 | 1 | 1 | 0 | 0 | 1 | 1 |
| 0 | 1 | 1 | 1 | 1 | 0 | 0 |
| 1 | 1 | 0 | 0 | 0 | 1 | 1 |
| 1 | 1 | 0 | 1 | 1 | 0 | 0 |
| 1 | 1 | 1 | 0 | 1 | 0 | 1 |
| 1 | 1 | 1 | 1 | 1 | 1 | 0 |

This assembly is repeated four times and the two 2 bit words which output from each of them are transmitted into a new circuit of which only the first adder and the carry input are used. One then obtains four 3 bit words which are added two at a time by means of two more packages the carry inputs of which receive the two new 1 bit words, and finally the two 4 bit words obtained are transmitted with the 31st 1 bit word into an 11th summer. The block diagram of such a circuit is shown in FIG. 34.

To perform the summing of four 5 bit words coming from circuits 20, 22, 24 and 26, the circuit referenced by 30 on FIG. 32 is used, which can advantageously be composed of circuits organised following the schematic of FIG. 35. For each pair of words, one package is used for the first 4 bits and one half of the other for the 5th, while the adder carry input uses one of the four 1 bit words which remain, being the 125th. The outputs are again taken in a third assembly of one package and a half package, whilst the new carry input uses the third of the four 1 bit words which remain (the 127th).

Having obtained the sum S of the 1s showing in the interval B, H, it remains to compute the address X = B + S up to which it is necessary to write in the 1s from the lower address. This addition is performed by a Σ circuit the schematic of which is given on FIG. 36.

This circuit includes:

an 8 bit buffer memory MT which receives the 7 bits of word $B_2$ $B_3$ by seven P logic gates simultaneously controlled by connection 40, the 7 bit word available on the outputs of buffer memory MT forms a word noted by $X_2X_3$;

an 8 bit adder ADD 2 which receives the 7 bits coming from the MT buffer memory and the 7 bits coming from the adder ADD 1 as well as the 128th bit shown on connection 42 which was not taken into account by adder ADD 1;

eight P' gates, open when the P gates are closed and inversely, and which are interposed between the eight outputs of adder ADD 2 and the eight inputs of the buffer memory MT;

a 4 bit counter $C_1$ which is pre-set to $B_1$ and on which the clock input, 44, is connected to the eighth output $\sigma_R$ of the ADD 2 most significant output; the 4 bit word available at the output of counter $C_1$ is noted by $X_1$ and represents the 4 most significant bits of address X, the 7 least significant bits of which correspond to the word $X_2X_3$.

By way of example, the buffer memory can be formed of two SN 7474 N type circuits and the 8 bit adder ADD 2 can be constituted by the cascading of two SN 7483 packages.

The outputs of adder ADD 2 can be stored in the buffer memories MT by virtue of the gates P'. One can thus add the output of adder ADD 1 as many times as necessary to take into account, as will be seen later, the case where the addresses B and H are not in the same line ($B_1$ different from $H_1$).

Description of control circuits

These circuits are shown schematically on FIG. 37. they include : a counter $C_2$ preset to $B_1$; a two input switching circuit AX receiving $X_1$ and $H_1$ and having a control connection 50 which specifies which of the words, $X_1$ or $H_1$, will appear on output 52; a comparator COMP the inputs of which are connected to counter $C_2$ and the output of AX; a switching circuit AH controlled by the control signal transmitted by connection 50 and by the complementary signal transmitted by connection 52 and the input of which is connected to the output of the comparator. The circuit AH has two complementary outputs 53 and 55 each controlling one of the two PH switching gates of which one of the gates receives the word $X_2X_3$ and the other the word $H_2H_3$. The outputs of the PH switching gates are connected to decoders DECOD $H_2$ and DECOD $H_3$. The operation of this circuit is as follows: $B_1$ and $H_1$ are transmitted to comparator COMP. If $H_1 = B_1$, this comparator unblocks the PH gates which transmit $H_2$ and $H_3$ to the upper address decoder. The lower decoder is, as will be seen later, supplied, and the addition of the 1s is performed. The result S of this addition is added to the lower address to give the X address and the 1s are rewritten between B and X.

After this operation, the 1 signal which appears on connection 52, modifies the state of AH switching circuit and it is $X_2X_3$ which substitutes for $H_2H_3$ on the PH switching circuit output. After the definition of $X_2X_3$, as a result the writing of the 1s does not pass address X. The control signal transmitted by connection 50 also operates on AX which transmits the $X_1$ word into the comparator, but as we have assumed that $B_1 = H_1$, it results that $X_1 = H_1$, which does not modify the signal transmitted by the comparator.

Throughout the description which precedes this second variant, for simplicity it was assumed that the constraint upper and lower addresses were in the same lines. We shall now explain the operation of the optimizer when $H_1$ is different from $B_1$.

If $H_1$ is different from $B_1$, the additions performed in adder ADD 1 and in adder ADD 2 add the sum $S_1$ of the 1s of the line $B_1$ to B. The sequencer then transmits a pulse which increments counter $C_2$ and the addition $B_1 + S_1 + S_2$ is again made. These additions are performed until there is equality between the $C_2$ and $H_1$ contents. As long as equality has not been reached, the rewriting of the 1s is blocked. When the contents of counter $C_2$ reach $H_1$, a flip-flop which is not shown on FIG. 15 intervenes to cause the following operations:

reintroduction of word $B_1$ in counter $C_2$, formation of a 1 signal appearing on connection 52 which controls the switching of $X_1$ onto comparator COMP by the AX circuit and the switching of $X_2X_3$ towards the upper address decoder by the PH circuit, authorization of rewriting the 1s in the interval B, X.

The schematic of the complete control circuits card is shown on FIG. 38. On this figure, the components of FIG. 37 are again to be found, being counter $C_2$, the comparator COMP, the switching circuits AX, AH and PH, adder ADD 2, gates $P_1$ and P' (which are symbolically represented by a single gate), buffer memory MT and the counter $C_1$ preset to $B_1$. In the lower part, a logic circuit PB does not allow the lower decoder to intervene except when working on the lower line $B_1$. The control connections $t_B$, $t_H$, AB, M3, M2 shown on the circuit of FIG. 38 come from the sequencer. This sequencer is shown schematically on FIG. 39. It includes a flip-flop 62, three monostables $M_1$, $M_2$, $M_3$ connected in cascade and one on-off flip-flop 64.

In the simplified case where $B_1 = H_1$, the operation of this circuit is as follows: a starting transfer pulse $t_B$ is supplied by the computer and provides for loading of registers $B_1$, $B_2$, $B_3$ and of counter $C_2$. A second pulse $t_H$ loads registers $H_1$, $H_2$ and $H_3$ and resets flip-flop 62 to zero and triggers the on-off flip-flop 64. This operates the monostables $M_1$, $M_2$, $M_3$ the roles of which are as follows:

$M_1$ allows the loading of the buffer memories MT situated on the memory card the outputs of which control adder ADD 2;

the function of $M_2$ is to write the 0s and to increment $C_1$ counter contents, $M_3$ transfers the outputs of adder ADD 2 into the associated MT buffer memories.

When the content of counter $C_2$ is equal to $H_1$, pulse $M_2$ causes flip-flop 62 to change state, which triggers a new cycle with $X_1$ controlling the comparator, $X_2X_3$ controlling the upper decoder. The writing of the 1s is performed between B and X.

When $C_2$ counter content is equal to $X_1$, taking into account the fact that flip-flop 62 has changed state, the pulse coming from $M_2$ causes the on-off flip-flop 64 to stop. The corresponding phase diagram is given on FIG. 40, again for the case where $B_1 = H_1$.

It was indicated above that one obtains the address X up to which it is necessary to write the 1s from the lower address B of a constraint by adding to B the sum S of the 1s showing up in the interval ]B, H]. This addition is performed in the Σ circuit of FIG. 36.

In an advantageous variation of the optimizer, one can directly deduce from the value of X, the decision to take for an elementary action starting from a state of which the address is A. If address A is less than the address X obtained after processing of the last constraint, A is situated under the diagonal X and the optimum decision to take consists of choosing a path which passes underneath the said constraint. If address A is greater than X, A is above the diagonal X and the optimum decision consists of choosing a path which passes above the constraint.

In addition, if for any reason, related for example to the decisions which must be taken in other planes to those in which we are interested, one is led to select a path in the said plane which is not the optimum path, one immediately knows the penalty caused by this nonoptimum choice, which is simply a difference $|A - X|$ of the addresses.

The preceding description, as much for the first as the second variant, constantly refers to the processing of a two-dimensional space corresponding to a two variable system. It is evident that one would not exceed the boundaries of the invention by considering a machine capable of processing, either in parallel or in series, $p(p - 1)/2$ problems of this type coming from the problem posed by the searching for an optimum path for a system with $p$ variables, the number $p(p - 1)/2$ corresponding to the number of different variable combinations taken two at a time, each of the plane problems being processed as was described above. In this case, the optimizer indicates $p(p - 1)/2$ optimum elementary actions that it combines by any appropriate method to find, in a $p$ dimensional space, the optimum elementary action.

Purely by way of example, for this recombination one can use the decision tree method, known to those experienced in the art, and which consists of classifying all of the elementary paths obtained in the various planes as a function of the path length to which they correspond and successively eliminating all of the possibilities which correspond to the paths of which the length is rejected when going in a decreasing direction, this finally leaving the shortest path. Using this algorithm one can find the optimum decision to take in a space of $p$ dimensions and, by projection onto each plane, the optimum action in each of the planes. But it is at the door of the person experienced in the art to find other recombination algorithms.

Thus, for searching for the optimum path between an initial state and a final state of a system with $p$ variables $T_i, 1 \leq i \leq p$, the optimiser includes:

A. the previously described means for finding and memorizing each of the $p(p - 1)/2$ elementary optimum actions for the $p(p - 1)/2$ systems with two variables $T_{i-m}$ and $T_{i-n}$ with $m \neq n$, B. the means for performing the recombination of these $p(p - 1)/2$ optimum elementary actions, a recombination which gives the optimum elementary action for a system of $p$ variables.

In a slightly different variant, the optimizer includes:

A. the previously described means for finding and memorizing the lengths of the three paths ending up with the three successive possible states of the initial state, for each of the $p(p - 1)/2$ systems considered as a function of the two variables $T_{i-m}$ and $T_{i-n}$ with $m \neq n$, B. means for memorization of the 3 $p(p - 1)/2$ lengths thus obtained, C. decision means comparing the said 3 $p(p - 1)/2$ lengths and selecting one of the $2^p - 1$ successive possible states for the $p$ variable system, which define the first optimum elementary action, D. means for verifying that the said first optimum elementary action is compatible with the constraints selected in that plane, for each of the $p(p - 1)/2$ planes.

Purely by way of example, we now freely give a very simple solution for the problem performed by the machine of the invention to illustrate the manner in which the problem is posed to the operator and the form of solution that it indicates. The problem is that of 4 trains initially situated on 4 different tracks, the tracks running together into a single track including 7 successive sections. After the 7th section, the single track divides into 4 tracks which can again be occupied by the 4 trains. The trains have speeds which are not necessarily identical. For safety reasons, at least one section must be unoccupied between 2 trains. The problem consists of finding in what manner one must advance the trains to obtain an optimum time solution.

In this problem, the overall situation depends on the four variables $T_1$, $T_2$, $T_3$, $T_4$ which represent the section occupation times. There are six manners in which these variables can be grouped two by two, so that the problem must be processed in six different planes.

The position of the constraints in each plane is determined by the condition according to which there must be at least one free section between two trains, which signifies that if train $T_1$ for example is in section 5, train $T_2$ can be neither in section 4 nor in section 6 nor of course in section 5. Having specified the constraint positions in the six planes, the coordinates of the upper and lower constraint points run constitute the problem data which are presented to the machine. These coordinates are assembled in table XIII. The train speeds are also indicated to the optimizer, for example 9, 13, 14, and 17.

The optimizer can deliver results in the form of a succession of orders, such as those which are grouped in table XIV. In this table, only the decision changes are indicated; thus, for the transfers 2 and 3 which are not explicitly mentioned, the decision to take is the same as for transfer 1, which is to say advance train number 2. The optimizer also indicates the total length of the optimum solution, which, in the case of the example treated is 27 steps.

The data can enter through any standard computer peripheral device (punched cards, magnetic tapes etc...) or by any other means (hydro-electro mechanical detectors etc..). The results can be displayed by peripherals of all types: colour visual display units, high speed printers, servomechanisms.

It is implicit that this example is given only by way of illustration and that the optimizer can solve more complex problems including a number of variables much greater than 4, and a very large number of constraints.

TABLE XIII

| Planes | Constraints | | | |
| --- | --- | --- | --- | --- |
| | Upper point coordinates | | Lower point coordinates | |
| | X | Y | X | Y |
| Plane 2, 1 | 2 | 0 | 0 | 3 |
| | 3 | 1 | 1 | 5 |
| | 4 | 3 | 2 | 7 |
| | 6 | 5 | 3 | 10 |
| | 8 | 7 | 4 | 12 |

TABLE XIII-continued

| Planes | Constraints | | | |
|---|---|---|---|---|
| | Upper point coordinates | | Lower point coordinates | |
| | X | Y | X | Y |
| Plane 3,1 | 9 | 10 | 6 | 13 |
| | 2 | 0 | 0 | 2 |
| | 3 | 1 | 1 | 3 |
| | 4 | 2 | 2 | 5 |
| | 6 | 3 | 3 | 9 |
| | 8 | 5 | 4 | 12 |
| | 9 | 9 | 6 | 14 |
| Plane 3,2 | 3 | 0 | 0 | 2 |
| | 5 | 1 | 1 | 3 |
| | 7 | 2 | 3 | 5 |
| | 10 | 3 | 5 | 9 |
| | 12 | 5 | 7 | 12 |
| | 13 | 9 | 10 | 14 |
| Plane 4,1 | 2 | 0 | 0 | 5 |
| | 3 | 1 | 1 | 8 |
| | 4 | 5 | 2 | 11 |
| | 6 | 8 | 3 | 13 |
| | 8 | 11 | 4 | 15 |
| | 9 | 13 | 6 | 17 |
| Plane 4,2 | 3 | 0 | 0 | 5 |
| | 5 | 1 | 1 | 8 |
| | 7 | 5 | 3 | 11 |
| | 13 | 13 | 10 | 17 |
| Plane 4,3 | 2 | 0 | 0 | 5 |
| | 3 | 1 | 1 | 8 |
| | 5 | 5 | 2 | 11 |
| | 9 | 8 | 3 | 13 |
| | 12 | 11 | 5 | 15 |
| | 14 | 13 | 9 | 17 |

TABLE XIV

| Step | The following trains advance. |
|---|---|
| 1 | 2 |
| 4 | 2-4 |
| 6 | 2 |
| 7 | 2-4 |
| 9 | 1-2-4 |
| 10 | 2-4 |
| 11 | 1-2-4 |
| 13 | 2-3-4 |
| 14 | 1-3-4 |
| 15 | 1-4 |
| 16 | 3-4 |
| 17 | 1-3-4 |
| 18 | 3-4 |
| 21 | 1-3-4 |
| 22 | 1-3 |
| 24 | 3 |

What we claim is:

1. A digital problem solving machine of optimizer type, for the seeking of an optimum path between an initial state and a final state for a system with a plurality of quantified variables, m in number, each of which can take on N values, comprising:

a. means for setting in the sets of coordinate values of the variables corresponding to the initial and final states of the said system and for setting in the coordinate value sets corresponding to the values of the variables defining the system forbidden states, referred to as constraints;

b. a plurality of computation-and-memorization cells for handling digital contents, arranged to have their initial contents set by said setting-in means;

c. means providing for variation of the said contents in said cells by quantities appropriately defined as a function of the said constraints imposed on the system, starting from the set of initial values, the evolution of the values of the said contents by said variation being capable of consideration as simulating the propagation of a backward dummy wave which propagates step by step in a representative space receiving the said wave of the preceding adjacent points, with the exception of the points representative of constraints which do not propagate the wave, such variation for each constraint being termed processing the constraint;

d. means for reading the finally obtained cell contents after processing each constraint, and e. decision means using the results of the reading performed by said reading means and comparing them for selecting at least one of m+1 possible alternative succeeding states, as being the state corresponding to the first optimum elementary action, which transfers the system from the initial state to the said selected succeeding state, and which includes means for producing at least one reiteration comprising:

f. means for setting as the new initial state of the system the said succeeding state selected by said decision means, g. means for reinitializing the cells contents, h. means for commanding anew the operation of the means defined in foregoing subparagraphs c) to g), inclusive, for reprocessing of the cell contents, and i. means for memorizing the set of optimum elementary actions found at each processing, which set gives by successive approximation, the said optimum route going from the initial state to the final state, the said digital machine comprising the improvements constituted by the following characteristics:

the said computation-and-memorization cells are P in number, where P<mN, and constitute an operator; each cell includes means for incrementation of its contents controlled by the aforesaid means for the setting in of coordinate values defining each constraint and includes means for sequentially delivering the said coordinate values of the constraints to the said incrementation means, the processing performed by the said operator thus being performed from constraint to constraint, and the contents of each cell after processing of a constraint represents the difference between the number of steps performed on any one of the variables to pass the said constraint and the dummy number of steps which would lead to the same situation if the said constraint did not exist, so that the set of P contents can then be considered as representative of the difference expressed as the number of steps between the front of the said backward dummy wave and the front of the reference wave propagating in the same way as the dummy wave but not being disturbed by the said constraints.

2. Optimizer according to claim 1 in which the number of coordinate values in each of said sets of coordinate values is 2, so that the coordinate sets are pairs of values and the representative space is a representative plane of $N^2$ points equidistantly located on intersecting straight lines defined by said points and in which:

the number of cells P is equal to 2N, each of the 2N cells is referenced by an address, called the diagonal address, the 2N diagonal addresses being numbered from 0 to 2N − 1, so that the cells can then be considered as being allocated to each one of the 2N diagonals of the representative plane, the means for setting in an initial content in the said cells include means for initially setting in a content equal to 0 for the cells of which the addresses go from 0 to N—1 inclusive and contents equal to 1, 2, 3....N respectively for the N cells of which the addresses go from N to 2N − 1, means are provided for setting in each constraint by two numbers, an upper diagonal address denoted H corresponding in the representative plane to the constraint point situated on the highest diagonal and a lower diagonal address denoted B, corresponding to the constraint point situated on the lowest diagonal of the plane, the said means for incrementing the contents of each cell as a function of the addresses B and H and of the constraint processed include means for:

a. maintaining unchanged the contents of the cells of which the addresses are included between 0 and B, inclusive,
b. changing the contents of a cell of address B +1 to (B) + 1, the expression: (B) esignating the content of the cells of address B before processing, changing to (B) + 2 the contents of the cells of address B + 2 and so on,
c. comparing the contents of each cell with the content (H) of the cell of address H,
d. determining which cell is the intermediate cell for which the new content becomes equal to (H),
e. maintaining at the value (H) the contents of the cells with addresses higher than the said intermediate cell up to the cell with address H,
f. maintaining unchanged the contents of the cells of which the addresses go from H + 1 to F − 1.

3. Optimizer according to the claim 2, characterized in that the said decision means include means for comparing the respective contents of the three cells corresponding to the three possible succeeding states for the initial state, and selecting one of the three contents having the smallest value.

4. Optimizer according to claim 3 including:
A. interface means for interconnecting said operator connecting said operator constituted by said cells, and a computer;
B. a control means for providing a sequence of orders to the operator,
C. addressing means for interpreting said orders for the operator, said addressing means including means for reading the contents of the cell the address of which is that of the upper address H of a constraint being processed, means for transmitting the result over a comparator-bus and means for subtracting, from the lower address B of the said constraint being processed, the contents of the cell of the same address and means for transmitting the result over an operator bus, the said optimizer being further characterized in that each diagonal address of $n$ bits is split into a base-address part composed of a first set of $n'$ bits and a displacement part composed of a wired-in word composed of a second set of $n - n'$ bits and that in each cell the operator includes:

a. first multiplexer means having two inputs, and $n'$ bits, said inputs connected to receive respectively the words of $n'$ bits of the base address and of the address which exceeds the base address by 1 and therefore may be referred to as the base + 1 address or address part,
b. random access memory means of $p = 2^n$ bits, for memorizing the successive contents of the cell after each constraint is processed, said memory means being controlled by an enabling line and being addressable by a word of $n'$ bits coming from said multiplexer, the output of the said memory being orgaized in a bus, hereinafter referred to as the RAM-output-bus,
c. adder-subtractor means receiving a cell address composed of one of said wired-in words of $(n - n')$ bits and one of said word of $n'$ bits coming from said multiplexer and also receiving words of $n$ bits transmitted by the said operator-bus,
d. comparator means for comparing each word of $n$ bits coming from said adder-subtractor means respectively with each word of $n$ bits transmitted by the said comparator-bus,
e. second multiplexer means with two inputs and $n$ bits, connected to receive the word coming from said adder-subtractor means and the word transmitted by said comparator-bus, the said second multiplexer means being controlled by the output of said comparator means, the output of said second multiplexer means being constituted so as to transmit words of $n$ bits towards said memory means.

5. Optimizer according to claim 4, characterized in that said memory means comprises a plurality of random access memories arranged for being enabled in parallel.

6. Optimizer according to claim 4, characterized in that said addressing means includes first and second decoders and:
A. first register means for storing the base part of the upper address, having its output directed towards second comparator means for ensuring the operation of said first decoder and the provision of a stop order;
B. second register means for storing the displacement part of the upper address, having its output oriented both towards said second decoder and towards third comparator means for a part of the provision of said stop order;
C. a first counter and third register means for receiving the base part of the lower address, the output of said first counter being connected, via an adder to a second counter which contains the base + 1 part of the lower address and has its output directed both towards said second comparator means and towards fourth comparator means for the reinitialization of said memory means;
D. fourth register means for receiving the displacement part of the lower address having its output directed towards:
a. demultiplexer means for decoding an enabling signal for said memory means, the output of said demultiplexer means being oriented towards gate means for single or parallel enabling of said memory means;
b. a third decoder DECOD 11 having an output which serves, for the selection of a base address of said memory means and for activating a fourth decoder DECOD 12 having an output controlled by second gate means and constituting a write clock for said memory means;
c. subtractor means for computing the contents of the operator bus and receiving on its two inputs: the output of third multiplexer means and the output of a fifth register, the output of said subtractor means constituting the said operator bus;

d. said third comparator means responsible for one part of the detection of said stop order, E. a sixth register arranged to supply the contents of the upper address over the operator bus, and F. a seventh register used in a write procedure.

7. Optimizer according to claim 4, characterized in that said control means is constituted by a microprocessor which includes, a clock (H) arranged for synchronizing and sequencing its operation, a read only memory in which a microprogram is stored and arranged for sequential addressing of its instructions, said read only memory having control output lines serving as outputs of said control means and test output lines for evaluating inputs to said control means from other portions of the optimizer at the various stages of the microprogram, a test decoder interconnected with said inputs and said test output lines through logic circuit means and with an operation code output of said read only memory so as to determine whether the next microprogram instruction should be addressed, and an ordinal counter (CO) interconnected with said read only memory, said clock and said test decoder so as to address the next instruction of said microprogram in response to a determination of said test decoder (FIG. 19).

8. Optimizer according to claim 4, characterized in that the interface means includes:
a simulator comprising a generalized interface,
a coupler having the form of a card installed in said computer with which said interface means connects,
and a maintenance console.

9. Optimizer according to claim 1, characterized in that the operator is composed of $p$ layers of M cells, with $p \cdot M = 2N$, and wherein the number M can be less than the dimensions of certain constraints, the said operator in such case operating several times in succession to process the constraints last mentioned.

10. Optimizer according to claim 1 characterized in that each cell of the operator includes means for computation and memorization of an increment which represents, for a specified cell, the increase of the content of this cell with respect to the content of the cell of the preceding address.

11. Optimizer according to claim 10 in which $m=2$ so that the coordinate sets are pairs of values, the representative space is a representative plane of $N^2$ points arranged equidistantly on intersecting straight lines defined by said points, the number of cells is $P \leq 2N$, and in which further:

each of the P cells is referenced by an address, called the diagonal address, the P diagonal addresses being numbered from 0 to $P - 1$, the cells can then be considered as being allocated to P diagonals of the representative plane, the means for setting in an initial content in the said cells include means for initially setting in a content equal to 0 for the cells of which the addresses go from 0 to N inclusive and a progessive of increment as contents for the cells of which the addresses go from $N + 1$ to $P - 1$, in the setting in means, each constraint is set in by two numbers, the one called "upper diagonal address" denoted H and corresponding in the representative plane to the constraint point situated on the highest diagonal of the plane and the other called "lower diagonal address" denoted B, corresponding to the constraint point situated on the lowest diagonal of the plane, the said means for computing the increment of each cell as a function of the addresses B and H of the constraint processed include means for:

a. maintaining at zero the increment of the cells of which the addresses are included between 0 and B, inclusive, b. computing the number S of increments that it counts before the processing of the constraint under consideration in the cells of which the addresses go from B exclusive to H inclusive, c. resetting to zero the contents of the cells of which the addresses go from $B + 1$ to H, d. setting in a progressive increment of "1" in the cells of addresses $B + 1, B + 2 \ldots B + S$, e. setting in a zero increment in the cells of which the addresses go from $B + S + 1$ up to H inclusive, and f. mantaining unchanged the increments of the cells of which the addresses go from $H + 1$ to $P - 1$.

12. Optimizer according to claim 11, characterized in that the operator includes:

a memory (M) having as many 1 bit locations as cells, each bit representing one increment for one cell, each location having input and output means;

circuit means (V) for enabling all of the memory location output means relating to cells of addresses included in the interval going from B exclusive to H inclusive, an interval hereinafter denoted ]B, H], an adder (ADD 1) connected to the output means of memory (M) via the intermediary of the said circuit means (V) and which makes the sum S of all of the 1 s included in the interval ]B, H], means for resetting to zero the memory M locations in the interval ]B, H], means for writing a number of 1 s equal to the sum S starting from the address $B + 1$ up to the address $X = B + S$ then 0 s from $X + 1$ up to H, and sequencer means connected to a computer and comprising:

a. means for controlling the write and read operations in said memory (M), said circuit means (V), and said adder (ADD 1), for each processing of one constraint, b. means for transferring the processing operations in the cells, from the processing of one constraint to the processing of the following constraint to be processed, and c. means for extracting, after the last processing, the sum of the 1 s written up the for respective addresses of the cells corresponding to said three possible succeeding states of the initial state.

13. Optimizer according to claim 12, characterized in that the memory (M) is organized in $2^q$ lines of $2^r$ bits, with $P = 2^{q+r}$, the line to which an address belongs being defined by the $q$ most significant bits of the said address which form a word noted by $B_1$ for a lower address and $H_1$ for an upper address and in that the circuit means (V) for enabling include:

a lower address decoder means (DECOD B) the inputs of which are connected to the portion of the setting in means provided for the lower addresses and to the outputs of the enabling circuits of said circuit means for the outputs of the memory corresponding to the interval ]B, H] of the said lower address decoder means, including in particular a decoder (DECOD $B_1$) with $q$ bits, of which the $q$ inputs transmit $B_1$, having $2^q$ outputs, an upper address decoder means (DECOD H) the inputs of which are connected to the portion of the setting in means provided for the upper addresses and to the outputs to the said logic circuits of said circuit means (V), the said upper address decoder means including in particular a decoder (DECOD $H_1$) with $q$ bits of which the $q$ inputs transmit $H_1$, having 2q outputs.

14. Optimizer according to claim 13, characterized in that each of the lines of $2^r$ bits is organized in $2^s$ words of $2^t$ bits each with $s + t = r$ and in that:
   A. the said lower address decoder includes, in addition to said decoder (DECOD $B_1$) of said lower address decoder means:
      a. a second decoder (DECOD $B_2$) of $s$ bits, the said $s$ bits corresponding to the $s$ intermediate bits of the lower address which form a word denoted $B_2$,
      a third decoder (DECOD $B_3$) with $t$ bits, the said $t$ bits being the $t$ least significant bits of the lower address which forms a word denoted $B_3$, and
   B. the said upper address decoder includes, in addition to decoder (DECOD $H_1$):
      a. a second decoder (DECOD $H_2$) with s bits, the said s bits corresponding to the $s$ intermediate bits of the upper address which forms a word denoted $H_2$,
      b. a third decoder, (DECOD $B_3$) with $t$ bits, the said $t$ bits being the $t$ least significant bits of the upper address which form a word denoted $H_3$.

15. Optimizer according to claim 14, characterized in that said memory M has $2^{11} = 2048$ bits organized in $2^4 = 16$ lines of $2^7 = 128$ bits divided into 16 bytes numbered from $i = 1$ to 16, the bits of one byte being numbered from $j = 8$, one of the 128 bits of one line being thus referenced by the notation with two indices $M^{i,j}$ and in that each address is defined by a word of 11 bits composed of three words denoted $B_1$, $B_2$ and $B_3$, respectively for the lower address and $H_1$, $H_2$ and $H_3$ respectively for the upper address, respectively formed in each case by the 4 most significant bits of the address, by the 3 intermediate bits and by the 3 least significant bits.

16. Optimizer according to claim 15, characterized in that:
   A. the second decoder (DECOD $B_2$) of the lower address decoder means has four inputs and sixteen outputs denoted $B_2^i$, $i$ varying from 1 to 16, and is arranged to select among all of the bytes situated to the left of that at which the lower address is found, including that byte,
   B. the third decoder (DECOD $B_3$) of the lower address decoder means has three inputs and eight outputs denoted $B_3^j$, varying from 1 to 8, and is arranged to select in each byte all of the locations situated to the left of that represented by the value in binary coded decimal of $B_3$, including that location,
   C. the second decoder (DECOD $H_2$) of the upper address decoder means has four inputs and sixteen outputs denoted by $H_2i$, $i$ varying from 1 to 16, and is arranged to select among all of the bytes situated to the right of that at which the upper address is found, with the exclusion of this byte,
   D. the third decoder (DECOD $H_3$) of the upper address decoder means has three inputs and eight outputs denoted by $H_3^j$, $j$ varying from 1 to 8, and is arranged to select in each byte the locations to the right of the location represented by the binary coded decimal value of $H_3$ with the exclusion of the said position,
   E. the said logic circuits (VAL) of said circuit means (V) include: a logic gate $p^{i,j}$ of NOR type, connected to the output of each memory location $M^{i,j}$, the output of the said gate being connected to the adder (ADD 1), one of the two entries being connected to the output of the memory location $M^{i,j}$ and the other input being connected to the output of a logic subcircuit $K^{i,j}$ with six inputs, three of the said six inputs being connected respectively to the two outputs $B_2^i$ and $B_2^{i+1}$ of the said second decoder (DECOD $B_3$) of said lower address decoder means, the said logic subcircuit constituting the logic operation $b_2^{i+1} + b_2^i \cdot b_3^j$ for these three inputs, the three others of the six inputs of said logic subcircuit $K^{i,j}$ being connectd respectively to the two outputs $H_2^i$ and $H_2^{i-1}$ of the said second decoder (DECOD $H_2$) of said upper address decoder means and the output $H_3^j$ of the said third decoder (DECOD $H_3$) of said upper address decoder means, the said logic subcircuit thereby also performing the logic operation $h_2^{i-1} + h_2^i \cdot h_3^j$ for these three inputs, where the lower case letters $b$ and $h$ designate the logic state of the corresponding outputs.

17. Optimizer according to claim 16, charactrized in that each logic subcircuit $K^{i,j}$ includes:
   a second logic gate (PH) of NAND type, with one of the two inputs connected to the output H $3^j$ and the other to the output $H_2^i$,
   a third logic gate (PB) of NAND type, with two inputs connected to the output $B_2^i$ and the other to the output $B_3^j$,
   a fourth gate (PBH) of NAND type, with four inputs, the first connected to the output of said second gate (PH), the second connected to the third gate (PB), the third connected to the output $H_2^{i-1}$ complemented, denoted $H_2^{i-1}$, and the fourth to the output $B_2^{i+1}$ complemented, being $B_2^{i+1}$, the output of the said fourth gate (PBH) being connected to one of the two inputs of said first-mentioned gate $p^{i,j}$ of said logic circuit of said circuit means (V).

18. Optimizer according to claim 17, characterized in that said memory (M) comprises a plurality of integrated circuits and a buffer register is inserted between each integrated circuit of said memory and the gates $p^{i,j}$ of said logic circuit for output enabling.

19. Optimizer according to claim 16, characterized in that the memory inputs are controlled by a switching system controlled by the outputs of the $K^{i,j}$ logic gates of said logic subcircuits and means are provided fow resetting to zero of the memory elements over the interval ]B, H] after forming the sum S.

20. Optimizer according to claim 15, characterized in that the memory of 16 lines of 16 bytes is composed of 16 memory cards in series, each card being made by the series connection of two 16 × 4 bit integrated circuits.

21. Optimizer according to claim 11 characterized in that it includes an adder and a computation circuit means ($\Sigma$) for computation of the sum $S + B$, connected to the output of said adder (ADD 1), the output of said computation circuit means providing the address X up to which it is necessary to write in the 1s, the address X also being noted by $X_1 X_2 X_3$, where $X_1$ is the word formed by the four most significant address bits, $X_2$ the word formed by the four intermediate bits and $X_3$ the word formed by the three least significant bits.

22. Optimizer acccording to claim 21, characterized in that the said decision means are composed of second comparator means for comparing the address X delivered by the said compuation circuit means with the address of the cell representing the arrival point.

23. Optimizer according to claim 21, characterized in that the operator includes a memory (M) having as many 1 bit locations as cells, each bit representing one increment for one cell, each location having input and output means; and in that the adder (ADD 1) includes:
   four adder circuits each receiving 31 1-bit words and each delivery one 5 bit word representing the sum of the bits of the 31 1-bit words that it has received; and
   a fifth adder circuit with seven outputs receiving the said four 5-bit words and the 125, 126, and 127th bits of the same line of said memory (M) and delivering the sum S in the form of a 7-bit word.

24. Optimizer according to claim 1 for the searching of an optimum path between an initial state and a final state for a system with $p$ variables $T_i$, where i is an index $1 \leq i \leq p$, characterized in that it includes:
   A. a plurality of suboptimizers each constituted as an optimizer according to claim 1 limited to a system of two variables, m being equal to 2, so that the coordinate sets are pairs of values and the representative space is a representative plane of $N^2$ points arranged equidistantly on intersecting straight lines defined by said points, each of said suboptimizers being organized as means for respectively finding and memorizing optimum elementary actions for the $p(p_2 - 1)$ systems of two variables $T_i = m$ and $T_1 = n$ with $m \neq n$ and
   B. means for performing the recombination of these $p(p_2 - 1)$ optimum elementary actions, in such a manner
      that the recombination gives the optimum elementary action for the system with $p$ variables.

25. Optimizer for the search of an optimum path between an initial state and a final state for a system with p variables $T_i$, where $i$ is an indice $1 \leq i \leq p$, characterized that it includes:
   A. a plurality of suboptimizers each constituted as an optimizer according to claim 1 limited to a system of two variables, m being equal to 2, so that the coordinate sets are pairs of values and the representative space is a representative plane of $N^2$ points arranged equidistantly on intersecting straight lines defined by said points, each of said suboptimizers being organized as means for respectively finding and memorizing, for each of the $p(p_2 - 1)$ systems considered as a function of two variables $T_{i=m}$ and $T_{i=n}$ with m $\neq$ n, the lengths of the three paths ending up on the three possible alternative succeeding states of the initial state, and
   B. means for memorizing the $3 p(p_2 - 1)$ lengths thus obtained; and further characterized in that:
   C. the decision means of said suboptimizers are combined into a common decision means for comparing the said $3 p(p_2 - 1)$ lengths and selecting one of the $2^p - 1$ possible successive states for the system with $p$ variables, which defines the first optimum elementary action, and
   D. means are provided for checking in each of the $p(p_2 - 1)$ planes that the said first optimum elementary action is compatible with the constraints set in for that plane by the setting in means of the corresponding suboptimizer.

* * * * *